US012620914B2

(12) United States Patent (10) Patent No.: US 12,620,914 B2

Preindl et al. (45) Date of Patent: May 5, 2026

(54) SYSTEMS AND METHODS FOR CONTROL OF NONISOLATED BIDIRECTIONAL POWER CONVERTERS

(71) Applicant: The Trustees of Columbia University in the City of New York, New York, NY (US)

(72) Inventors: Matthias Preindl, New York, NY (US); Liwei Zhou, New York, NY (US); William-Michael Eull, Oakville (CA); Matthew Jahnes, New York, NY (US)

(73) Assignee: The Trustees of Columbia University in the City of New York, New York, NY (US)

(*) Notice: Subject to any disclaimer, the term of this patent is extended or adjusted under 35 U.S.C. 154(b) by 0 days.

(21) Appl. No.: 18/292,318

(22) PCT Filed: Jul. 27, 2022

(86) PCT No.: PCT/US2022/038561

§ 371 (c)(1),
(2) Date: Jan. 25, 2024

(87) PCT Pub. No.: WO2023/009652

PCT Pub. Date: Feb. 2, 2023

(65) Prior Publication Data

US 2024/0235206 A1 Jul. 11, 2024

Related U.S. Application Data

(60) Provisional application No. 63/351,768, filed on Jun. 13, 2022, provisional application No. 63/345,896, (Continued)

(51) Int. Cl.

| | |
|---|---|
| *H02J 3/32* | (2026.01) |
| *H02J 7/02* | (2016.01) |

(Continued)

(52) U.S. Cl.

CPC ............... *H02M 7/81* (2013.01); *H02J 3/322* (2020.01); *H02J 7/02* (2013.01); *H02M 1/0043* (2021.05);

(Continued)

(58) Field of Classification Search
None
See application file for complete search history.

(56) References Cited

U.S. PATENT DOCUMENTS

| | | | |
|---|---|---|---|
| 4,866,367 A | 9/1989 | Ridley et al. | |
| 6,175,293 B1 | 1/2001 | Hasegawa et al. | |

(Continued)

FOREIGN PATENT DOCUMENTS

| | | |
|---|---|---|
| CN | 102 437 628 A | 5/2012 |
| CN | 104 410 257 B | 12/2017 |

(Continued)

OTHER PUBLICATIONS

International Search Report and Written Opinion issued in corresponding PCT/US2022/038561, mailed Dec. 16, 2022.

(Continued)

*Primary Examiner* — Rexford N Barnie
*Assistant Examiner* — Aqeel H Bukhari
(74) *Attorney, Agent, or Firm* — Quarles & Brady, LLP

(57) ABSTRACT

Disclosed are implementations that include a power converter system and method including an N-phase power converter stage having to an alternating current (AC) side and a direct current (DC) side, with N≥1. The system and method further include an N-phase LC filter comprising one or more capacitors, wherein respective one or more neutral points of the one or more capacitors are electrically connected to a DC negative terminal of a DC source. A control system drives power switching elements of the N-phase power converter stage to convert received power and to (Continued)

output converted power. The control system drives the power switching elements using variable frequency soft switching at a frequency of at least 20 kHz. The power converter may have bidirectional operation to operate in a traction mode to drive a motor or a charging mode to charge a DC source.

28 Claims, 32 Drawing Sheets

Related U.S. Application Data filed on May 25, 2022, provisional application No. 63/319,122, filed on Mar. 11, 2022, provisional application No. 63/270,311, filed on Oct. 21, 2021, provisional application No. 63/242,840, filed on Sep. 10, 2021, provisional application No. 63/226,059, filed on Jul. 27, 2021, provisional application No. 63/226,136, filed on Jul. 27, 2021.

(51) Int. Cl.

| | |
|---|---|
| *H02M 1/00* | (2006.01) |
| *H02M 1/08* | (2006.01) |
| *H02M 1/12* | (2006.01) |
| *H02M 1/14* | (2006.01) |
| *H02M 1/44* | (2007.01) |
| *H02M 3/00* | (2006.01) |
| *H02M 3/335* | (2006.01) |
| *H02M 7/797* | (2006.01) |
| *H02M 7/81* | (2006.01) |
| *H02P 27/08* | (2006.01) |

(52) U.S. Cl.

CPC ......... *H02M 1/0058* (2021.05); *H02M 1/007* (2021.05); *H02M 1/083* (2013.01); *H02M 1/126* (2013.01); *H02M 1/14* (2013.01); *H02M 1/44* (2013.01); *H02M 3/01* (2021.05); *H02M 3/33571* (2021.05); *H02M 7/797* (2013.01); *H02P 27/08* (2013.01); *H02J 2203/20* (2020.01); *H02J 2207/20* (2020.01); *H02M 1/009* (2021.05); *H02M 3/33584* (2013.01)

(56) References Cited

U.S. PATENT DOCUMENTS

| | | | |
|---|---|---|---|
| 6,529,102 | B2 | 3/2003 | Masuda et al. |
| 6,722,017 | B2 | 4/2004 | Rittner et al. |
| 7,126,443 | B2 | 10/2006 | De Bhailis et al. |
| 8,068,352 | B2 | 11/2011 | Yu et al. |
| 8,130,068 | B2 | 3/2012 | Mori |
| 8,207,717 | B2 | 6/2012 | Uruno et al. |
| 8,378,623 | B2 | 2/2013 | Kusch et al. |
| 8,427,103 | B2 | 4/2013 | Ohtomo |
| 8,446,769 | B2 | 5/2013 | Kim |
| 8,766,570 | B2 | 7/2014 | Geyer et al. |
| 8,810,182 | B2 | 8/2014 | Zhou et al. |
| 8,823,482 | B2 | 9/2014 | Singh et al. |
| 8,824,179 | B2 | 9/2014 | Limpaecher |
| 8,861,238 | B2 | 10/2014 | Huang et al. |
| 9,054,603 | B2 | 6/2015 | Chen et al. |
| 9,238,415 | B2 | 1/2016 | King et al. |
| 9,584,044 | B2 | 2/2017 | Zhou et al. |
| 9,595,870 | B2 | 3/2017 | Mao et al. |
| 9,705,420 | B2 | 7/2017 | Quevedo et al. |
| 9,819,272 | B2 | 11/2017 | Perreault et al. |
| 9,859,714 | B2 | 1/2018 | Pahlevaninezhad et al. |
| 9,893,633 | B1 | 2/2018 | Li et al. |
| 9,899,932 | B2 | 2/2018 | Alexander |
| 9,973,107 | B2 | 5/2018 | Cerqueira Pinto Bezerra Varajao et al. |
| 10,044,229 | B2 | 8/2018 | Partovi et al. |
| 10,116,234 | B2 | 10/2018 | Raboni et al. |
| 10,135,350 | B2 | 11/2018 | Ye et al. |
| 10,283,261 | B2 | 5/2019 | Jin et al. |
| 10,333,390 | B2 | 6/2019 | Li et al. |
| 10,389,258 | B2 | 8/2019 | Njiende et al. |
| 10,715,056 | B2 | 7/2020 | Liu et al. |
| 10,766,368 | B2 | 9/2020 | Jiang et al. |
| 10,978,964 | B2 | 4/2021 | Wang et al. |
| 11,075,600 | B2 | 7/2021 | Chauvenet |
| 11,139,748 | B2 | 10/2021 | Nakatsu et al. |
| 11,912,147 | B2 | 2/2024 | Eull et al. |
| 12,263,746 | B2 | 4/2025 | Eull et al. |
| 12,451,795 | B2 | 10/2025 | Itten et al. |
| 2007/0211501 | A1 | 9/2007 | Zargari et al. |
| 2012/0008353 | A1* | 1/2012 | Alexander .......... H02M 7/4807 363/123 |
| 2012/0008535 | A1 | 1/2012 | Alexander |
| 2012/0286740 | A1 | 11/2012 | Loudot et al. |
| 2014/0078782 | A1 | 3/2014 | Rosado et al. |
| 2014/0204640 | A1 | 7/2014 | Sutardja et al. |
| 2014/0268891 | A1* | 9/2014 | Sigamani ................ H02M 1/14 363/17 |
| 2015/0365003 | A1 | 12/2015 | Sadwick |
| 2017/0229972 | A1* | 8/2017 | Cerqueira Pinto Bezerra Varajão ................ H02M 7/797 |
| 2019/0296561 | A1 | 9/2019 | Le et al. |
| 2020/0220467 | A1 | 7/2020 | Moon et al. |
| 2021/0261009 | A1* | 8/2021 | Eull ...................... H02M 1/123 |
| 2024/0223106 | A1 | 7/2024 | Preindl et al. |
| 2024/0348172 | A1 | 10/2024 | Preindl et al. |
| 2024/0356334 | A1 | 10/2024 | Preindl et al. |

FOREIGN PATENT DOCUMENTS

| | | |
|---|---|---|
| CN | 106972757 | 2/2019 |
| CN | 108 448 923 B | 1/2020 |
| CN | 11 800 031 A | 10/2020 |
| EP | 2 869 446 A1 | 5/2015 |
| EP | 2 798 730 B1 | 11/2017 |
| WO | WO 2009059407 | 5/2009 |

OTHER PUBLICATIONS

Agrawal et al., "Variable-Frequency Critical Soft-Switching of Wide-Bandgap Devices for Efficient High-Frequency Nonisolated DC-DC Converters," IEEE Transactions on Vehicular Technology, vol. 69, No. 6, pp. 6094-6106, Jun. 2020, doi: 10.1109/TVT.2020.2987028.

Ali et al., "Modular Single-Stage Three-Phase Flyback Differential Inverter for Medium/High-Power Grid Integrated Applications," Sensors 2022, 22, 2064. https://doi.org/ 10.3390/s22052064.

Ando et al., "Dependence of electric power flow on solar radiation power in compact photovoltaic system containing SiC-based inverter with spherical Si solar cells," CellPress, Heliyon 6 (2020).

Anwar et al., "A High Power Density Drivetrain-Integrated Electric Vehicle Charger," 2016 IEEE Energy Conversion Congress and Exposition (ECCE).

Avrutin et al., "Onset of chaos in a single-phase power electronic inverter," Chaos 25, 043114 (2015); https://doi.org/10.1063/1.4918299.

Bao et al., "Step-by-Step Controller Design for LCL-Type Grid-Connected Inverter with Capacitor-Current-Feedback Active-Damping," IEEE Transactions on Power Electronics, vol. 29 / Issue 3, pp. 1239-1253, Mar. 2014.

Bechir et al., "Modeling and Optimization of an Integrated Planar Inductor With Two Layers of Magnetic Material," Int. J. Adv. Res. 10(01), 418-425, Jan. 2022, DOIURL: http://dx.doi.org/10.21474/IJAR01/14057.

Bharath et al., "Optimum Injection of Second Harmonic Circulating Current for Reduction in Submodule Capacitor Voltage Ripple in Over-modulated MMC," 2021 IEEE Energy Conversion Congress and Exposition (ECCE), dio:10.1109/ECCE47101.2021.9595238.

(56) References Cited

OTHER PUBLICATIONS

Bonfiglio et al., "Improving power grids transient stability via model predictive control," 2014 Power Syst Comput Conf. Aug. 2014: pp. 1-7.

Cai, "An On-Board Charger Integrated Power Converter for EV Switched Reluctance Motor Drives," IEEE Transactions On Industrial Electronics, vol. 68, No. 5, May 2021.

Caillaud et al., "Comparison of Planar and Toroidal PCB integrated inductors for a multi-cellular 3.3 kW PFC," 2017 International Workshop on Integrated Power Packaging (IWIPP).

Chafi et al., "Design method of PCB inductors for high-frequency GaN converters," IEEE Transactions on Power Electronics, vol. 36, No. 1, pp. 805-814, Jan. 2021, doi: 10.1109/TPEL.2020.3000438.

Chang et al., "Robust Optimal Control Design for Performance Enhancement of PWM Voltage Source Inverter," Micromachines 2022, 13, 435. https://doi.org/10.3390/ mi13030435.

Cheng et al., "A Novel and Cost-Effective Drive Circuit for Supplying a Piezoelectric Ceramic Actuator with Power-Factor-Correction and Soft-Switching Features," Micromachines 2021, 12, 1229. https://doi.org/10.3390/mi12101229.

Chen et al., "A New On-Chip All-Digital Three-Phase Full-Bridge dc/ac Power Inverter With Feedforward and Frequency Control Techniques," IEEE Transactions on Ultrasonics, Ferroelectrics, and Frequency Control, vol. 57, No. 9, Sep. 2010.

Cho et al., "Three Phase Sine Wave Voltage Source Inverter Using the Soft Switched Resonant Poles," 15th Annual Conference of IEEE Industrial Electronics Society, Philadelphia, PA, USA, 1989, pp. 48-53 vol. 1, doi: 10.1109/IECON.1989.69610.

Dash et al., "Nonlinear control of voltage source converters in AC-DC power system," Department of Electrical Engineering , ISA Transactions 53 (2014) 1268-1285.

Falkowski et al., "Finite control set model predictive control for grid-connected AC-DC converters with LCL filter," IEEE Transactions on Industrial Electronics, vol. 65 / Issue 4, pp. 2844-2852, Apr. 2018.

Faraji et al., "Efficient Multi-Port Bidirectional Converter With Soft-Switching Capability for Electric Vehicle Applications," IEEE Access, vol. 9, 2021, Digital Object Identifier 10.1109/ACCESS. 2021.3097750.

Fu et al., "A novel neural network vector control for single-phase grid-connected converters with L, LC and LCL filters," Energies, vol. 9 / Issue 5, Apr. 2016.

Gao et al., "Modeling and Design of High-Power, High-Current-Ripple Planar Inductors," IEEE Transactions on Power Electronics, vol. 37, No. 5, May 2022.

Hsiang et al., "Fabrication, simulation, and characterization of planar inductors," Materials Today Communications 29 (2021), https://doi.org/10.1016/j.mtcomm.2021.102929.

Huynh et al., "An experimental study of EMI reduction of DC-DC converter with frequency hopping technique," 2016 IEEE Electrical Design of Advanced Packaging and Systems (EDAPS), Honolulu, HI, USA, 2016, pp. 107-109, doi: 10.1109/EDAPS.2016.7893138.

Kim et al., "DC-Link Ripple Current Reduction Method for Three-Level Inverters With Optimal Switching Pattern," IEEE Transactions on Industrial Electronics, vol. 65, No. 12, Dec. 2018.

Kolar et al., "PWM Converter Power Density Barriers," ProQuest, vol. 128, Iss. 4, (2008): 468.

Kundrata et al., "Design of a planar inductor for DC-DC converter on flexible foil applications," MIPRO 2012, May 21-25, 2012, Opatija, Croatia.

Li et al., "Electromagnetic Interference Suppression and Simultaneous Switching Noise Mitigation in System on Package Using a Lowpass Filter Structure with Embedded Capacitor," IEEE 2009 11th Electronics Packaging Technology Conference.

Lin et al, "Optimized Design of the Neutral Inductor and Filter Inductors in Three-Phase Four-Wire Inverter With Split DC-Link Capacitors," IEEE Transactions on Power Electronics, vol. 34, No. 1, Jan. 2019.

Liserre et al., "Genetic algorithm-based design of the active damping for an LCL-filter three-phase active rectifier," IEEE Transactions on Power Electronics, vol. 19 / Issue 1, pp. 76-86, Jan. 30, 2004.

Liserre et al., "Design and control of an LCL-filter-based three-phase active rectifier," IEEE Transactions on Industry Applications, vol. 41 / Issue 5, pp. 1281-1291, Sep. 2005.

Ludwig et al., "PCB Integrated Inductors for Low Power DC/DC Converter," IEEE Transactions on Power Electronics, vol. 18, No. 4, Jul. 2003.

Muller et al., "An Active Common Mode EMI Filter Approach introducing Predictive Pulsed Compensation," 2019 International Symposium on Electromagnetic Compatibility—EMC Europe, Barcelona, Spain, 2019, pp. 1003-1008, doi: 10.1109/EMCEurope.2019. 8872104.

Mulolani et al., "Notch-filter active damping of LCL filter resonance in a grid-connected inverter with variable grid inductance," Adv Sci Eng Technol. Mar. 2019: pp. 1-6.H.

Nag et al., "A Passive Filter Building Block for Input or Output Current Ripple Cancellation in a Power Converter," IEEE Journal of Emerging and Selected Topics in Power Electronics, vol. 04, No. 2, Jun. 2016.

Nam et al., "Model Predictive Control of a Grid-Connected Inverter with LCL Filter using Robust Disturbance Observer," IFAC Workshop on Control of Smart Grid and Renewable Energy Systems, vol. 52 / Issue 4, pp. 135-140, Sep. 2019.

Nawawi et al., "Design of High Power Density Converter for Aircraft Applications," 2015 International Conference on Electrical Systems for Aircraft, Railway, Ship Propulsion and Road Vehicles (ESARS), Aachen, Germany, 2015, pp. 1-6, doi: 10.1109/ESARS. 2015.7101418.

Nguyen et al., "Optimizing AC Resistance of Solid PCB Winding," Electronics 2020, 9, 875; doi: 10.3390/electronics9050875.

Oguz et al., "Power Quality Control and Design of Power Converter for Variable-Speed Wind Energy Conversion System with Permanent-Magnet Synchronous Generator," Hindawi Publishing Corporation The Scientific World Journal, vol. 2013, Article ID 783010, 14 pages, http://dx.doi.org/10.1155/2013/783010.

Ouyang et al., "Optimal Design and Tradeoff Analysis of Planar Transformer in High-Power DC-DC Converters," IEEE Transactions on Industrial Electronics, vol. 59, No. 7, Jul. 2012.

Ouyang et al., "Overview of Planar Magnetic Technology—Fundamental Properties," IEEE Transactions on Power Electronics, vol. 29, No. 9, Sep. 2014.

Pellegrino et al., "An Integral Battery Charger With Power Factor Correction for Electric Scooter," IEEE Transactions on Power Electronics, vol. 25, No. 3, Mar. 2010.

Preindl et al., "Optimized Design of Two and Three Level Full-Scale Voltage Source Converters for Multi-MW Wind Power Plants at Different Voltage Levels," IECON 2011—37th Annual Conference of the IEEE Industrial Electronics Society, Melbourne, VIC, Australia, 2011, pp. 3634-3639, doi: 10.1109/IECON.2011. 6119899.

Romdhane et al., "An improved LCL filter design in order to ensure stability without damping and despite large grid impedance variations," Energies. 2017; 10(3): 336.

Sen et al., "Step-by-step design and control of LCL filter based three phase grid-connected inverter," IEEE International Conference on Industrial Technology, pp. 503-508, Sep. 11, 2014.

Setiawan et al., "Smarter Concepts for Future EMI Standards," 2017 Asia-Pacific International Symposium on Electromagnetic Compatibility (APEMC), Jun. 20-23, 2017, Seoul, Korea.

Solero, "Nonconventional On-Board Charger for Electric Vehicle Propulsion Batteries," IEEE Transactions on Vehicular Technology, vol. 50, No. 1, Jan. 2001.

Subotic et al., "An EV Drive-Train With Integrated Fast Charging Capability," IEEE Transactions on Power Electronics, vol. 31, No. 2, Feb. 2016.

Tang et al., "Coreless Planar Printed-Circuit-Board (PCB) Transformers—A Fundamental Concept for Signal and Energy Transfer," IEEE Transactions on Power Electronics, vol. 15, No. 5, Sep. 2000.

(56) References Cited

OTHER PUBLICATIONS

Viana et al., "A Drivetrain Integrated DC Fast Charger With Buck and Boost Functionality and Simultaneous Drive/Charge Capability," IEEE Transactions on Transportation Electrification, vol. 5, No. 4, Dec. 2019.

Wan et al., "An Improved Active Damping Method Based on Single-Loop Inverter Current Control for LCL Resonance in Grid-Connected Inverters," Mathematical Problems in Engineering, vol. 2021, Article: 6643223, Mar. 3, 2021.

Wang et al., "DC-bus design with hybrid capacitor bank in single-phase PV inverters," IEEE Iecon. Oct. 2017; pp. 2425-2430.

Wang et al., "A Novel Configuration of DC Link EMI Filter Capacitors in Variable Frequency Drives," 2019 IEEE Applied Power Electronics Conference and Exposition (APEC), Anaheim, CA, USA, 2019, pp. 2603-2607, doi: 10.1109/APEC.2019.8721782.

Wu et al., "An LLCL Power Filter for Single-Phase Grid-Tied Inverter," IEEE Transactions on Power Electronics, vol. 27 / Issue 2, pp. 782-789, Feb. 2012.

Wu et al., "Eliminating the Influence of Capacitor Voltage Ripple on Current Control for Grid-Connected Modular Multilevel Converter," 2015 IEEE Applied Power Electronics Conference and Exposition (APEC), Charlotte, NC, USA, 2015, pp. 2128-2132, doi: 10.1109/APEC.2015.7104643.

Wu et al., "Damping methods for resonances caused by LCL-filter-based current-controlled grid-tied power inverters: an overview," IEEE Trans Ind Electron, Sep. 2017; 64(9): pp. 7402-7413.

Xiao et al., "Identification Method of EMI Sources Based on Measured Single-Channel Signal and its Application in Aviation Secondary Power Source Design," IEEE Transactions on Electromagnetic Compatibility, vol. 59, No. 2, Apr. 2017.

Xin et al., "Design and Performance of a Passive EMI Filter for Three-Stage Aircraft Starter/Generator System," 2016 IEEE/CSAA International Conference on Aircraft Utility Systems (AUS) Oct. 10-12, 2016 Beijing, China.

Yao et al., "Radiated EMI Reduction by Layout Improvement in Power Converters in Automotive Applications," 2020 IEEE 9th International Power Electronics and Motion Control Conference, doi: 10.1109/IPEMC-ECCEAsia48364.2020.9367662.

Young et al., "Simple finite-control-set model predictive control of grid-forming inverters with LCL filters," IEEE Access, vol. 8, pp. 81246-81256, Apr. 2020.

Zhang et al., "Design of Inductors With Significant AC Flux," IEEE Transactions on Power Electronics, vol. 32, No. 1, Jan. 2017.

Zhang et al., "Modeling, Design, and Implementation of a Novel Transformer-less Feedforward-controlled Active EMI Filter for AC-DC Power Converters," 2020 IEEE Energy Conversion Congress and Exposition (ECCE), Detroit, MI,USA,2020, pp. 5849-5854, doi: 10.1109/ECCE44975.2020.9236198.

Zhou et al., "Transformerless three phase NPC inverter with reduced switches," IEEE ECCE, Sep. 2018; pp. 4766-4770.

Zhou et al., "Inductor Design for Nonisolated Critical Soft Switching Converters Using Solid and Litz PCB and Wire Windings Leveraging Neural Network Model," IEEE Transactions on Power Electronics, vol. 37, No. 3, Mar. 2022.

Zhou et al., "Design of transformerless electric vehicle charger with symmetric AC and DC interfaces,". IEEE APEC. Jun. 2021; pp. 2769-2774.

Joabel Moia et al: "Neutral point clamped converter DC-link center point current analysis in the dq0 reference frame", Power Electronics Conference (COBEP), 2011, Brazilian, IEEE, Sep. 11, 2011 (Sep. 11, 2011), pp. 121-128.

Zhou Yijie et al: "Current Zero-Crossing Duration Reduction of a Semicontrolled Open-Winding PMSG System Based on Third Harmonic Current Injection", IEEE Transactions on Industrial Electronics, IEEE Service Center, Piscataway, NJ, USA, vol. 63, No. 2, Feb. 1, 2016, pp. 750-760.

Fan Boran et al: "Adaptive Hysteresis Current Based ZVS Modulation and Voltage Gain Compensation for High-Frequency Three-Phase Converters", IEEE Transactions on Power Electronics, Institute of Electrical and Electronics Engineers, USA, vol. 36, No. 1, Jun. 16, 2020, pp. 1143-1156.

Huang Qingyun et al: "Variable Frequency Average Current Mode Control for ZVS Symmetrical Dual-Buck H-Bridge All-GaN Inverter", IEEE Journal of Emerging and Selected Topics in Power Electronics, IEEE, Piscataway, NJ, USA, vol. 8, No. 4, Sep. 10, 2019, pp. 4416-4427.

Haider Michael et al: "Novel ZVS S-TCM Modulation of Three-Phase AC/DC Converters", IEEE Open Journal of Power Electronics, IEEE, vol. 1, Nov. 24, 2020, pp. 529-543.

Rehlaender Philipp et al: "A PCB Integrated Winding Using a Litz Structure for a Wireless Charging Coil", 2019 21st European Conference on Power Electronics and Applications (EPE '19 ECCE Europe), EPE Association, Sep. 3, 2019.

Yu Sheng-Yang et al: "A High Frequency CLLLC Bi-directional Series Resonant Converter DAB Using an Integrated PCB Winding Transformer", 2020 IEEE Applied Power Electronics Conference and Exposition (APEC), IEEE, Mar. 15, 2020, pp. 1074-1080.

Deng Cheng et al: "A Passive Integrated Unit of LCL Filter and Transformer for Grid-Connected Inverter", 2019 IEEE Applied Power Electronics Conference and Exposition (APEC), IEEE, Mar. 17, 2019, pp. 2646-2652.

Zhou Liwei et al: "Variable-Switching Constant-Sampling Frequency Critical Soft Switching MPC for DC/DC Converters", IEEE Transactions on Energy Conversion, IEEE Service Center, Piscataway, NJ, US, vol. 36, No. 2, Feb. 9, 2021, pp. 1548-1561.

Zhou Liwei et al: "Variable-Frequency Explicit Model Predictive Control of Wide Band Gap DC/DC Converter with Critical Soft Switching", 2019 IEEE Applied Power Electronics Conference and Exposition (APEC), IEEE, Mar. 17, 2019, pp. 2995-2999.

A. Alessandri, M. Baglietto, G. Battistelli, and V. Zavala, "Advances in moving horizon estimation for nonlinear systems," in 49th IEEE Conference on Decision and Control (CDC), IEEE, 2010, pp. 5681-5688, ISBN: 9781424477456.

A. Amirahmadi et al., "Hybrid ZVS BCM Current Controlled Three-Phase Microinverter," in IEEE Transactions on Power Electronics, vol. 29, No. 4, pp. 2124-2134, Apr. 2014, doi: 10.1109/TPEL.2013.2271302.

A. Bemporad, F. Borrelli, and M. Morari, "Model predictive control based on linear programming—The explicit solution," IEEE Transactions on Automatic Control, vol. 47, No. 12, pp. 1974-1985, 2002.

A. Chafi, N. Idir, A. Videt, and H. Maher, "Design Method of PCB Inductors for High-Frequency GaN Converters," *IEEE Transactions on Power Electronics*, vol. 36, No. 1, pp. 805-814, 2021.

A. Dorneles Callegaro, J. Guo, M. Eull, B. Danen, J. Gibson, M. Preindl, B. Bilgin, and A. Emadi, "Bus Bar Design for High-Power Inverters," IEEE Transactions on Power Electronics, vol. 33, No. 3, pp. 2354-2367, 2018.

A. Favato, P. G. Carlet, F. Toso, and S. Bolognani, "A Model Predictive Control for Synchronous Motor Drive with Integral Action," in IECON 2018—44th Annual Conference of the IEEE Industrial Electronics Society, 2018, pp. 1-6.

A. Hintz, U. R. Prasanna, and K. Rajashekara, "Comparative study of the three-phase grid-connected inverter sharing unbalanced three phase and/or single-phase systems," IEEE Transactions on Industry Applications, vol. 52, No. 6, pp. 5156-5164, 2016.

A. Jafari, M. S. Nikoo, N. Perera, H. K. Yildirim, F. Karakaya, R. Soleimanzadeh, and E. Matioli, "Comparison of Wide-Band-Gap Technologies for Soft-Switching Losses at High Frequencies," *IEEE Transactions on Power Electronics*, vol. 35, No. 12, pp. 12 595-12 600, 2020.

A. K. Gupta, M. S. Joshi, and V. Agarwal, "Improved transformer-less grid-tied pv inverter effectively operating at twice the switching frequency with constant cmv and reactive power capability," IEEE Journal of Emerging and Selected Topics in Power Electronics, vol. 8, No. 4, pp. 3477-3486, 2019.

A. Muetze and E. G. Strangas, "The Useful Life of Inverter-Based Drive Bearings: Methods and Research Directions from Localized Maintenace to Prognosis," *IEEE Ind. Appl. Mag.*, No. 22, pp. 63-73, May 2016.

A.R. Iyer, R.P. Kanula, R. Moghe, J.E. Hernandez, F. C. Lambert, and D. Divan, "Validation of the plug-and-play AC/AC power

(56) References Cited

OTHER PUBLICATIONS electronics building block (AC-PEBB) for medium-voltage grid control applications," IEEE Transactions on Industry Applications, vol. 50, No. 5, pp. 3549-3557, 2014.

Akanksha Singh, Madhu Chinthavali, Scott Sudhoff, Kevin Bennion, Kumaraguru Prabakar, Xuhui Feng, Zhiqiang Wang, and Steven Campbell. Development and validation of a sic based 50 kw grid-connected pv inverter. In 2018 IEEE Energy Conversion Congress and Exposition (ECCE), pp. 6165-6172, 2018.

B. Yang, W. Li, Y. Gu, W. Cui, and X. He, "Improved transformerless inverter with common-mode leakage current elimination for a photovoltaic grid-connected power system," IEEE Transactions on Power Electronics, vol. 27, No. 2, pp. 752-762, 2012.

Bharat Agrawal, Liwei Zhou, Ali Emadi, and Matthias Preindl. Variable frequency critical soft-switching of wide-bandgap devices for efficient high-frequency nonisolated dc-dc converters. IEEE Transactions on Vehicular Technology, 69(6):6094-6106, 2020.

Bharat Agrawal, Matthias Preindl, and Ali Emadi. Turn-off energy minimization for soft-switching power converters with wide bandgap devices. In 2017 IEEE International Conference on Industrial Technology (ICIT), pp. 236-241, 2017.

C. A. Aragon, R. Guzman, L. G. de Vicuña, J. Miret and M. Castilla, "Constrained Predictive Control Based on a Large-Signal Model for a Three-Phase Inverter Connected to a Microgrid," in IEEE Transactions on Industrial Electronics, vol. 69, No. 7, pp. 6497-6507, Jul. 2022, doi: 10.1109/TIE.2021.3097608.

C. Afri, V. Andrieu, L. Bako, and p. Dufour, "State and Parameter Estimation: A Nonlinear Luenberger Observer Approach," IEEE Transactions on Automatic Control, vol. 62, No. 2, pp. 973-980, 2017.

C. Shi and A. Khaligh, "A Two-Stage Three-Phase Integrated Charger for Electric Vehicles with Dual Cascaded Control Strategy," *IEEE Journal of Emerging and Selected Topics in Power Electronics*, vol. 6, No. 2, pp. 898-909, 2018.

C. Shi, Y. Tang, and A. Khaligh, "A single-phase integrated onboard battery charger using propulsion system for plug-in electric vehicles," IEEE Transactions on Vehicular Technology, vol. 66, No. 12, pp. 10 899-10 910, 2017.

C. Shi, Y. Tang, and A. Khaligh, "A Three-Phase Integrated Onboard Charger for Plug-In Electric Vehicles," *IEEE Transactions on Power Electronics*, vol. 33, No. 6, pp. 4716-4725, 2018.

C. T. Morris, D. Han and B. Sarlioglu, "Reduction of Common Mode Voltage and Conducted EMI Through Three-Phase Inverter Topology," in IEEE Transactions on Power Electronics, vol. 32, No. 3, pp. 1720-1724, Mar. 2017, doi: 10.1109/TPEL.2016.2608388.

C. Tan, D. Xiao, J. E. Fletcher, and M. F. Rahman, "Carrier-based PWM methods with common-mode voltage reduction for five-phase coupled inductor inverter," IEEE Transactions on Industrial Electronics, vol. 63, No. 1, pp. 526-537, 2016.

C. Xue, L. Ding, H. Tian and Y. Li, "Multirate Finite-Control-Set Model Predictive Control for High Switching Frequency Power Converters," in IEEE Transactions on Industrial Electronics, vol. 69, No. 4, pp. 3382-3392, Apr. 2022. DOI: 10.1109/TIE.2021.3075870.

C. Y. Chiang and C. L. Chen, "Zero-voltage-switching control for a PWM buck converter under DCM/CCM bounda," *IEEE Transactions on Power Electronics*, vol. 24, No. 9, pp. 2120-2126, 2009.

C.-T. Chen, Linear System Theory and Design, 3rd ed. New York: Oxford University Press, 1999, p. 334, ISBN: 0195117778.

Chien-Ming Wang, "A new family of zero-current-switching (ZCS) PWM converters," in IEEE Transactions on Industrial Electronics, vol. 52, No. 4, pp. 1117-1125, Aug. 2005, doi: 10.1109/TIE.2005.851636.

D. Han, C. T. Morris, and B. Sarlioglu, "Common-Mode Voltage Cancellation in PWM Motor Drives With Balanced Inverter Topology," IEEE Transactions on Industrial Electronics, vol. 64, No. 4, pp. 2683-2688, 2017.

D. Hyypio, "Mitigation of bearing electro-erosion of inverter-fed motors through passive common-mode voltage suppression," IEEE Transactions on Industry Applications, vol. 41, No. 2, pp. 576-583, 2005.

D. Neumayr, D. Bortis and J. W. Kolar, "The essence of the little box challenge-part A: Key design challenges & solutions," in CPSS Transactions on Power Electronics and Applications, vol. 5, No. 2, pp. 158-179, Jun. 2020, doi: 10.24295/CPSSTPEA.2020.00014.

D. Pan, X. Ruan, X. Wang, H. Yu, and Z. Xing, "Analysis and Design of Current Control Schemes for LCL-Type Grid-Connected Inverter Based on a General Mathematical Model," IEEE Transactions on Power Electronics, vol. 32, No. 6, pp. 4395-4410, 2017.

E. Hoevenaars and M. Hiller, "Conceptualization and Efficiency Review of Integrated Chargers Using Six-Phase Machines," in IEEE Transactions on Transportation Electrification, vol. 8, No. 1, pp. 48-61, Mar. 2022. DOI: 10.1109/TTE.2021.3072281.

E. L. Haseltine and J. B. Rawlings, "Critical evaluation of extended Kalman filtering and moving-horizon estimation," Industrial and Engineering Chemistry Research, vol. 44, No. 8, pp. 2451-2460, 2005.

E. Rodriguez-Diaz, F. D. Freijedo, J. C. Vasquez, and J. M. Guerrero, "Analysis and Comparison of Notch Filter and Capacitor Voltage Feedforward Active Damping Techniques for LCL Grid-Connected Converters," IEEE Transactions on Power Electronics, vol. 34, No. 4, pp. 3958-3972, 2019.

F. Bu, H. Liu, W. Huang, H. Xu, and K. Shi, "Optimal-Third-Harmonic-Injection-Based Control for a Five-Phase Dual Stator-Winding Induction Generator DC Generating System," IEEE Transactions on Industrial Electronics, vol. 65, No. 11, pp. 9124-9134, 2018.

F. Chen, R. Burgos, and D. Boroyevich, "A Bidirectional High-Efficiency Transformerless Converter with Common-Mode Decoupling for the Interconnection of AC and DC Grids," IEEE Transactions on Power Electronics, vol. 34, No. 2, pp. 1317-1333, 2019.

F. M. Shah, H. M. Xiao, R. Li, M. Awais, G. Zhou, and G. T. Bitew, "Comparative performance evaluation of temperature dependent characteristics and power converter using GaN, SiC and Si power devices," in Proceedings—2018 IEEE 12th International Conference on Compatibility, Power Electronics and Power Engineering, CPE—Powereng 2018, vol. 2, IEEE, 2018, pp. 1-7, ISBN: 9781538625088.

F. Toso, P. G. Carlet, M. Preindl, and S. Bolognani, "Active-Flux-Based Motion-Sensorless Control of PMSM Using Moving Horizon Estimator," in 2018 IEEE 9th International Symposium on Sensorless Control for Electrical Drives, SLED 2018, IEEE, 2018, pp. 78-83, ISBN: 9781538644553.

F. Tourkhani and P. Viarouge, "Accurate analytical model of winding losses in round Litz wire windings," *IEEE Transactions on Magnetics*, vol. 37, No. 1, pp. 538-543, 2001.

G. Guo, Q. Song, W. Yang, Y. Wang, W. Liu, H. Rao, and S. Xu, "Application of Third-Order Harmonic Voltage Injection in a Modular Multilevel Converter," IEEE Transactions on Industrial Electronics, vol. 65, No. 7, pp. 5260-5271, 2018.

G. Hua and F. C. Lee, "Soft-Switching Techniques in PWM Converters," *IEEE Transactions on Industrial Electronics*, vol. 42, No. 6, pp. 595-603, 1995.

G. Lu and P. Zhang, "A Novel Leakage-Current-Based Online Insulation Monitoring Strategy for Converter Transformers Using Common-Mode and Differential-Mode Harmonics in VSC System," IEEE Transactions on Industrial Electronics, vol. 68, No. 2, pp. 1636-1645, 2021.

G. Ma, W. Qu, G. Yu, Y. Liu, N. Liang and W. Li, "A Zero-Voltage-Switching Bidirectional DC-DC Converter With State Analysis and Soft-Switching-Oriented Design Consideration," in IEEE Transactions on Industrial Electronics, vol. 56, No. 6, pp. 2174-2184, Jun. 2009, doi: 10.1109/TIE.2009.2017566.

G. R. Chandra Mouli, J. Schijffelen, M. van den Heuvel, M. Kardolus and p. Bauer, "A 10 kW Solar-Powered Bidirectional EV Charger Compatible With Chademo and COMBO," in IEEE Transactions on Power Electronics, vol. 34, No. 2, pp. 1082-1098, Feb. 2019, doi: 10.1109/TPEL.2018.2829211.

(56)        References Cited

OTHER PUBLICATIONS

G. Shen, D. Xu, L. Cao, and X. Zhu, "An improved control strategy for grid-connected voltage source inverters with an LCL filter," IEEE Transactions on Power Electronics, vol. 23, No. 4, pp. 1899-1906, 2008.

G. Weiss, "Preservation of Controllability of Single-Input Time-Varying Linear Systems Under Sampling," IEEE Transactions on Automatic Control, vol. 50, No. 12, pp. 2094-2096, 2005.

Gibong Son and Qiang Li. Control techniques for crm-based highfrequency soft-switching three-phase inverter under unbalanced grid conditions. IEEE Transactions on Power Electronics, 37(6):6613-6624, 2022.

H. Akagi and S. Tamura, "A passive EMI filter for eliminating both bearing current and ground leakage current from an inverter-driven motor," IEEE Trans. Power Electron., vol. 21, No. 5, pp. 1459-1468, 2006.

H. Akagi and T. Doumoto, "An approach to eliminating highfrequency shaft voltage and ground leakage current from an inverterdriven motor," IEEE Transactions on Industry Applications, vol. 40, No. 4, pp. 1162-1169, 2004.

H. Ayano, K. Murakami, and Y. Matsui, "A Novel Technique for Reducing Leakage Current by Application of Zero-Sequence Voltage," IEEE Trans. Ind. Appl., vol. 51, No. 4, pp. 3094-3100, 2015.

H. L. Ginn, N. Hingorani, J. R. Sullivan, and R. Wachal, "Control Architecture for High Power Electronics Converters," Proceedings of the IEEE, vol. 103, No. 12, pp. 2312-2319, 2015.

H. O. Jimenez, "Ac Resistance Evaluation of Foil, Round and Litz Conductors in Magnetic Components," pp. 1-58, 2013.

H. T. Nguyen and J. W. Jung, "Finite control set model predictive control to guarantee stability and robustness for surface-mounted PM synchronous motors," IEEE Transactions on Industrial Electronics, vol. 65, No. 11, pp. 8510-8519, 2018.

H. Wang and F. Blaabjerg, "Reliability of capacitors for DC-link applications in power electronic converters—an overview," IEEE Trans. Ind. Appl., vol. 50, No. 5, pp. 3569-3578, 2014.

H.-C. Chang and C.-M. Liaw, "Development of a compact switched reluctance motor drive for EV propulsion with voltage-boosting and PFC charging capabilities," IEEE Transactions on Vehicular Technology, vol. 58, No. 7, pp. 3198-3215, 2009.

He Li, Xuan Zhang, Zhengda Zhang, Chengcheng Yao, Feng Qi, Boxue Hu, Jin Wang, and Liming Liu. Design of a 10 kw gan-based high power density three-phase inverter. In 2016 IEEE Energy Conversion Congress and Exposition (ECCE), pp. 1-8, 2016.

I. Lope, C. Carretero, J. Acero, J. M. Burdio, and R. Alonso, "Printed circuit board implementation of small inductors for domestic induction heating applications using a planar litz wire structure," Conference Proceedings—IEEE Applied Power Electronics Conference and Exposition—APEC, pp. 2402-2407, 2013.

I. Subotic, N. Bodo, and E. Levi, "Integration of Six-Phase EV Drivetrains into Battery Charging Process with Direct Grid Connection," IEEE Transactions on Energy Conversion, vol. 32, No. 3, pp. 1012-1022, 2017.

I. Subotic, N. Bodo, E. Levi, and M. Jones, "Onboard Integrated Battery Charger for EVs Using an Asymmetrical Nine-Phase Machine," IEEE Transactions on Industrial Electronics, vol. 62, No. 5, pp. 3285-3295, 2015.

J. A. Carr, B. Rowden and J. Carlos Balda, "A Three-Level Full-Bridge Zero-Voltage Zero-Current Switching Converter With a Simplified Switching Scheme," in IEEE Transactions on Power Electronics, vol. 24, No. 2, pp. 329-338, Feb. 2009, doi: 10.1109/TPEL.2008.2007211.

J. Ahola, A. Muetze, M. Niemelä, and A. Romanenko, "Normalization-based approach to electric motor BVR related capacitances computation," IEEE Trans. Ind. Appl., vol. 55, No. 3, pp. 2770-2780, 2019.

J. Bocker, B. Freudenberg, A. The, and S. Dieckerhoff, "Experimental comparison of model predictive control and cascaded control of the modular multilevel converter," IEEE Transactions on Power Electronics, vol. 30, No. 1, pp. 422-430, 2015.

J. Biela, U. Badstuebner, and J. W. Kolar, "Impact of Power Density Maximization on Efficiency of DC-DC Converter Systems," IEEE Transactions on Power Electronics, vol. 24, No. 1, pp. 288-300, 2009.

J. Colmenares, D.-P. Sadik, P. Hilber, and H.-P. Nee, "Reliability analysis of a high-efficiency SiC three-phase inverter," IEEE J. Emerg. Sel. Top. Power Electron., vol. 4, No. 3, pp. 996-1006, 2016.

J. Fang, G. Xiao, X. Yang, and Y. Tang, "Parameter Design of a Novel Series-Parallel-Resonant LCL Filter for Single-Phase Half-Bridge Active Power Filters," IEEE Transactions on Power Electronics, vol. 32, No. 1, pp. 200-217, 2017.

J. K. Park, T. R. Wellawatta, S. J. Choi, and J. Hur, "Mitigation Method of the Shaft Voltage According to Parasitic Capacitance of the PMSM," IEEE Transactions on Industry Applications, vol. 53, No. 5, pp. 4441-4449, 2017.

J. Kalaiselvi and S. Srinivas, "Bearing currents and shaft voltage reduction in dual-inverter-fed open-end winding induction motor with reduced CMV PWM methods," IEEE Trans. Ind. Electron., vol. 62, No. 1, pp. 144-152, 2015.

J. Kukkola and M. Hinkkanen, "Observer-based state-space current control for a threephase grid-connected converter equipped with an LCL filter," IEEE Transactions on Industry Applications, vol. 50, No. 4, pp. 2700-2709, 2014.

J. Reinert, A. Brockmeyer, and R. W. De Doncker, "Calculation of losses in ferro- and ferrimagnetic materials based on the modified Steinmetz equation," IEEE Transactions on Industry Applications, vol. 37, No. 4, pp. 1055-1061, 2001.

J. Samanes, E. Gubia, X. Juankorena, and C. Girones, "Common-Mode and Phase-To-Ground Voltage Reduction in Back-To-Back Power Converters with Discontinuous PWM," IEEE Transactions on Industrial Electronics, vol. 67, No. 9, pp. 7499-7508, 2020.

J. Shao, Z. Deng, and Y. Gu, "Fault-Tolerant Control of Position Signals for Switched Reluctance Motor Drives," IEEE Trans. Ind. Appl., vol. 53, No. 3, pp. 2959-2966, 2017.

J. Yu, L. Li, J. Zhang, L. Pei, and L. Zhang, "Co-analysis of electromagnetic loss of the high speed PMSM driven by the PWM inverter," in 19th International Conference on Electrical Machines and Systems, ICEMS 2016, No. 92. The Institute of Electrical Engineers of Japan, 2017, pp. 8-12.

L. De Sousa and H. Dogan, "Method of evaluating the zero-sequence inductance ratio for electrical machines," in Proc. 2011 14th Eur. Conf. Power Electron. Appl. EPE 2011, 2011, pp. 1-10.

L. Guo, Z. Xu, Y. Li, Y. Chen, N. Jin and F. Lu, "An Inductance Online Identification-Based Model Predictive Control Method for Grid-Connected Inverters With an Improved Phase-Locked Loop," in IEEE Transactions on Transportation Electrification, vol. 8, No. 2, pp. 2695-2709, Jun. 2022, doi: 10.1109/TTE.2021.3135326.

L. Xie, X. Ruan, H. Zhu, and Y. K. Lo, "Common-Mode Voltage Cancellation for Reducing the Common-Mode Noise in DC-DC Converters," IEEE Transactions on Industrial Electronics, vol. 68, No. 5, pp. 3887-3897, 2021.

L. Zhang, K. Sun, Y. Xing, and M. Xing, "H6 transformerless fullbridge PV grid-tied inverters," IEEE Transactions on Power Electronics, vol. 29, No. 3, pp. 1229-1238, 2014.

L. Zhou and M. Preindl, "Bidirectional Transformerless EV Charging System via Reconfiguration of 4×4 Drivetrain," in 2018 IEEE Energy Conversion Congress and Exposition, ECCE 2018, 2018, pp. 3923-3927.

L. Zhou and M. Preindl, "Variable-Switching Constant-Sampling Frequency Critical Soft Switching MPC for DC/DC Converters," in IEEE Transactions on Energy Conversion, vol. 36, No. 2, pp. 1548-1561, Jun. 2021 DOI: 10.1109/TEC.2021.3058306.

L. Zhou, F. Gao, and T. Xu, "A Family of Neutral-Point-Clamped Circuits of Single-Phase PV Inverters: Generalized Principle and Implementation," IEEE Transactions on Power Electronics, vol. 32, No. 6, pp. 4307-4319, 2017.

L. Zhou, F. Gao, and T. Xu, "Implementation of Active NPC Circuits in Transformer-Less Single-Phase Inverter With Low Leakage Current," IEEE Transactions on Industry Applications, vol. 53, No. 6, pp. 5658-5667, 2017.

Lei Zhang, Yan Li, Yonglei Zhang, Xibo Yuan, Zijian Wang, and Zhe Li. A 100kw forced-air-cooled sic mosfet converter achieving a power density of 1.657kw/l and an efficiency over 98.5 In 2020

(56) References Cited

OTHER PUBLICATIONS

IEEE 9th International Power Electronics and Motion Control Conference (IPEMC2020-ECCE Asia), pp. 3443-3448, 2020.

L. Zhou and M. Preindl, "Optimal Tracking and Resonance Damping Design of Cascaded Modular Model Predictive Control for a Common-Mode Stabilized Grid-Tied LCL Inverter," in IEEE Transactions on Power Electronics, vol. 37, No. 8, pp. 9226-9240, Aug. 2022. DOI: 10.1109/TPEL.2022.3159599.

M. A. Bahmani, T. Thiringer, and H. Ortega, "An accurate Pseudoempirical model of winding loss calculation in HF foil and round conductors in switchmode magnetics," *IEEE Transactions on Power Electronics*, vol. 29, No. 8, pp. 4231-4246, 2014.

R. Guzman, L. G. de Vicuña, M. Castilla, J. Miret and H. Martín, "Variable Structure Control in Natural Frame for Three-Phase Grid-Connected Inverters With LCL Filter," in IEEE Transactions on Power Electronics, vol. 33, No. 5, pp. 4512-4522, May 2018 DOI: 10.1109/TPEL.2017.2723638.

M. Eull and M. Preindl, "Bidirectional three-level DC-DC converters: Sum-difference modeling and control," in *2017 IEEE Transp. Electrif. Conf. Expo*, 2017, pp. 573-578.

M. Eull, et al., "A stochastic optimization technique for discrete DC capacitor bank design," in 2017 IEEE Transportation Electrification Conference and Expo (ITEC), 2017, pp. 9-14.

M. Eull, M. Preindl, and A. Emadi, "Analysis and Design of a High Efficiency, High Power Density Three-Phase Silicon Carbide Inverter," in 2016 IEEE Transportation Electrification Conference and Expo (ITEC), 2016, pp. 1-6, ISBN: 9781509004034.

M. Eull, W. Wang, L. Zhou, and M. Preindl, "Zero Sequence Voltage Control Enabling Transformerless Electric Vehicle Chargers," in *2021 IEEE Transp. Electrif. Conf. Expo*, 2021, pp. 1-8.

M. G. Judewicz, S. A. Gonzalez, J. R. Fischer, J. F. Martinez, and D. O. Carrica, "Inverter-side current control of grid-connected voltage source inverters with LCL filter based on generalized predictive control," IEEE Journal of Emerging and Selected Topics in Power Electronics, vol. 6, No. 4, pp. 1732-1743, 2018.

M. Jaritz, A. Hillers, and J. Biela, "General Analytical Model for the Thermal Resistance of Windings Made of Solid or Litz Wire," *IEEE Transactions on Power Electronics*, vol. 34, No. 1, pp. 668-684, 2019.

M. Kriese, E. C. Wittek, S. Gattermann, H. Tischmacher, G. Poll, and B. Ponick, "Prediction of motor bearing currents for converter operation," in The XIX International Conference on electrical Machines—ICEM 2010, IEEE, 2010, pp. 1-6, ISBN: 9781424441754.

M. Nymand, U. K. Madawala, M. A. E. Andersen, B. Carsten, and O. S. Seiersen, "Reducing AC-Winding Losses in High-Current High-Power Inductors," in *2009 35th Annual Conference of IEEE Industrial Electronics*. IEEE, 2009, pp. 777-781.

M. Preindl, "Robust Control Invariant Sets and Lyapunov-Based MPC for IPM Synchronous Motor Drives," IEEE Transactions on Industrial Electronics, vol. 63, No. 6, pp. 3925-3933,2016.

Md Rishad Ahmed and Yun Li. A low-cost, high-power-density dcdc converter for hybrid and electric vehicle applications. In 2019 21$^{st}$ European Conference on Power Electronics and Applications (EPE '19 ECCE Europe), pp. P.1-P.8, 2019.

Mehdi Abbasi and John Lam. A bridgeless ac/dc high voltage gain converter with three-phase modular series-output connected configuration for mvdc grid applications. IEEE Transactions on Power Electronics, 35(10):10323-10337, 2020.

Michael Eull, Liwei Zhou, Matthew Jahnes, and Matthias Preindl. Bidirectional nonisolated fast charger integrated in the electric vehicle traction drivetrain. IEEE Transactions on Transportation Electrification, 8(1):180-195, 2022.

N. Oswald, P. Anthony, N. McNeill, and B. H. Stark, "An experimental investigation of the tradeoff between switching losses and EMI generation with hard-switched All-Si, Si-SiC, and All-SiC device combinations," IEEE Trans. Power Electron., vol. 29, No. 5, pp. 2393-2407, 2014.

P. A. Kyaw, M. Delhommais, J. Qiu, C. R. Sullivan, J. L. Schanen, and C. Rigaud, "Thermal modeling of inductor and transformer windings including litz wire," *IEEE Transactions on Power Electronics*, vol. 35, No. 1, pp. 867-881, 2020.

P. Kühl, M. Diehl, T. Kraus, J. P. Schlöder, and H. G. Bock, "A real-time algorithm for moving horizon state and parameter estimation," Computers and Chemical Engineering, vol. 35, No. 1, pp. 71-83, 2011.

P. Rehlaender, T. Grote, S. Tikhonov, H. Niejende, F. Schafmeister, J. Bocker, and P. Thiemann, "A PCB integrated winding using a litz structure for a wireless charging coil," *2019 21st European Conference on Power Electronics and Applications, EPE 2019 ECCE Europe*, pp. 1-9, 2019.

P. Wallmeier, "Improved analytical modeling of conductive losses in gapped high-frequency inductors," *IEEE Transactions on Industry Applications*, vol. 37, No. 4, pp. 1045-1054, 2001.

Q. Zhang, H. Hu, D. Zhang, X. Fang, Z. J. Shen and I. Bartarseh, "A Controlled-Type ZVS Technique Without Auxiliary Components for the Low Power DC/AC Inverter," in IEEE Transactions on Power Electronics, vol. 28, No. 7, pp. 3287-3296, Jul. 2013, doi: 10.1109/TPEL.2012.2225075.

R. A. Fantino, C. A. Busada, and J. A. Solsona, "Optimum PR Control Applied to LCL Filters with Low Resonance Frequency," IEEE Transactions on Power Electronics, vol. 33, No. 1, pp. 793-801, 2018.

R. Bosshard and J. W. Kolar, "All-SiC 9.5 kW/dm3 On-Board Power Electronics for 50 kW/85 kHz Automotive IPT System," in IEEE Journal of Emerging and Selected Topics in Power Electronics, vol. 5, No. 1, pp. 419-431, Mar. 2017, doi: 10.1109/JESTPE.2016.2624285.

R. Guzman, L. G. De Vicuna, A. Camacho, J. Miret, and J. M. Rey, "Receding-Horizon Model-Predictive Control for a Three-Phase VSI with an LCL Filter," IEEE Transactions on Industrial Electronics, vol. 66, No. 9, pp. 6671-6680, 2019.

R. Guzman, L. Garcia De Vicuna, J. Morales, M. Castilla, and J. Miret, "Model-Based Active Damping Control for Three-Phase Voltage Source Inverters with LCL Filter," IEEE Transactions on Power Electronics, vol. 32, No. 7, pp. 5637-5650, 2017.

R. k. Dhawan and P. J. Davis, "Fuzzy logic based inductor design program," *Conference Proceedings—IEEE Applied Power Electronics Conference and Exposition—APEC*, vol. 2, No. X, pp. 579-584, 1997.

R. Pena-Alzola, M. Liserre, F. Blaabjerg, M. Ordonez, and Y. Yang, "LCL-filter design for robust active damping in grid-connected converters," IEEE Transactions on Industrial Informatics, vol. 10, No. 4, pp. 2192-2203, 2014.

R. Pittini, Z. Zhang, and M. A. Andersen, "High current planarmagnetics for high efficiency bidirectional dc-dc converters for fuel cell applications," in *Conference Proceedings—IEEE Applied Power Electronics Conference and Exposition—APEC*. IEEE, 2014, pp. 2641-2648.

R. Ramachandran and M. Nymand, "Experimental Demonstration of a 98.8% Efficient Isolated DC-DC GaN Converter," IEEE Transactions on Industrial Electronics, vol. 64, No. 11, pp. 9104-9113, 2017.

R. Zhang, D. Zhang, and R. Dutta, "Study on PCB Based Litz Wire Applications for Air-Core Inductor and Planar Transformer," *2019 9th International Conference on Power and Energy Systems, ICPES 2019*, 2019.

Ratil H. Ashique and Zainal Salam. A family of true zero voltage zero current switching (zvzcs) nonisolated bidirectional dc-dc converter with wide soft switching range. IEEE Transactions on Industrial Electronics, 64(7):5416-5427, 2017.

Roman Bosshard and Johann W. Kolar. All-sic 9.5 kw/dm!sup.3!/sup. on-board power electronics for 50 kw/85 khz automotive ipt system. IEEE Journal of Emerging and Selected Topics in Power Electronics, 5(1):419-431, 2017.

S. Albatran, A. R. A. Khalaileh, and A. S. Allabadi, "Minimizing Total Harmonic Distortion of a Two-Level Voltage Source Inverter Using Optimal Third Harmonic Injection," IEEE Transactions on Power Electronics, vol. 35, No. 3, pp. 3287-3297, 2020.

S. Albatran, A. S. Allabadi, A. R. A. Khalaileh, and Y. Fu, "Improving the Performance of a Two-Level Voltage Source Inverter in the Overmodulation Region Using Adaptive Optimal Third Harmonic

(56) References Cited

OTHER PUBLICATIONS

Injection Pulsewidth Modulation Schemes," IEEE Transactions on Power Electronics, vol. 36, No. 1, pp. 1092-1103, 2021.

S. Bhattacharya, L. Resta, D. M. Divan, and D. W. Novotny, "Experimental comparison of motor bearing currents with PWM hard- and soft-switched voltage-source inverters," *IEEE Trans. Power Electron.*, vol. 14, No. 3, pp. 552-562, 1999.

S. C. Ferreira, R. B. Gonzatti, R. R. Pereira, C. H. da Silva, L. E. B. da Silva and G. Lambert-Torres, "Finite Control Set Model Predictive Control for Dynamic Reactive Power Compensation With Hybrid Active Power Filters," in IEEE Transactions on Industrial Electronics, vol. 65, No. 3, pp. 2608-2617, Mar. 2018, doi: 10.1109/TIE.2017.2740819.

S. Chen, T. A. Lipo, and D. Fitzgerald, "Source of Induction Motor Bearing Currents Caused by PWM Inverters," IEEE Transactions on Energy Conversion, vol. 11, No. 1, pp. 25-32, 1996.

S. Haghbin, K. Khan, S. Zhao, M. Alaküla, S. Lundmark, and O. Carlson, "An integrated 20-kW motor drive and isolated battery charger for plug-in vehicles," *IEEE Transactions on Power Electronics*, vol. 28, No. 8, pp. 4013-4029, 2013.

S. Haghbin, S. Lundmark, M. Alaküla, and O. Carlson, "An isolated high-power integrated charger in electrified-vehicle applications," IEEE Transactions on Vehicular Technology, vol. 60, No. 9, pp. 4115-4126, 2011.

S. Jiang, Y. Liu, W. Liang, J. Peng and H. Jiang, "Active EMI Filter Design With a Modified LCL-LC Filter for Single-Phase Grid-Connected Inverter in Vehicle-to-Grid Application," in IEEE Transactions on Vehicular Technology, vol. 68, No. 11, p. 10639-10650, Nov. 2019, doi: 10.1109/TVT.2019.2944220.

S. Lee and S. H. Lee, "Dq Synchronous Reference Frame Model of A Series-Series Tuned Inductive Power Transfer System," IEEE Transactions on Industrial Electronics, vol. 67, No. 12, pp. 10 325-10 334, 2020.

S. Loudot, B. Briane, O. Ploix, and A. Villeneuve, "Fast Charging Device for an Electric Vehicle. US 2012/028674.0 A1," 2012.

S. M. Tayebi and I. Batarseh, "Analysis and Optimization of Variable-Frequency Soft-Switching Peak Current Mode Control Techniques for Microinverters," in IEEE Transactions on Power Electronics, vol. 33, No. 2, pp. 1644-1653, Feb. 2018, doi: 10.1109/TPEL.2017.2676097.

S. Nalakath, M. Preindl, and A. Emadi, "Online multi-parameter estimation of interior permanent magnet motor drives with finite control set model predictive control," IET Electric Power Applications, vol. 11, No. 5, pp. 944-951, 2017.

S. Q. Ali, D. Mascarella, G. Joos, and L. Tan, "Torque cancelation of integrated battery charger based on six-phase permanent magnet synchronous motor drives for electric vehicles," *IEEE Transactions on Transportation Electrification*, vol. 4, No. 2, pp. 344-354, 2018.

S. R. Mohapatra and V. Agarwal, "Model Predictive Controller With Reduced Complexity for Grid-Tied Multilevel Inverters," IEEE Transactions on Industrial Electronics, vol. 66, No. 11, pp. 8851-8855, 2019.

S. Sharma, M. V. Aware, and A. Bhowate, "Integrated Battery Charger for EV by Using Three-Phase Induction Motor Stator Windings as Filter," *IEEE Transactions on Transportation Electrification*, vol. 6, No. 1, pp. 83-94, 2020.

S. Shimokawa, H. Oshima, K. Shimizu, Y. Uehara, J. Fujisaki, A. Furuya, and H. Igarashi, "Fast three-dimensional optimization of magnetic cores for loss and volume reduction," *2018 IEEE International Magnetic Conference, INTERMAG 2018*, vol. 54, No. 11, 2018.

S. Thomsen, N. Hoffmann, and F. W. Fuchs, "PI control, PI-based state space control, and model-based predictive control for drive systems with elastically coupled loads—A comparative study," IEEE Transactions on Industrial Electronics, vol. 58, No. 8, pp. 3647-3657, 2011.

S. Vazquez, J. Rodriguez, M. Rivera, L. G. Franquelo, and M. Norambuena, "Model Predictive Control for Power Converters and Drives: Advances and Trends," IEEE Transactions on Industrial Electronics, vol. 64, No. 2, pp. 935-947, 2017.

S. Wang, M. A. de Rooij, W. G. Odendaal, J. D. van Wyk, and D. Boroyevich, "Reduction of high-frequency conduction losses using a planar litz structure," *IEEE Transactions on Power Electronics*, vol. 20, No. 2, pp. 261-267, 2005.

S.-J. Chee, S. Ko, H.-S. Kim, and S.-K. Sul, "Common-mode voltage reduction of three-level four-leg pwm converter," IEEE Transactions on Industry Applications, vol. 51, No. 5, pp. 4006-4016, 2015.

Sivanagaraju Gangavarapu, Akshay Kumar Rathore, and Deepak M. Fulwani. Three-phase single-stage-isolated cuk-based pfc converter. IEEE Transactions on Power Electronics, 34(2):1798-1808, 2019.

T. Dragicevic, "Model predictive control of power converters for robust and fast operation of ac microgrids," IEEE Transactions on Power Electronics, vol. 33, No. 7, pp. 6304-6317, 2018.

T. Dragičević, C. Zheng, J. Rodriguez and F. Blaabjerg, "Robust Quasi-Predictive Control of LCL-Filtered Grid Converters," in IEEE Transactions on Power Electronics, vol. 35, No. 2, pp. 1934-1946, Feb. 2020 DOI: 10.1109/TPEL.2019.2916604.

T. F. Wu, M. Misra, L. C. Lin, and C. W. Hsu, "An improved resonant frequency based systematic LCL filter design method for grid-connected inverter," IEEE Transactions on Industrial Electronics, vol. 64, No. 8, pp. 6412-6421, 2017.

T. Guillod, P. Papamanolis, and J. W. Kolar, "Artificial Neural Network (ANN) Based Fast and Accurate Inductor Modeling and Design," *IEEE Open Journal of Power Electronics*, vol. 1, No. July, pp. 284-299, 2020.

T. Liu, J. Liu, Z. Liu, and Z. Liu, "A study of virtual resistor-based active damping alternatives for LCL resonance in grid-connected voltage source inverters," IEEE Transactions on Power Electronics, vol. 35, No. 1, pp. 247-262, 2020.

T. M. Blooming and D. J. Carnovale, "Application of IEEE STD 519-1992 harmonic limits," Conference Record of 2006 Annual Pulp and Paper Industry Technical Conference, pp. 1-9, 2006.

T. Mishima, Y. Takeuchi and M. Nakaoka, "Analysis, Design, and Performance Evaluations of an Edge-Resonant Switched Capacitor Cell-Assisted Soft-Switching PWM Boost DC-DC Converter and Its Interleaved Topology," in IEEE Transactions on Power Electronics, vol. 28, No. 7, pp. 3363-3378, Jul. 2013, doi: 10.1109/TPEL.2012.2227504.

T. Plazenet, T. Boileau, C. Caironi, and B. Nahid-Mobarakeh, "A Comprehensive Study on Shaft Voltages and Bearing Currents in Rotating Machines," *IEEE Trans. Ind. Appl.*, vol. 54, No. 4, pp. 3749-3759, 2018.

T. Plazenet, T. Boileau, C. Caironi and B. Nahid-Mobarakeh, "Influencing Parameters on Discharge Bearing Currents in Inverter-Fed Induction Motors," in IEEE Transactions on Energy Conversion, vol. 36, No. 2, pp. 940-949, Jun. 2021. DOI: 10.1109/TEC.2020.3018630.

TingTing Song and Nianci Huang, "A novel zero-Voltage and zero-current-switching full-bridge PWM converter," in IEEE Transactions on Power Electronics, vol. 20, No. 2, pp. 286-291, Mar. 2005, doi: 10.1109/TPEL.2004.843016.

Tomokazu Mishima and Shoya Mitsui. A single-stage high frequencylink modular three-phase soft-switching ac-dc converter for ev battery charger. In 2019 IEEE Energy Conversion Congress and Exposition (ECCE), pp. 2141-2147, 2019.

W. Chen, P. Rong, and Z. Lu, "Snubberless Bidirectional DC-DC Converter With New CLLC Resonant Tank Featuring Minimized Switching Loss," *IEEE Transactions on Industrial Electronics*, vol. 57, No. 9, pp. 3075-3086, 2009.

W. K. Mo, K. M. Paasch and T. Ebel, "Parasitic couplings of 3 phase EMI filter design for 1kW 3 phase boost converter," 2019 21st European Conference on Power Electronics and Applications (EPE '19 ECCE Europe), Genova, Italy, 2019, pp. P.1-P.10, doi: 10.23919/EPE.2019.8915428.

W. Lhomme, P. Delarue, T. J. D. S. Moraes, N. K. Nguyen, E. Semail, K. Chen, and B. Silvestre, "Integrated Traction/Charge/Air Compression Supply Using Three-Phase Split-Windings Motor for Electric Vehicles," *IEEE Transactions on Power Electronics*, vol. 33, No. 11, pp. 10 003-10 012, 2018.

W. Li, Y. Gu, H. Luo, W. Cui, X. He, and C. Xia, "Topology review and derivation methodology of single-phase transformerless photovoltaic

(56) References Cited

OTHER PUBLICATIONS inverters for leakage current suppression," *IEEE Trans. Ind. Electron.*, vol. 62, No. 7, pp. 4537-4551, 2015.

W. Wang, L. Zhou, M. Eull, G. Cen, and M. Preindl, "Comparison of Litz Wire and PCB Inductor Designs for Bidirectional Transformerless EV Charger with High Efficiency," in 2021 IEEE Transportation Electrification Conference and Expo (ITEC), 2021, pp. 1-8.

W. Yao, Y. Yang, X. Zhang, F. Blaabjerg, and p. C. Loh, "Design and Analysis of Robust Active Damping for LCL Filters Using Digital Notch Filters," IEEE Transactions on Power Electronics, vol. 32, No. 3, pp. 2360-2375, 2017.

W. Yu, J.-S. Lai and S.-Y. Park, "An Improved Zero-Voltage Switching Inverter Using Two Coupled Magnetics in One Resonant Pole," in IEEE Transactions on Power Electronics, vol. 25, No. 4, pp. 952-961, Apr. 2010, doi: 10.1109/TPEL.2009.2030197.

X. Chen, W. Wu, N. Gao, H. S.-H. Chung, M. Liserre, and F. Blaabjerg, "Finite control set model predictive control for lcl-filtered gridtied inverter with minimum sensors," IEEE Transactions on Industrial Electronics, vol. 67, No. 12, pp. 9980-9990, 2020.

X. Guo, R. He, J. Jian, Z. Lu, X. Sun, and J. M. Guerrero, "Leakage current elimination of four-leg inverter for transformerless three-phase pv systems," IEEE Transactions on Power Electronics, vol. 31, No. 3, pp. 1841-1846, 2016.

X. Shu, Y. Guo, W. Yang, K. Wei, Y. Zhu, and H. Zou, "A Detailed Reliability Study of the Motor System in Pure Electric Vans by the Approach of Fault Tree Analysis," *IEEE Access*, vol. 8, pp. 5295-5307, 2020.

Y. Cheng, Y. Sun, X. Li, H. Dan, J. Lin, and M. Su, "Active Common-Mode Voltage-Based Open-Switch Fault Diagnosis of Inverters in IMDrive Systems," IEEE Transactions on Industrial Electronics, vol. 68, No. 1, pp. 103-115, 2021.

Y. Hu, X. Zhang, W. Mao, T. Zhao, F. Wang, and Z. Dai, "An Optimized Third Harmonic Injection Method for Reducing DC-Link Voltage Fluctuation and Alleviating Power Imbalance of Three-Phase Cascaded H-Bridge Photovoltaic Inverter," IEEE Transactions on Industrial Electronics, vol. 67, No. 4, pp. 2488-2498, 2020.

Y. Liu et al., "Evaluation on filter topologies in high power density converter design for power quality and EMI control," 2015 Asia-Pacific Symposium on Electromagnetic Compatibility (APEMC), Taipei, Taiwan, 2015, pp. 20-23, doi: 10.1109/APEMC.2015. 7175326.

Y. Qiu, H. Liu, and X. Chen, "Digital average current-mode control of Pwm Dc-Dc converters without current sensors," IEEE Transactions on Industrial Electronics, vol. 57, No. 5, pp. 1670-1677, 2010.

Y. Song and B. Wang, "Survey on reliability of power electronic systems," *IEEE Trans. Power Electron.*, vol. 28, No. 1, pp. 591-604, 2013.

Y.-T. Chen, S.-M. Shiu and R.-H. Liang, "Analysis and Design of a Zero-Voltage-Switching and Zero-Current-Switching Interleaved Boost Converter," in IEEE Transactions on Power Electronics, vol. 27, No. 1, pp. 161-173, Jan. 2012, doi: 10.1109/TPEL.2011. 2157939.

Y. Tang, W. Yao, P. C. Loh, and F. Blaabjerg, "Design of LCL Filters with LCL Resonance Frequencies beyond the Nyquist Frequency for Grid-Connected Converters," IEEE Journal of Emerging and Selected Topics in Power Electronics, vol. 4, No. 1, pp. 3-14, 2016.

Y. Tang, W. Yao, P. C. Loh, and F. Blaabjerg, "Highly Reliable Transformerless Photovoltaic Inverters with Leakage Current and Pulsating Power Elimination," IEEE Transactions on Industrial Electronics, vol. 63, No. 2, pp. 1016-1026, 2016.

Y. Xiao, C. Liu, and F. Yu, "An Effective Charging-Torque Elimination Method for Six-Phase Integrated On-Board EV Chargers," IEEE Transactions on Power Electronics, vol. 35, No. 3, pp. 2776-2786, 2020.

Y. Xiao, C. Liu, and F. Yu, "An integrated on-board EV charger with safe charging operation for three-phase IPM Motor," IEEE Transactions on Industrial Electronics, vol. 66, No. 10, pp. 7551-7560, 2019.

Y. Xu, Y. He, H. Li and H. Xiao, "Model Predictive Control Using Joint Voltage Vector for Quasi-Z-Source Inverter With Ability of Suppressing Current Ripple," in IEEE Journal of Emerging and Selected Topics in Power Electronics, vol. 10, No. 1, pp. 1108-1124, Feb. 2022, doi: 10.1109/JESTPE.2021.3106048.

Yanjun Shi, Lu Wang, Ren Xie, and Hui Li. Design and implementation of a 100 kw sic filter-less pv inverter with 5 kw/kg power density and 99.2 In 2018 IEEE Applied Power Electronics Conference and Exposition (APEC), pp. 393-398, 2018.

Yanjun Shi, Lu Wang, Ren Xie, Yuxiang Shi, and Hui Li. A 60-kw 3-kw/kg five-level t-type sic pv inverter with 99.2% peak efficiency. IEEE Transactions on Industrial Electronics, 64(11):9144-9154, 2017.

Z. Xin, P. Mattavelli, W. Yao, Y. Yang, F. Blaabjerg, and P. C. Loh, "Mitigation of Grid-Current Distortion for LCL-Filtered Voltage-Source Inverter with Inverter-Current Feedback Control," IEEE Transactions on Power Electronics, vol. 33, No. 7, pp. 6248-6261, 2018.

* cited by examiner

300

*CHARGING MODE*

350
EV Chassis

300

*TRACTION MODE*

350
EV Chassis

Triangular Space Vector Injection (Tri-RTHI)

VTH1

Vbase

V3rd,tri

Sinusoidal Third Harmonic Injection (Sin-THI)

VTH1

Vbase

V3rd,sin

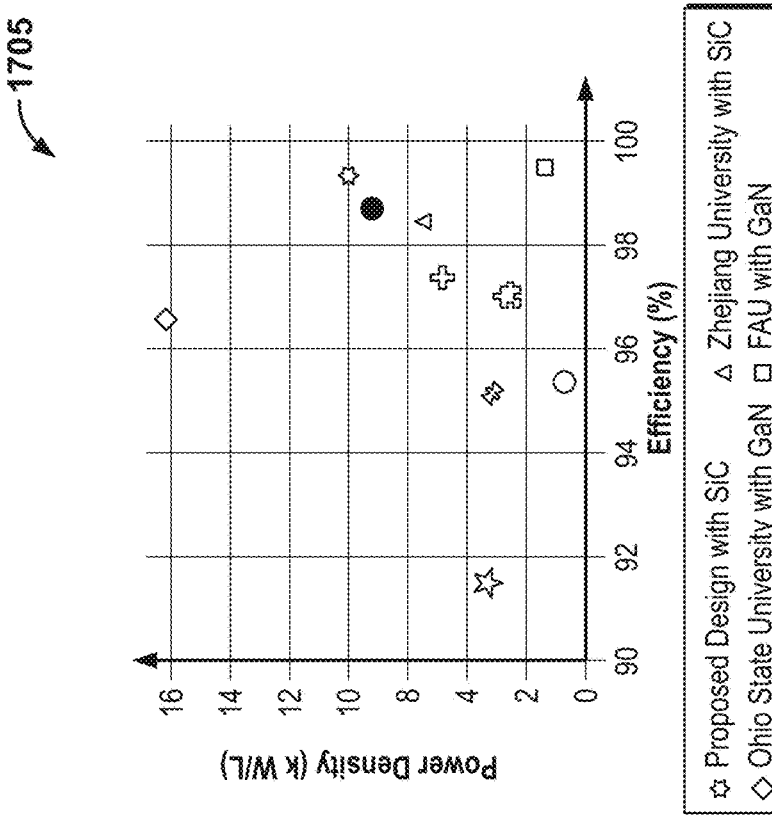

(b) Efficiency-Power Density.

☆ Proposed Design with SiC  △ Zhejiang University with SiC
◇ Ohio State University with GaN  □ FAU with GaN
● ETH with SiC  ○ DUT with SiC
✚ Vegitia Tech with SiC  ☆ Kobe University
✿ Concordia University  ✿ York University

(a) Power-Frequency.

☆ Proposed Design with SiC  △ Zhejiang University with SiC
◇ Ohio State University with GaN  □ FAU with GaN
● ETH with SiC  ○ DUT with SiC
✚ Vegitia Tech with SiC  ☆ Kobe University
✿ Concordia University  ✿ York University 2000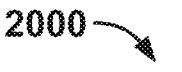

2005

Receive Input Power, By an N-phase Power
Converter Stage, from an Alternating Current
(AC) Side or a Direct Current (DC) Side, with N ≥ 1;

2010

Filter, By an N-phase LC Filter Comprising One or
More Capacitors, At the AC Side of the N-phase
Power Converter Stage, Wherein Respective One or
More Neutral Points of the One or More Capacitors
are Electrically Connected to a DC Negative
Terminal of a DC Source

2015

Drive, By a Control System, Power Switching
Elements of the N-phase Power Converter Stage to
Convert the Input Power and to Output Converted
Power, the Control System Configured to Drive the
Power Switching Elements Using Variable
Frequency Soft Switching at a Frequency of At
Least 20 Khz

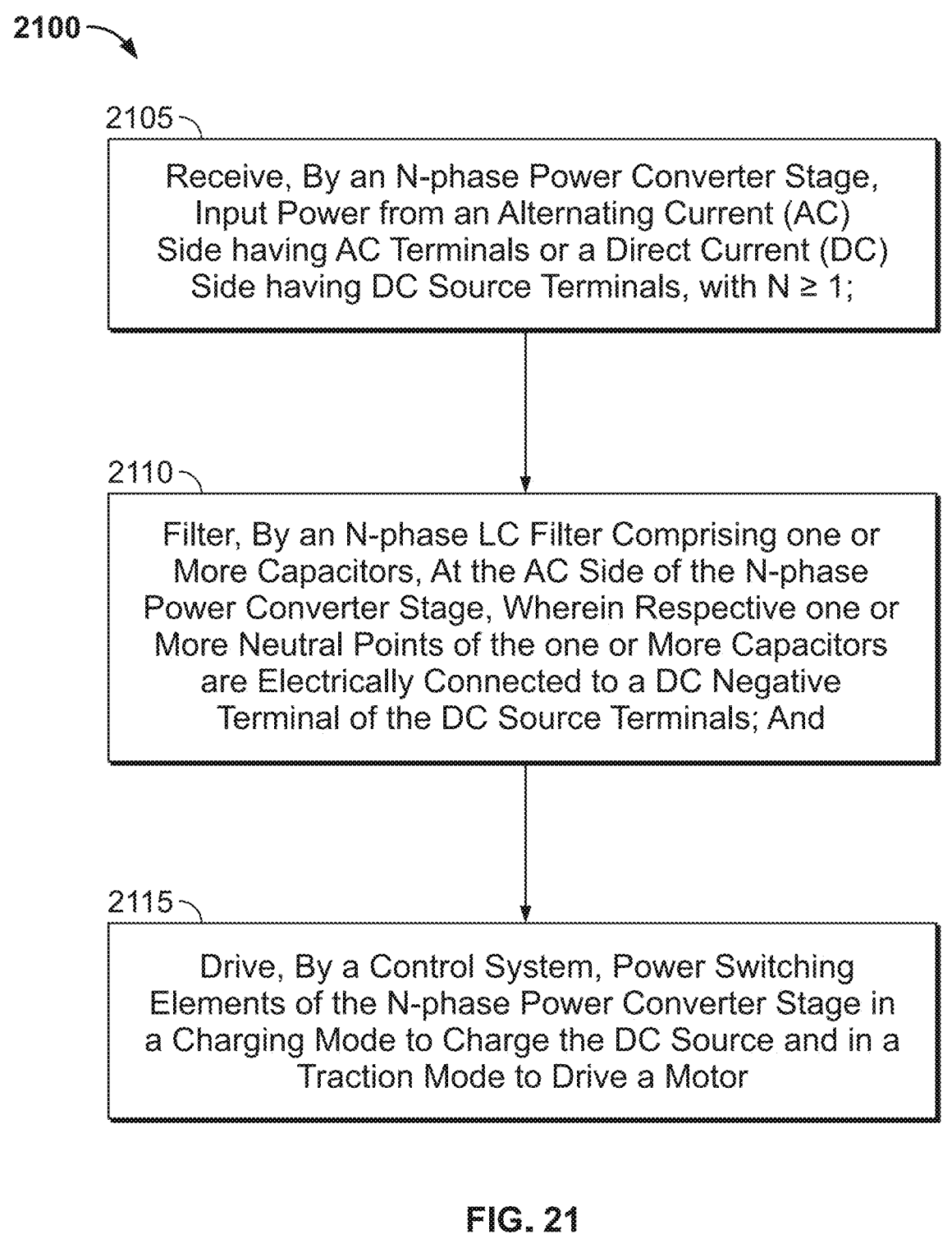

Receive, By an N-phase Power Converter Stage, Input Power from an Alternating Current (AC) Side having AC Terminals or a Direct Current (DC) Side having DC Source Terminals, with N ≥ 1;

2110

Filter, By an N-phase LC Filter Comprising one or More Capacitors, At the AC Side of the N-phase Power Converter Stage, Wherein Respective one or More Neutral Points of the one or More Capacitors are Electrically Connected to a DC Negative Terminal of the DC Source Terminals; And

2115

Drive, By a Control System, Power Switching Elements of the N-phase Power Converter Stage in a Charging Mode to Charge the DC Source and in a Traction Mode to Drive a Motor

FIG. 21

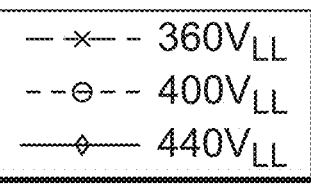
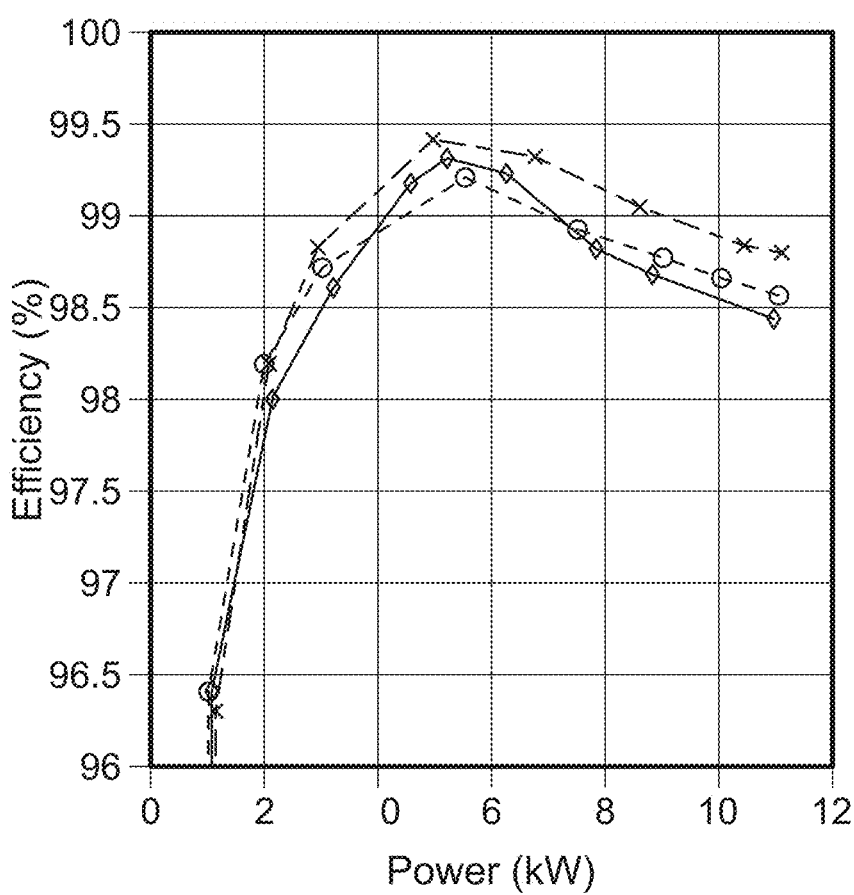
FIG. 23

2400

2500

2700

SYSTEMS AND METHODS FOR CONTROL OF NONISOLATED BIDIRECTIONAL POWER CONVERTERS

CROSS-REFERENCE TO RELATED APPLICATIONS

This application represents the U.S. national stage entry of International Application No. PCT/US2022/038561 filed Jul. 27, 2022, which claims priority to U.S. Provisional Application No. 63/226,136, filed on Jul. 27, 2021, U.S. Provisional Application No. 63/242,840, filed on Sep. 10, 2021, U.S. Provisional Application No. 63/345,896, filed May 25, 2022, U.S. Provisional Application No. 63/351,768, filed on Jun. 13, 2022, U.S. Provisional Application No. 63/226,059, filed Jul. 27, 2021, U.S. Provisional Application No. 63/270,311, filed Oct. 21, 2021, and U.S. Provisional Application No. 63/319,122, filed Mar. 11, 2022, each of which is hereby incorporated by reference in its entirety.

STATEMENT REGARDING FEDERALLY SPONSORED RESEARCH

This invention was made with government support under 1653574 awarded by the National Science Foundation. The government has certain rights in the invention.

BACKGROUND

Power converters of various types have been produced and used in many industries and contexts. Example power converters include alternating current (AC) to direct current (DC) rectifiers, DC to AC inverters, and DC to DC converters. AC to DC rectifiers, also referred to as AC/DC rectifiers, converter AC power to DC power. DC to AC inverters, also referred to as DC/AC inverters, convert DC power to AC power. Power converters can be used for various purposes, such as rectifying AC power from an AC grid power source to DC power for charging a battery, or inverting DC power from a battery to AC power to drive a motor or supply AC power to an AC grid. Further, power converters can be used in various contexts, such as in or connected to an electric vehicle, an engine generator, solar panels, and the like.

SUMMARY

Power converters may be described in terms of power conversion efficiency, power density, and cost, among other characteristics. Generally, it is desirable to have power converters with higher power efficiency, higher power density, and lower cost. A highly efficient power converter is able to convert power (e.g., AC to DC, DC to AC, and/or DC to DC) without significant losses in energy. A low efficiency power converter experiences higher losses in energy during the power conversion. Such energy losses may manifest as heat generated by the power converter while converting power, for example. Power efficiency for a power converter, inductor, or other electronic component may be expressed as a percentage between 0 and 100% and determined based on the power input to the component and the power output from the component using the equation:

$$\text{Power Efficiency} = \frac{\text{Power Out}}{\text{Power In}}.$$

A power converter with high power density has a high ratio of power output by the power converter compared to the physical space occupied by the power converter. The power density can be calculated using the equation:

$$\text{Power Density} = \frac{\text{Power Out}}{\text{Volume of Power Converter}}.$$

Energy costs, including monetary costs and environmental costs, continue to be an important factor across many industries that incorporate power converters. Accordingly, even slight increases (e.g., of tenths of a percent) in power efficiency for a power converter can be significant and highly desirable. Similarly, reductions in materials and size of power converters can be significant and highly desirable, allowing reductions in costs and physical space to accommodate power converters in systems that incorporate power converters.

In grid-connected power converter applications, such as electric vehicle (EV) chargers and photovoltaic (PV) power supplies, leakage current and DC bus utilization are factors that influence the performance. For the leakage current issue, a bulky line frequency transformer is typically installed to block the leakage path at the point of common coupling (PCC) which increases the cost, volume, and weight of the system. For the DC bus utilization, the DC bus voltage needs to be stepped up to be at least twice of the grid voltage amplitude to avoid saturation issue which brings extra switching losses and challenges to the switch voltage tolerance capability.

Bidirectional power converters may be used to both charge a DC source using AC power and drive AC motors using DC power from the DC source. Such power converters, when included in an electric vehicle, may also be referred to as an integrated charger. An integrated charger may both be used as a primary charging interface for a battery of the electric vehicle, and also as the traction inverter to drive a motor of the electric vehicle. By using a dual-purpose power converter, rather than separate charger converter and traction inverter, material costs and size may be reduced. However, relative to dedicated power converters, dual-purpose power converters add complexities in designing an efficient and effective converter for both charging and traction modes. Further, the design factors extend beyond efficiency concerns because, without proper design, power converters can reduce motor lifetime due to leakage currents and/or common mode voltages causing current spikes in one or more of the motor bearings, motor shaft, motor windings, and gear train that can damage and reduce the lifetime of these components, respectively.

Some embodiments disclosed herein address these or other issues. For example, some embodiments disclosed herein are directed to non-isolated power converters with one or more of (i) injection of a multiple of an N-th phase harmonic for zero sequence voltage control, (ii) a cascaded control system, (iii) model predictive control (MPC) for active damping to mitigate resonance, (iv) variable frequency critical soft switching (VFCSS), and (v) modular converter blocks. These features may be included in embodiments of a power converter independently or in any combination. For example, a power converter may include one of the above-noted features, any two of the above-noted features, any three of the above-noted features, any four of the above-noted features, or all five of the above-noted features. Additionally, in combination with any of these embodiments, the power converter may include at least one LC filter for each of the N phases of the power converter (where N≥1), where a capacitor of each LC filter is connected to a DC bus positive or negative terminal of the power converter and, in some cases, a further capacitor of each LC filter is connected to the other of the DC bus positive or negative terminal of the power converter. These capacitors of multiple phases having a common point connected to the DC bus positive or negative terminals create a bypassing path for zero sequence voltage control. The capacitor coupled to the DC bus positive terminal (an upper capacitor) may also reduce both EMI and the total ripple current handling requirements of the power converter without increasing the total capacitance or volume. In some embodiments disclosed herein, an additional drain-source capacitor ($C_{DS}$) is coupled across the drain and source terminals of the power switching elements, which can slow a voltage rise during an ON-to-OFF transition. This slowed voltage rise can, in turn, reduce the switching losses of the power switching elements.

Some embodiments disclosed herein include systems, methods, and other implementations (including hardware, software, and hybrid hardware/software implementations) directed to a modular model predictive control (MPC) method for a novel non-isolated N-phase DC/AC, for N≥1, converter with the capabilities of zero sequence voltage stabilization and, optionally, regulated common mode voltage injection (e.g., a third harmonic injection (THI) for a three-phase system, or any other multiple of harmonic) for the purpose of increasing the available fundamental frequency AC voltage magnitude for a given DC voltage. When N=1 or N=2, the DC/AC power converter is considered to be a single-phase system. When N=3, the power converter is a three-phase system, and when N>3, the power converter is referred to as a multiphase system. Although the description herein may focus on 3-phase system, the various implementations and features described are applicable to any number of phases.

This non-isolated topology is designed to connect the common point of three-phase LC filter capacitors and positive/negative DC bus terminals to bypass the zero-sequence leakage current. A zero-sequence voltage MPC controller stabilizes the zero-sequence capacitor voltage to be, in some embodiments, a constant of approximately half DC bus voltage. Thus, the leakage current flowing through the grid or other coupled elements is attenuated. Further, the regulated third harmonic voltage injection (THI) techniques disclosed herein improve the DC bus utilization. By adding the third harmonic to the zero-sequence voltage MPC reference, the stability and robustness are improved. Compared to traditional THI techniques, the grid connection power quality is improved because no extra harmonics are injected to the grid. Per-phase, explicit MPC simplifies the execution complexity on a controller (e.g., a digital signal processor (DSP)) and does not need to update the angular speed in the state space matrix, which allows for the MPC optimization offline. Compared with a traditional proportional integral (PI) controller, embodiments of the MPC controller disclosed herein provides power converter control with improved dynamic performance and control bandwidth with faster response.

The effective zero-sequence voltage control (through the LC filters and control schemes disclosed herein) also serves to reduce certain bearing currents, shaft currents, motor winding currents, gear train currents, and other currents that can potentially damage and reduce the life of motors and their components (bearings, shafts, wiring, etc.). For example, currents caused by high rates of change of voltage (dV/dt), especially at higher voltages (e.g., above 400 V, above or approaching 800 V, and levels between) can cause damage to motor bearings, motor shafts, motor windings (e.g., insulation may be damaged), and gear trains (e.g., bearing currents can propagate into the gear train via electromagnetic interference (EMI) or noise, vibration, harshness (NVH) resulting from the damaged bearing race walls).

In some examples, the power converter is driven using a variable frequency critical soft switching (VFCSS) scheme. The VFCSS scheme can provide improved efficiency and reduced filter volume (i.e., improved power density) for the power converter.

In some examples, the power converter is implemented through a combination of modular converter units or modules, also referred to as autoconverter modules (ACMs) that are coupled together like building blocks to form the power converter having desired specifications. Each ACM may include, for example, a circuit board having input and output connection terminals (e.g., to couple to other ACMs and a central controller), as well as a converter block including power switching elements and an LC filter (e.g., configured in a half bridge configuration).

In one embodiment, a non-isolated power converter system is provided. The system includes an N-phase power converter stage having to an alternating current (AC) side and a direct current (DC) side, with N≥1; an N-phase LC filter comprising one or more capacitors, wherein respective one or more neutral points of the one or more capacitors are electrically connected to a DC negative terminal of a DC source; and a control system configured to drive power switching elements of the N-phase power converter stage to convert received power and to output converted power, the control system configured to drive the power switching elements using variable frequency soft switching at a frequency of at least 20 KHz.

In one embodiment, a method for power conversion is provided. The method includes receiving input power, by an N-phase power converter stage, from an alternating current (AC) side or a direct current (DC) side, with N≥1; filtering, by an N-phase LC filter comprising one or more capacitors, at the AC side of the N-phase power converter stage, wherein respective one or more neutral points of the one or more capacitors are electrically connected to a DC negative terminal of a DC source; and driving, by a control system, power switching elements of the N-phase power converter stage to convert the input power and to output converted power, the control system configured to drive the power switching elements using variable frequency soft switching at a frequency of at least 20 KHz.

In one embodiment, a non-isolated power converter system for an electric vehicle is provided. The system includes an N-phase power converter stage having an alternating current (AC) side and a direct current (DC) side, with N≥1, wherein the DC side includes DC source terminals; an N-phase LCL filter comprising one or more capacitors, wherein respective one or more neutral points of the one or more capacitors are electrically connected to a negative DC terminal of the DC source terminals; and a control system configured to drive power switching elements of the N-phase power converter stage to: in a charging mode, convert input AC power received via AC terminals to output DC power provided to the DC source terminals to charge the DC source, and, in a traction mode, convert input DC power received via the DC source terminals to output AC power provided to the AC terminals to drive a motor.

In one embodiment, a method of converting power for an electric vehicle is provided. The method includes receiving, by an N-phase power converter stage, input power from an alternating current (AC) side having AC terminals or a direct current (DC) side having DC source terminals, with N≥1; filtering, by an N-phase LC filter comprising one or more capacitors, at the AC side of the N-phase power converter stage, wherein respective one or more neutral points of the one or more capacitors are electrically connected to a DC negative terminal of the DC source terminals; and driving, by a control system, power switching elements of the N-phase power converter stage to: in a charging mode, convert input AC power received via the AC terminals to output DC power provided to the DC source terminals to charge a DC source, and in a traction mode, convert input DC power received via the DC source terminals to output AC power provided to the AC terminals to drive a motor.

The foregoing and other aspects and advantages of the present disclosure will appear from the following description. In the description, reference is made to the accompanying drawings that form a part hereof, and in which there is shown by way of illustration one or more embodiment. These embodiments do not necessarily represent the full scope of the invention, however, and reference is therefore made to the claims and herein for interpreting the scope of the invention. Like reference numerals will be used to refer to like parts from Figure to Figure in the following description.

6

Figure 14:
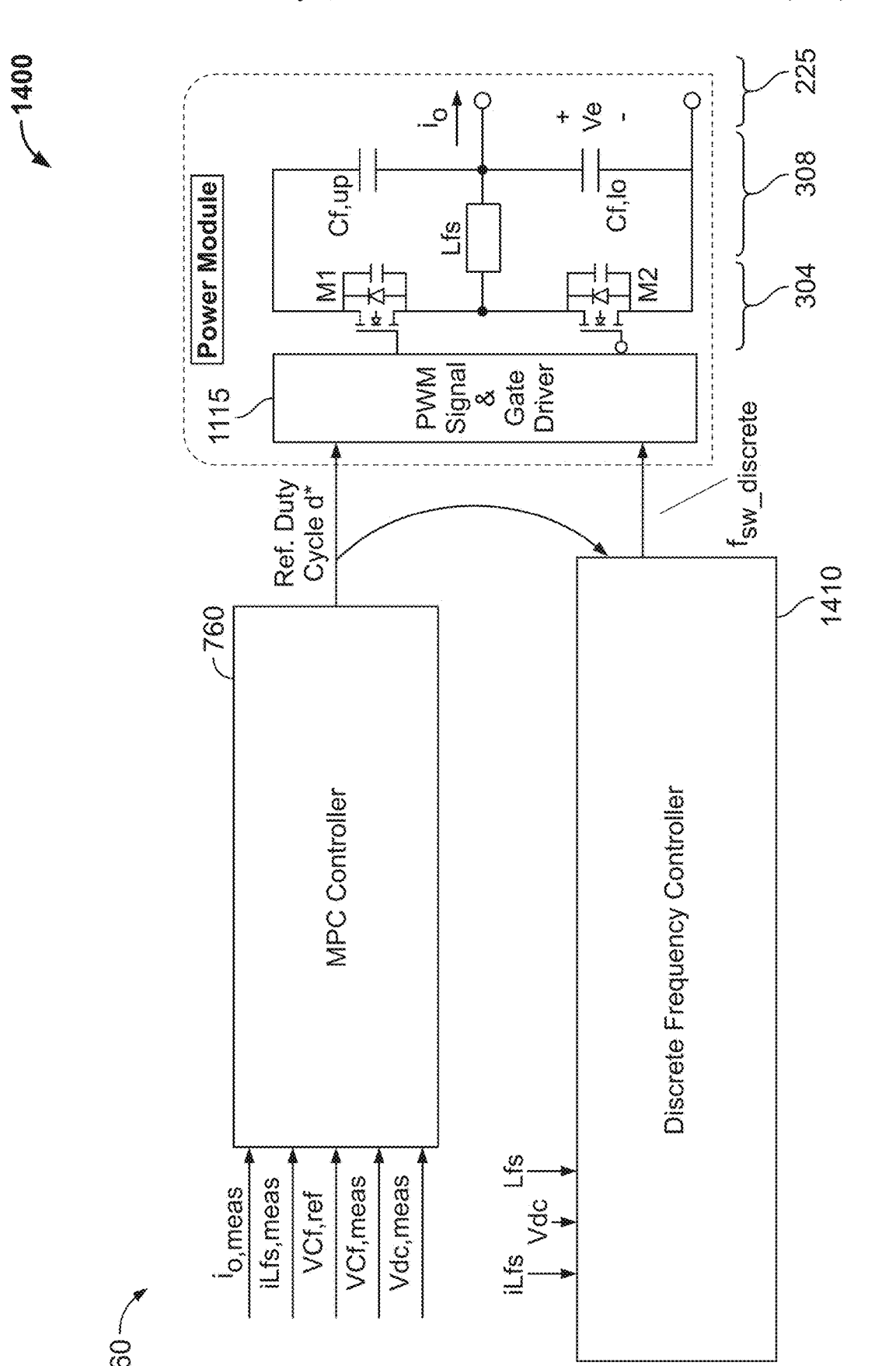

FIG. 14 illustrates a control system for local MPC-VFCSS control using variable-discrete-frequency critical-soft-switching (VDFCCS) according to some embodiments.

Figure 15:
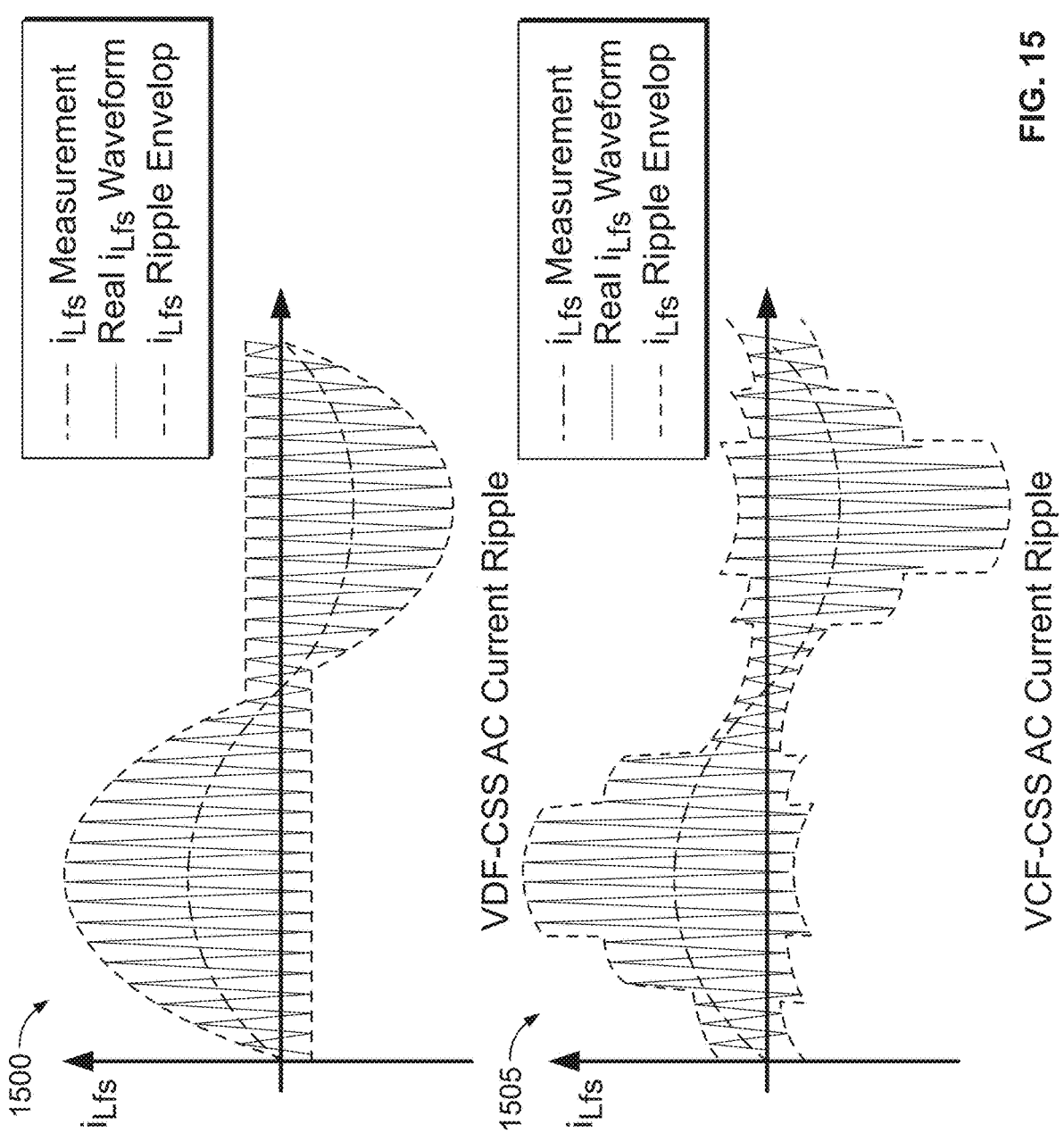

FIG. 15 illustrates waveforms for VCFCCS and VDFCCS control according to some embodiments.

Figure 16:
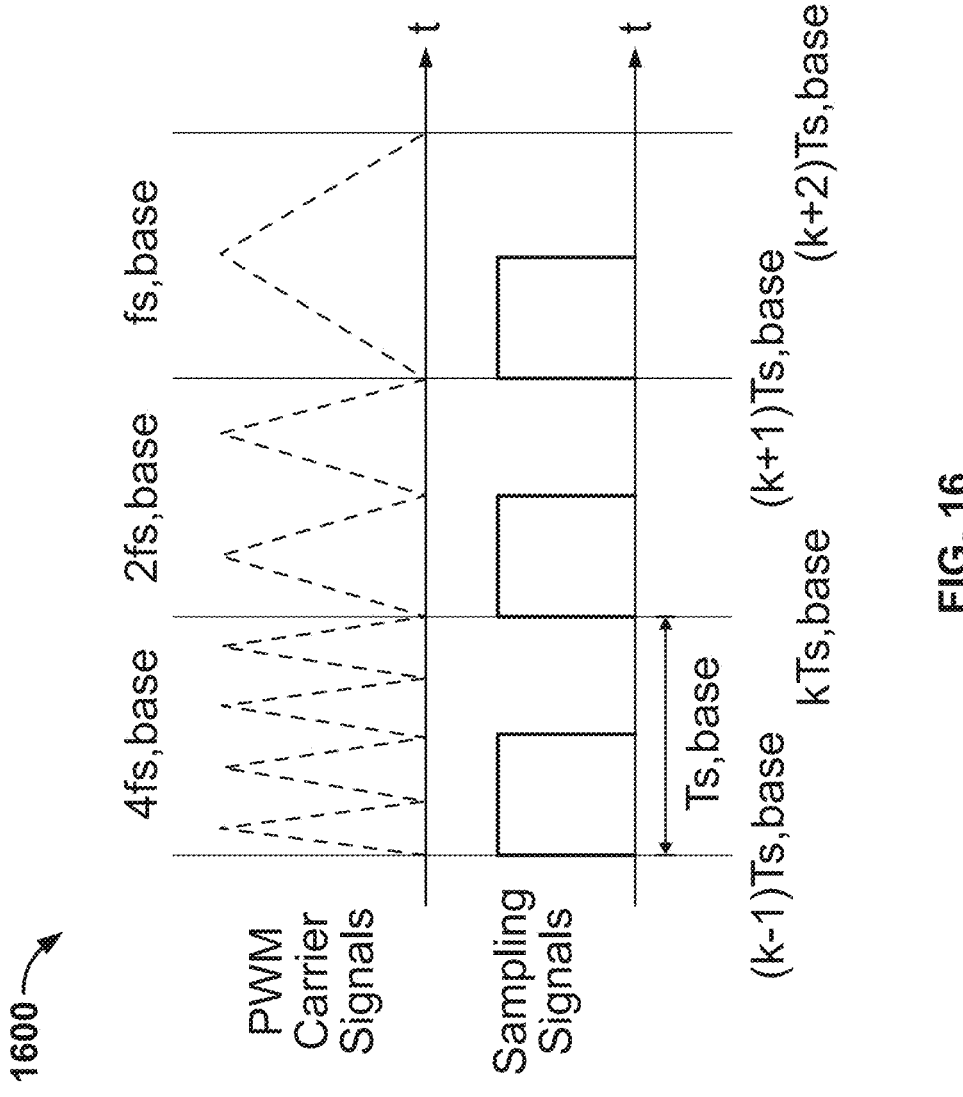

FIG. 16 illustrates a plot of carrier signals and sampling signals for VDFCCS control according to some embodiments.

FIGS. 17A and 17B illustrate respective plots of experimental results of a power converter according to some embodiments.

Figures 18A, 18B:
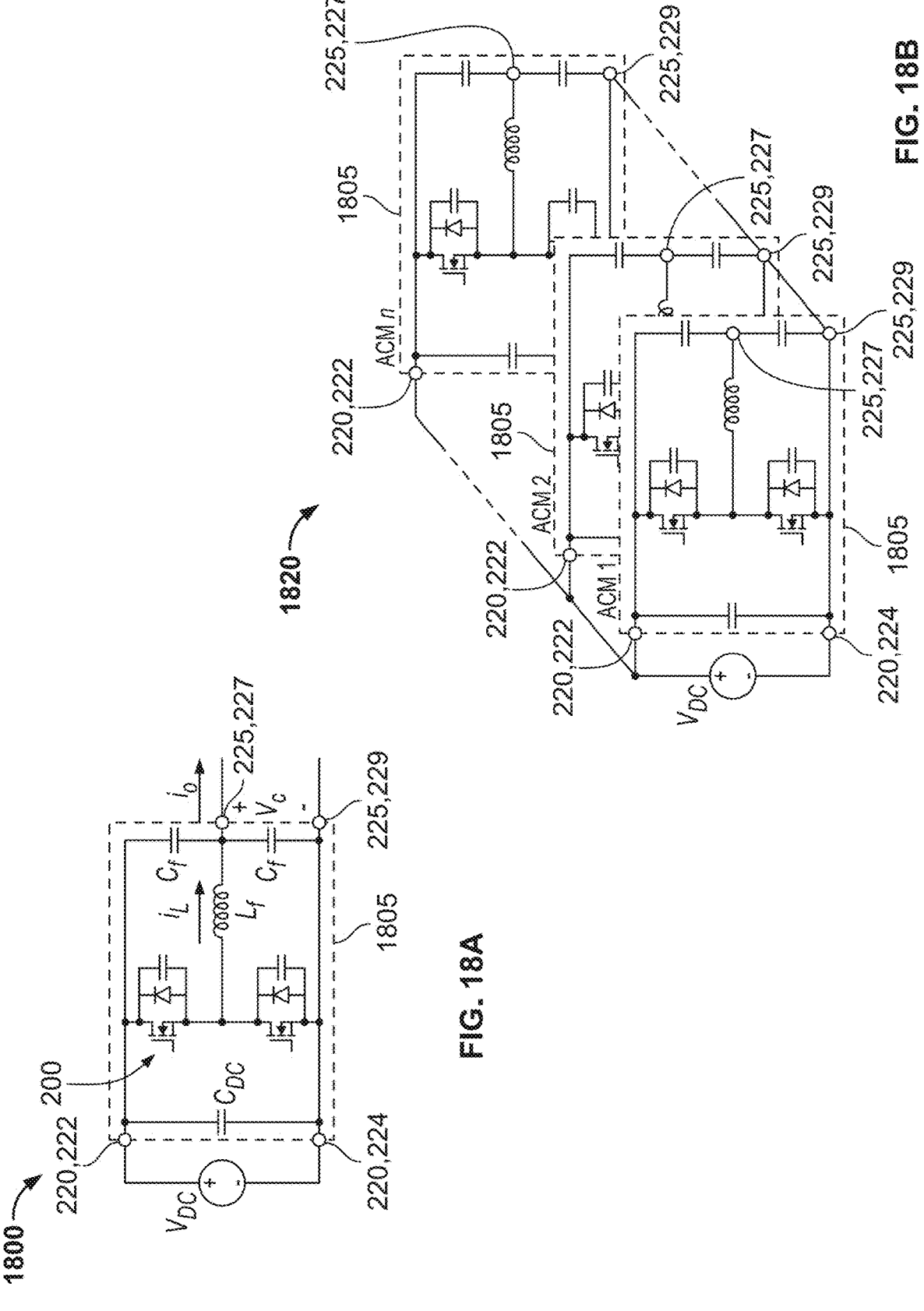

FIGS. 18A and 18B illustrate autoconverter modules according to some embodiments.

Figure 19:
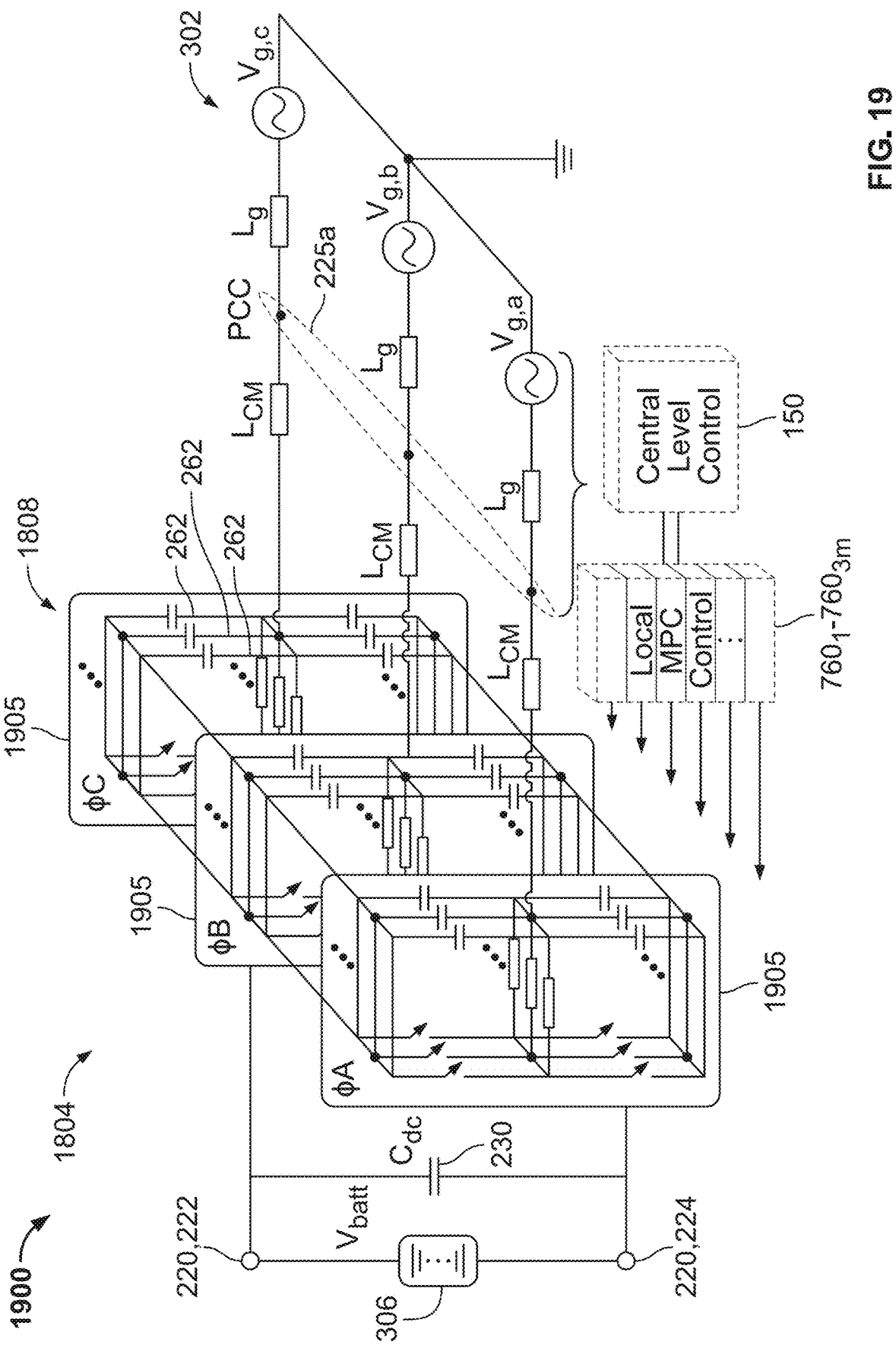

FIG. 19 illustrates a power converter incorporating autoconverter modules according to some embodiments.

FIG. 20 illustrates a process for converting power using variable frequency critical soft switching, according to some embodiments.

FIG. 21 illustrates a process for converting power in a charging mode and a traction mode, according to some embodiments.

Figure 22:
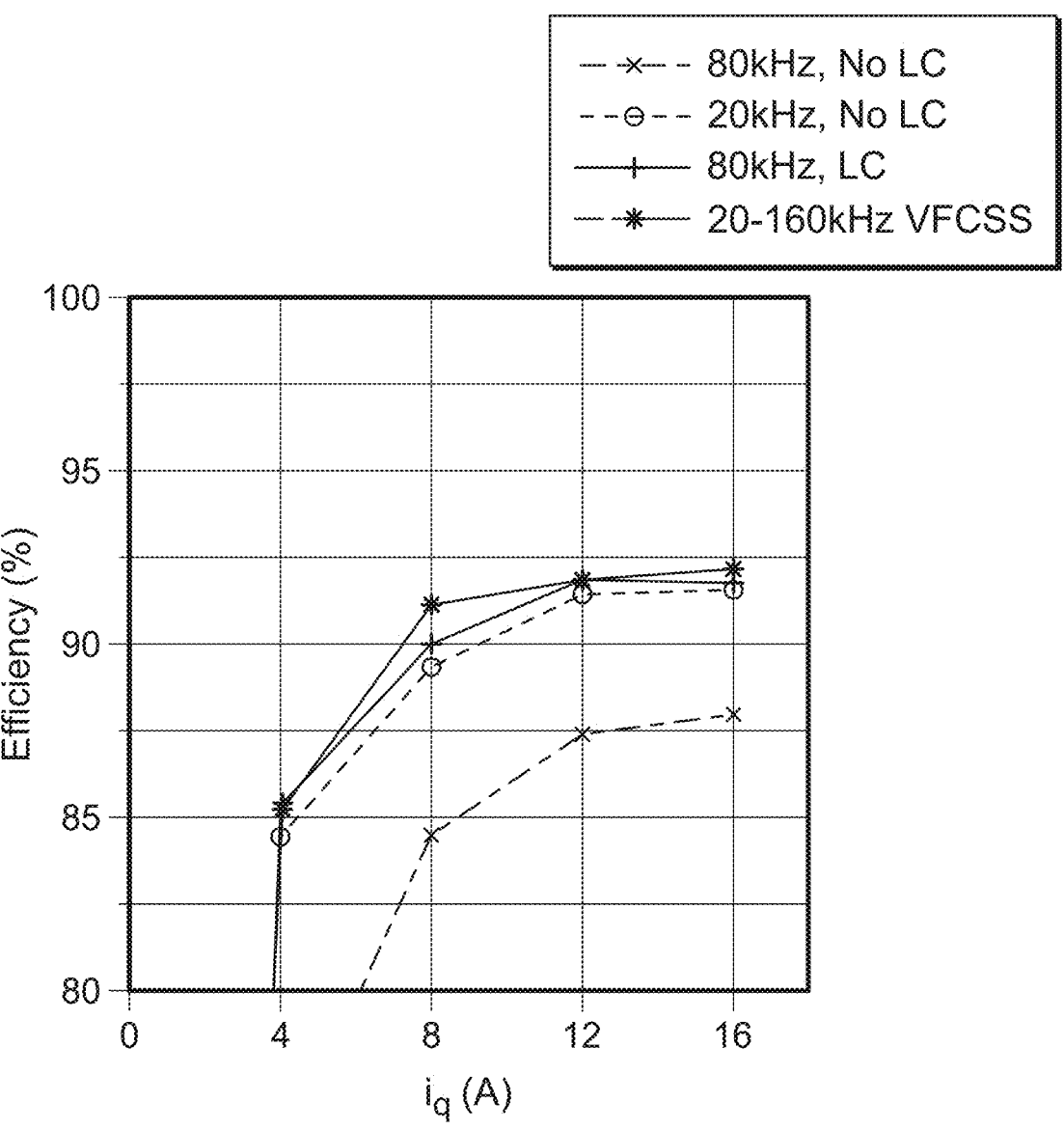

FIGS. 22 and 23 illustrate respective efficiency plots of experimental results of a power converter according to some embodiments.

Figure 24:
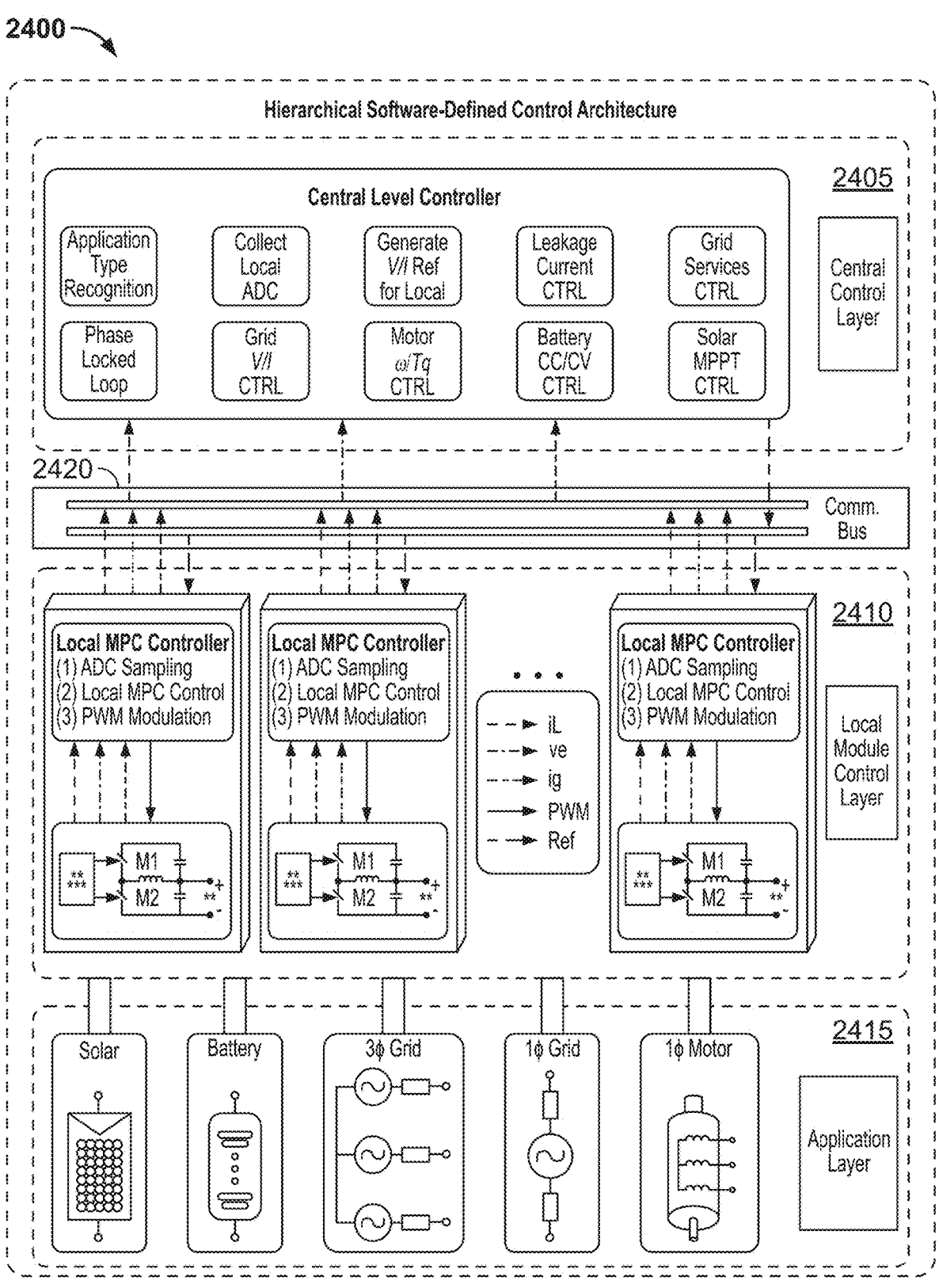

FIG. 24 illustrates a configurable power converter architecture according to some embodiments.

Figure 25A:
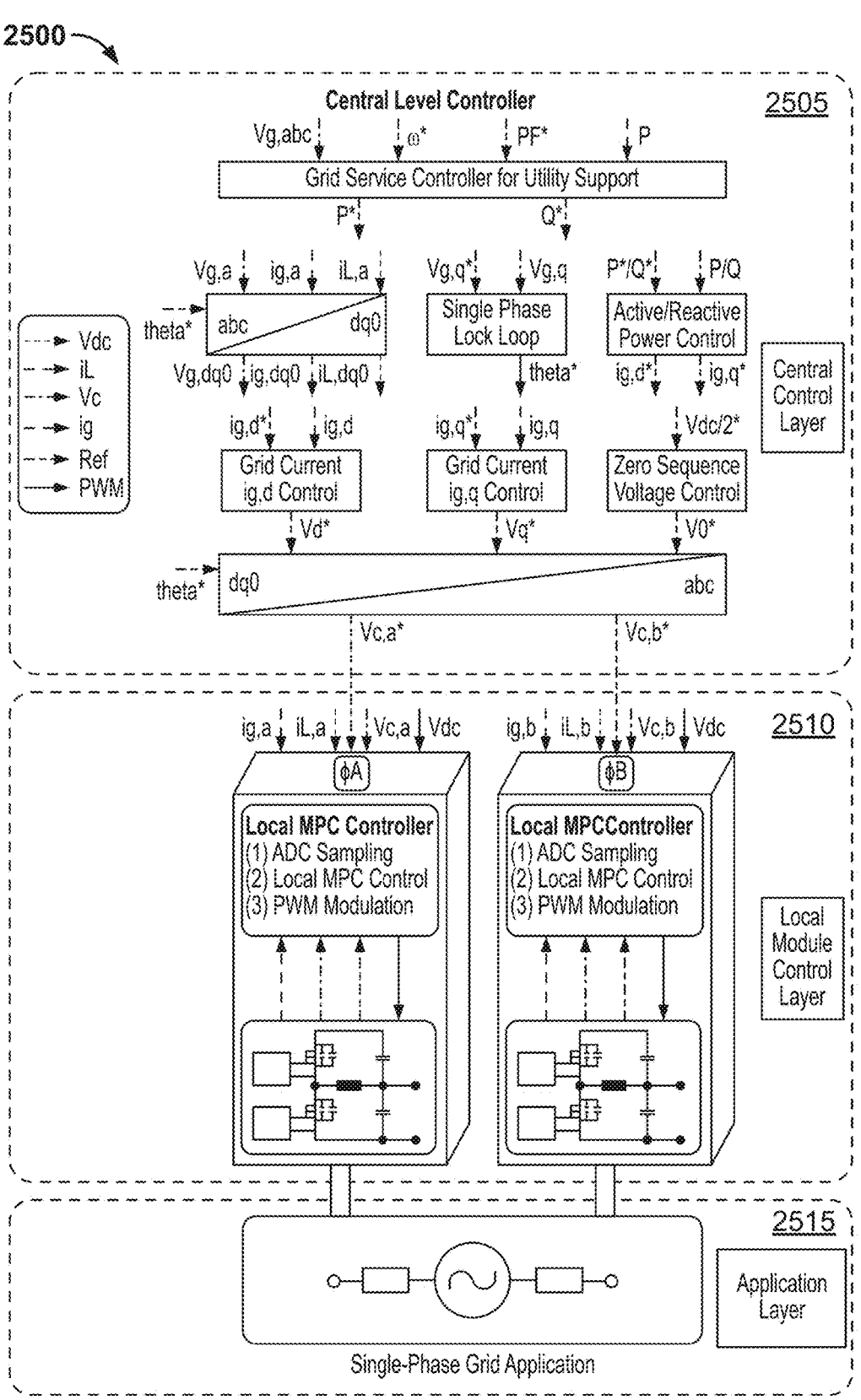
Figure 25B:
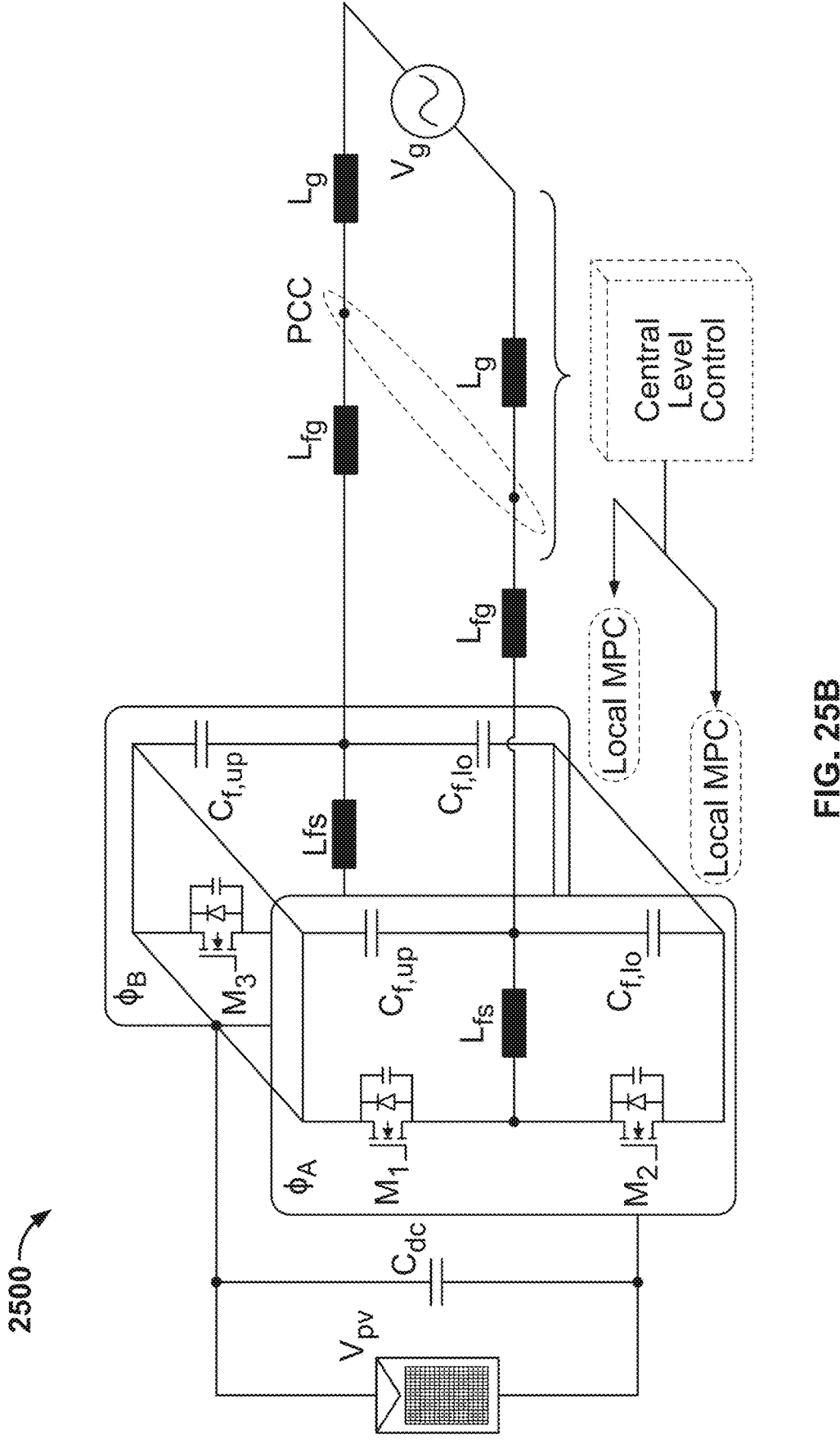

FIGS. 25A and 25B illustrate a single-phase grid application configuration of the power converter architecture of FIG. 24, according to some embodiments.

Figure 26A:
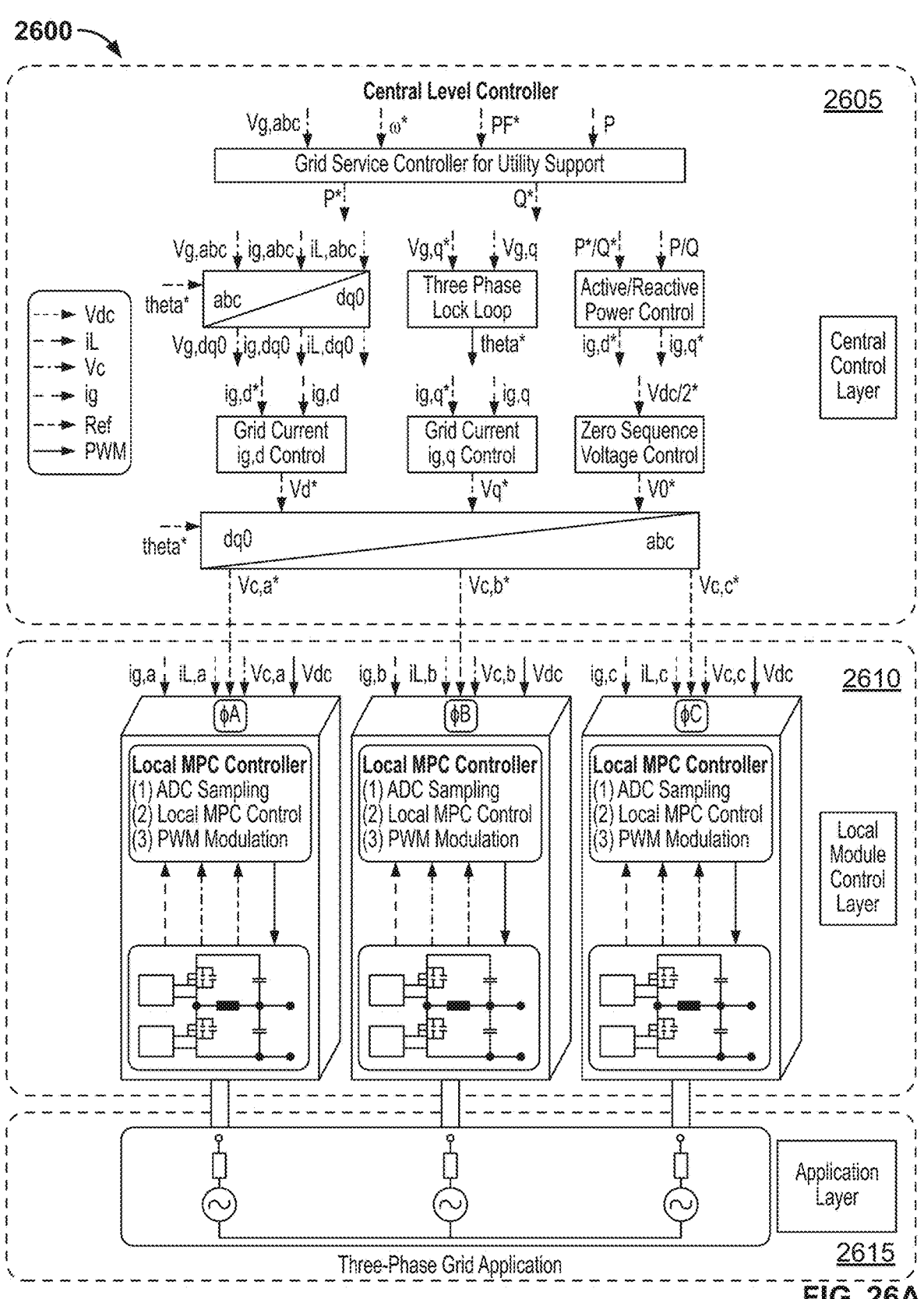
Figure 26B:
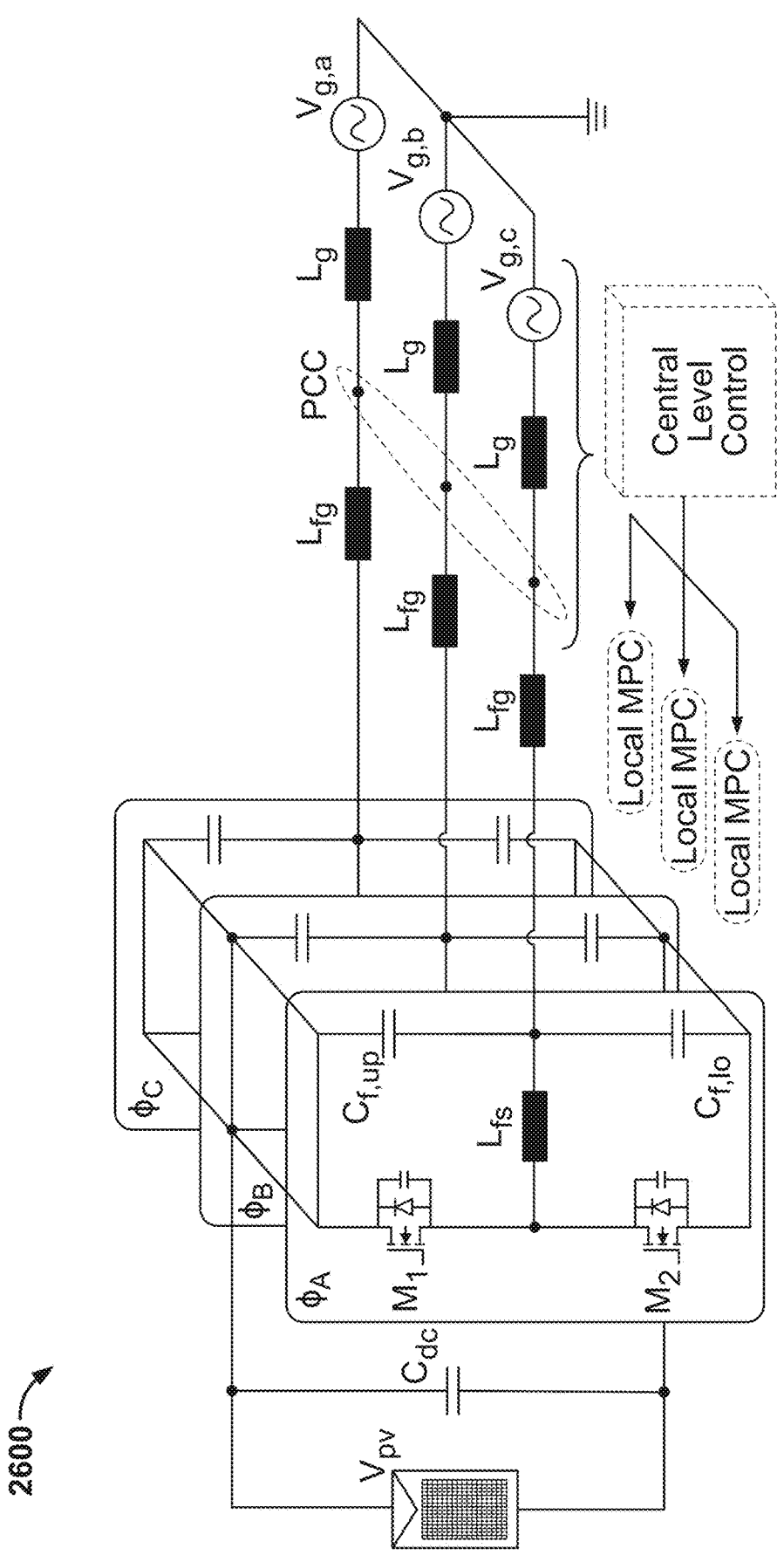

FIGS. 26A and 26B illustrate a three-phase grid application configuration of the power converter architecture of FIG. 24, according to some embodiments.

Figure 27A:
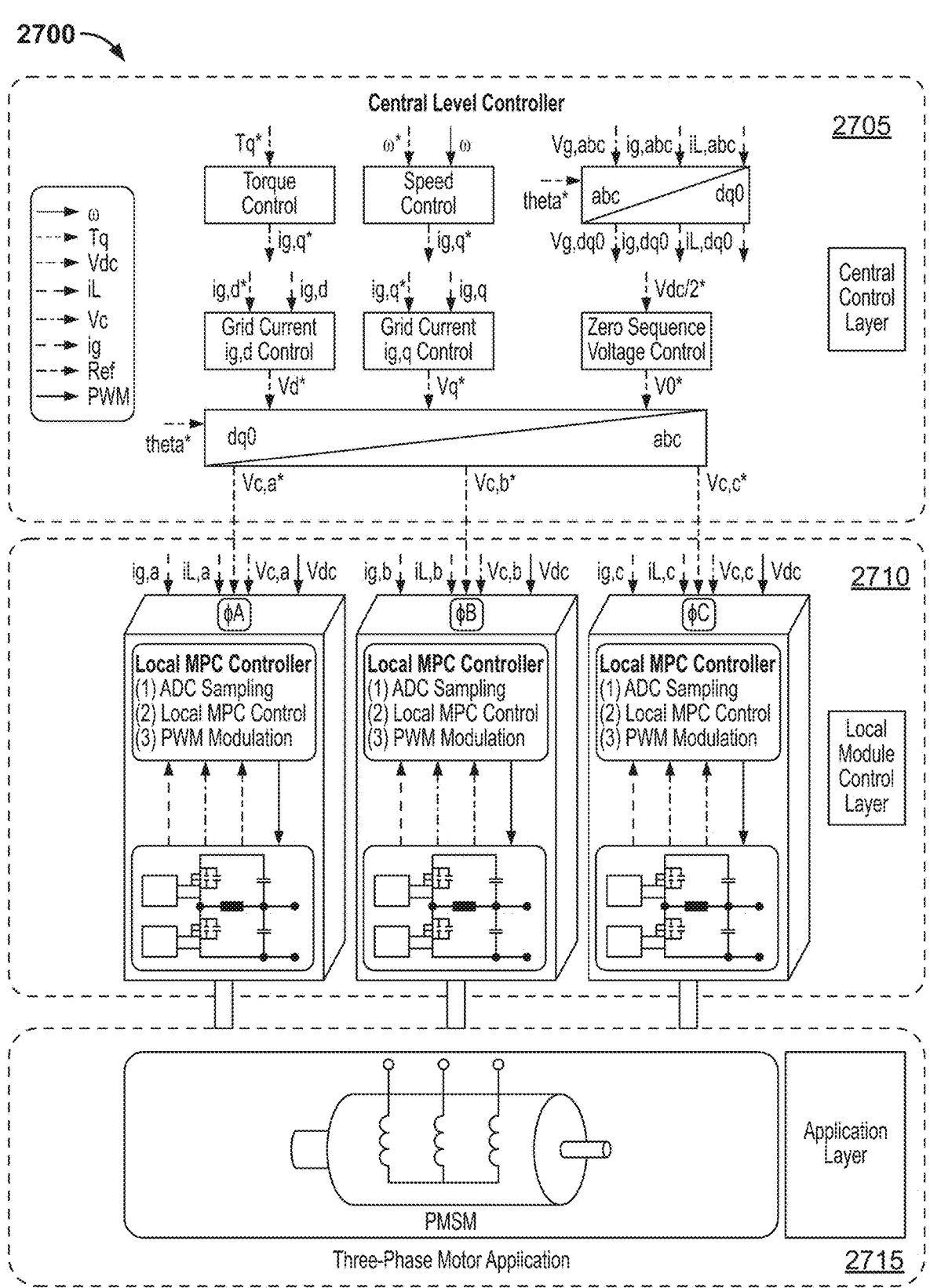
Figure 27B:
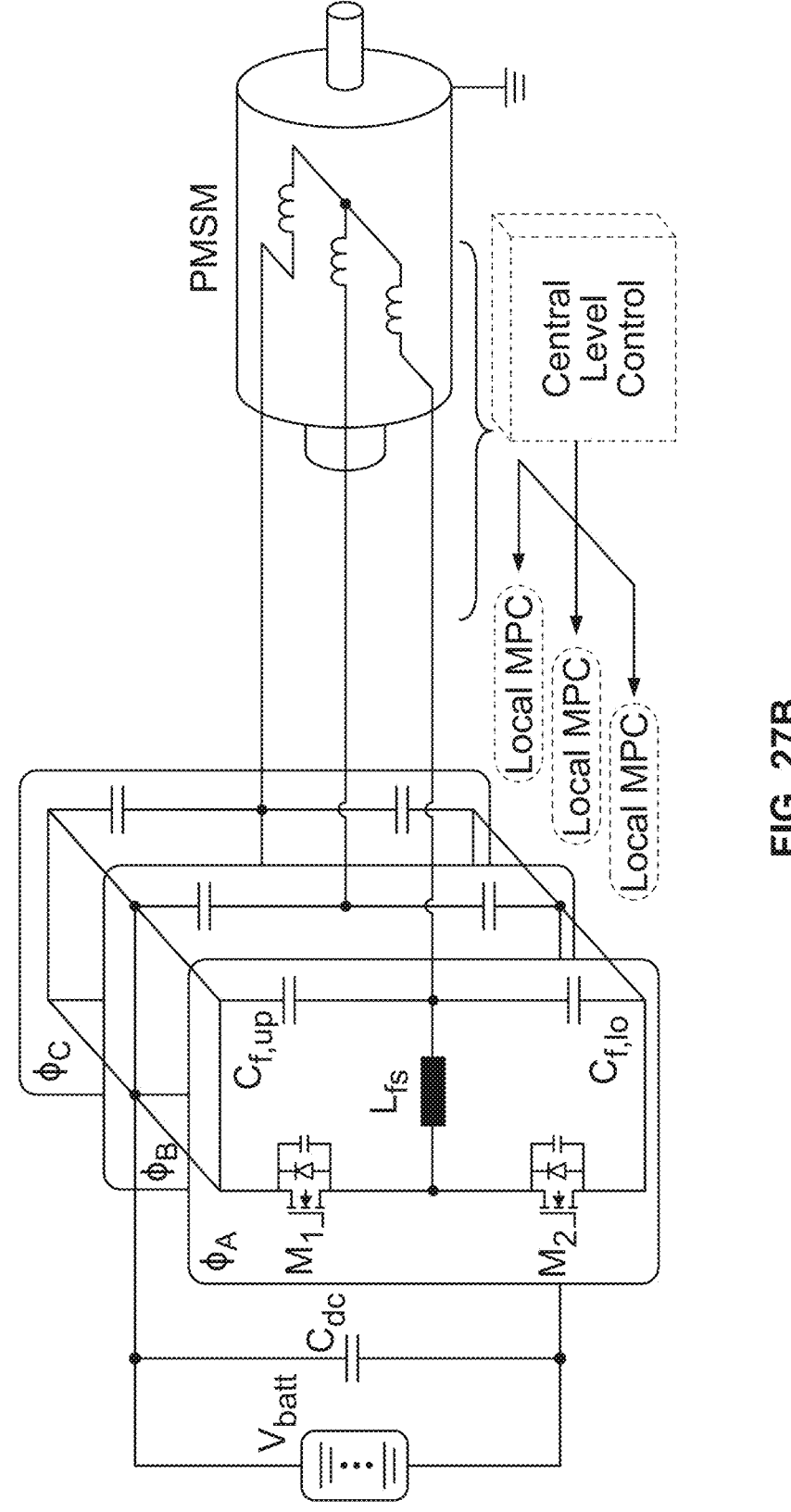

FIGS. 27A and 27B illustrate a motor application configuration of the power converter architecture of FIG. 24, according to some embodiments.

DETAILED DESCRIPTION

One or more embodiments are described and illustrated in the following description and accompanying drawings. These embodiments are not limited to the specific details provided herein and may be modified in various ways. Furthermore, other embodiments may exist that are not described herein. Also, functions performed by multiple components may be consolidated and performed by a single component. Similarly, the functions described herein as being performed by one component may be performed by multiple components in a distributed manner. Additionally, a component described as performing particular functionality may also perform additional functionality not described herein. For example, a device or structure that is "configured" in a certain way is configured in at least that way, but may also be configured in ways that are not listed.

As used in the present application, "non-transitory computer-readable medium" comprises all computer-readable media but does not consist of a transitory, propagating signal. Accordingly, non-transitory computer-readable medium may include, for example, a hard disk, a CD-ROM, an optical storage device, a magnetic storage device, a ROM (Read Only Memory), a RAM (Random Access Memory), register memory, a processor cache, or any combination thereof.

In addition, the phraseology and terminology used herein is for the purpose of description and should not be regarded as limiting. For example, the use of "comprising," "including," "containing," "having," and variations thereof herein is meant to encompass the items listed thereafter and equivalents thereof as well as additional items. Additionally, the terms "connected" and "coupled" are used broadly and encompass both direct and indirect connecting and coupling, and may refer to physical or electrical connections or couplings. Furthermore, the phase "and/or" used with two or more items is intended to cover the items individually and both items together. For example, "a and/or b" is intended to cover: a (and not b); b (and not a); and a and b.

Disclosed herein are systems and methods related to power converters, also referred to as voltage converters, that can provide power conversion with increased power efficiency, increased power density, and/or reduced cost, among other advantages.

Figure 1:
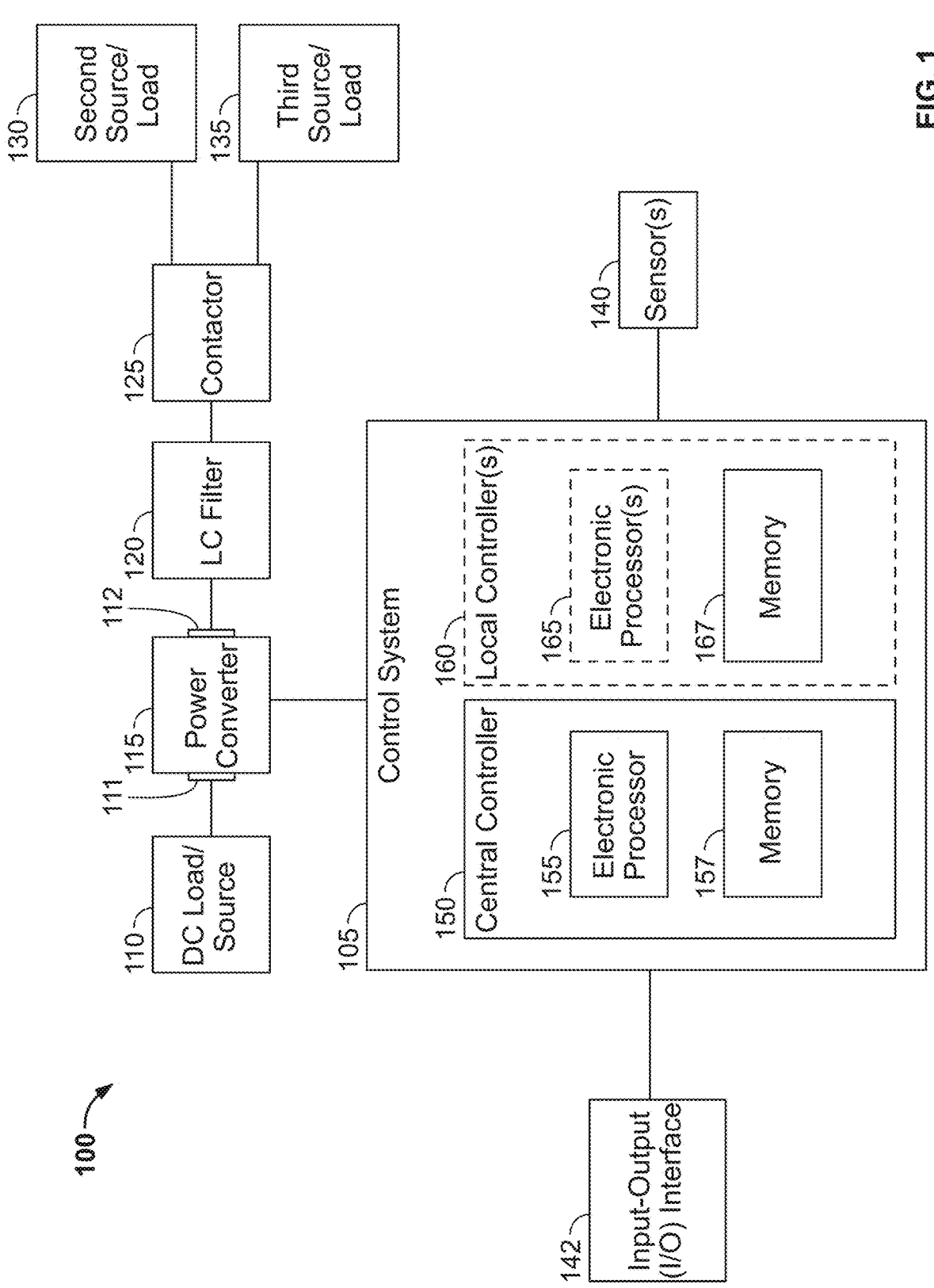
FIG. 1 illustrates a power converter system according to some embodiments.

FIG. 1 illustrates a power converter system 100 in accordance with some embodiments. The power converter system 100 includes a control system 105, a first direct current (DC) load/source 110, a power converter 115 (also referred to as a power converter stage 115), an LC filter 120, a contactor 125, a second source/load 130, a third source/load 135, and one or more sensors 140. The control system 105 includes a central controller 150 with an electronic processor 155 and a memory 157, and, optionally, in some embodiments, includes one or more local controllers 160, each having an electronic processor 165 and a memory 167. The power converter system 100, as well as the other power converter systems provided herein, may be non-isolated power converter systems. That is, the power converter system may be coupled to an AC source (e.g., single or three phase power grid) or AC load (e.g., single or 3-phase motor) without a transformer. Use of a transformer is common in electrical circuits to provide isolation between the power converter and an AC source or load. However, such a transformer can add inefficiencies and size or volume to the power converter. Accordingly, power converter systems provided herein are non-isolated, also referred to as transformerless, to increase efficiency and/or reduce size of the power converter systems. Because the power converters are provided without isolation by a transformer, the power converters may include additional features to prevent transmission of unwanted signals or current (e.g., leakage current) from passing between the power converters and other circuit components (e.g., DC sources, DC loads, AC sources, AC loads, and other structures in contact with or supporting the power converters).

In operation, generally, the control system 105 controls power switching elements of the power converter 115 with control signaling (e.g., pulse-width modulated (PWM) signals) to convert power (i) from the DC load/source 110 functioning as a source to the second source/load 130 or the third source/load 135 (depending on the state of the contactor 125) functioning as a load, or (ii) from the second source/load 130 or the third source/load 135 (depending on the state of the contactor 125) functioning as a source to the DC load/source 110 functioning as a load. Accordingly, when the DC load/source 110 is functioning as a source for the power converter 115, the second source/load 130 (or third source/load 135, depending on the state of the contactor 125) is functioning as a load for the power converter 115. Conversely, when the DC load/source 110 is functioning as a load for the power converter 115, the second source/load 130 (or third source/load 135, depending on the state of the contactor 125) is functioning as a source for the power converter 115.

The DC load/source 110 may be a direct power (DC) load, a DC source, or both a DC load and DC source (i.e., functioning as DC source in some instances and as a DC load in other instances, depending on the mode of the power converter 115). In some examples, the DC load/source 110 is a battery. In other examples, DC load/source 110 may be a capacitor, an ultracapacitor, a DC power supply from rectified AC source (e.g., AC grid power converted to DC power by diode bridge rectifier), or the like. The second source/load 130 may be an AC load, an AC source, both an AC load and AC source (i.e., functioning as an AC source in some instances and as an AC load in other instances, depending on the mode of the power converter 115), a DC load, a DC source, both a DC load and DC source (i.e., functioning as a DC source in some instances and as a DC load in other instances, depending on the mode of the power converter 115). In some examples, the second source/load 130 may be an electric (AC) motor, an AC generator, AC power supply grid, a DC battery, a DC capacitor, a DC ultracapacitor, a DC power supply from rectified AC source (e.g., AC grid power converted to DC power by diode bridge rectifier), or the like. The third source/load 135 may be an AC load, an AC source, both an AC load and AC source (i.e., functioning as an AC source in some instances and as an AC load in other instances, depending on the mode of the power converter 115), a DC load, a DC source, both a DC load and DC source (i.e., functioning as a DC source in some instances and as a DC load in other instances, depending on the mode of the power converter 115). In some examples, the third source/load 135 may be an electric (AC) motor, an AC generator, AC power supply grid, a DC battery, a DC capacitor, a DC ultracapacitor, a DC power supply from rectified AC source (e.g., AC grid power converted to DC power by diode bridge rectifier), or the like.

In some examples, the DC load/source 110 is a DC battery (e.g., an electric vehicle battery), the second source/load 130 is an AC grid, and the third source/load 135 is an AC motor (e.g., an electric vehicle motor). In this case, the power converter 115 may function as a bi-directional converter that operates in a DC/AC traction mode (or motor mode) to drive the third source/load 135 (motor) with AC power converted from DC power from the DC load/source 110 (battery), and an AC/DC charging mode to charge the DC load/source 110 (battery) with DC power converted from AC power from the second load/source 130 (AC grid). In some other examples, the DC load/source 110 is a DC source, the second source/load 130 is an AC motor, and no third source/load 135 is present in the system 100.

The contactor 125 is an electrically controlled switch, and may be, for example, a contactor, a relay, MOSFET, or the like. In some examples of the system 100, the contactor 125 is not present and, instead, the LC filter 120 is connected to both the second source/load 130 and the third source/load 135 simultaneously. However, other control techniques are employed to prevent, for example, driving the third source/load 135 as a load (e.g., a motor), when receiving power from the second source/load 130 as a source (e.g., an AC grid).

The DC load/source 110 is coupled to the power converter 115 at a first (DC) side or section 111 of the power converter 115, and the second source/load 130 is coupled to the power converter 115 at a second (AC) side or section 112 of the power converter 115. The first side may also be referred to as an input side or an output side of the power converter 115, depending on the mode of the power converter, or as a DC side of the power converter 115. The second side may also be referred to as an input side or an output side of the power converter, depending on the mode of the power converter, or as an AC side of the power converter 115. In some embodiments, the second side of the power converter 115 may be an AC side having single phase AC power, three-phase AC power, or AC power with another number of phases.

In some embodiments, the power converter 115 operates with a high DC voltage level. For example, in operation, the DC side of the power converter 115 has a DC voltage (e.g., across input terminals of the power converter 115) of at least 200 V, at least 600 V, at least 800 V, at least 1000 V, at least 1200 V, between 200 V and 1200 V, between 600 V and 1200 V, between 800 V and 1200 V, or another range. Such high DC voltage levels may be desirable in some contexts, such as some electric vehicles. For example, some current electric vehicles (e.g., passenger vehicles and hybrid electric vehicles) operate with a DC bus voltage of between about 200 V and 400 V. This DC bus voltage for passenger electric vehicle may increase in the future. Further, some current electric vehicles (e.g., class 4-8, off-road, or otherwise larger electric vehicles) can operate with a DC bus voltage of more than 1000 V. However, high DC voltage levels may introduce challenges into a typical power converter system, such as an increase in leakage currents, increases in common mode voltage, higher rates of change in common mode voltage, and the like. These challenges can lead to resonance on the LC filter 120, shaft voltages, excessive bearing currents (e.g., from discharge events when lubricant dielectric breakdown occurs) that can result in bearing failures, excessive motor shaft currents, excessive motor winding currents (e.g., insulation may be damaged), and excessive gear train currents (e.g., bearing currents can propagate into the gear train via electromagnetic interference (EMI) or noise, vibration, harshness (NVH) resulting from the damaged bearing race walls). Embodiments described herein, however, can mitigate such challenges through improved LC filters and through control techniques including control techniques that use harmonic injection, cascaded controllers, MPC control, and/or variable frequency critical soft switching (VFCSS).

The LC filter 120, which may be referred to as an N-phase LC filter, includes an LC filter for each phase of the power converter 115. Each LC filter of the N-phase LC filter may include at least an inductor and a capacitor, or at least an inductor and two capacitors, as described in further detail below (see, e.g., discussion of FIGS. 2 and 3).

The sensor(s) 140 include, for example, one or more current sensors and/or one or more a voltage sensors. For example, the sensor(s) 140 may include a respective current sensor and/or voltage sensor to monitor a current and/or voltage of one or more of the DC load source 110, each phase of the second source/load 130, each phase of the third source/load 135, each phase of the LC filter 120, or other nodes or components of the power converter 115. For example, when the LC filter 120 is a three-phase LC filter, the sensors 140 may include at least three current sensors, one for sensing current at each phase of a three phase LC filter 120. In some embodiments, additional or fewer sensors 140 are included in the system 100. For example, the sensors 140 may also include one or more vibration sensors, temperature sensors, and the like. In some examples, the control system 105 infers a characteristic (e.g., current or voltage) of the power converter 115, rather than directly sensing the characteristic. The sensor(s) 140 may provide sensor data to the control system 105 indicative of the sensed characteristics of the system 100. Such sensor data may, accordingly, indicate electrical operational characteristics of the system 100. In some examples, the control system 105 infers or estimates a characteristic (e.g., current or voltage) at one or more nodes of the power converter 115 based on the sensor data of a sensor 140 that senses a different type of characteristic or even a different component, rather than directly sensing the characteristic. Further description of such inferencing or estimating are provided below with respect to state estimation.

The input-output (I/O) interface 142 includes or is configured to receive input from one or more inputs (e.g., one or more buttons, switches, touch screen, keyboard, and the like), and/or includes or is configured to provide output to one or more outputs (e.g., LEDs, display screen, speakers, tactile generator, and the like). Other electronic devices and/or users may communicate with the system 100 and, in particular, the control system 105, via the I/O interface 142. For example, the control system 105 may receive commands (e.g., from a user or another device) for the power converter system 100 indicating a target torque, target speed, target power level, conversion type, or the like. The control system 105, in response, may drive the power converter 115 to achieve the target and/or conversion type indicated by the command.

The control system 105 generally monitors the system 100 including the power converter 115 (e.g., based on sensor data from the sensor(s) 140), receives commands (e.g., via the input/output interface 142), and controls the power switching elements of the power converter 115 with control signaling (e.g., pulse-width modulated (PWM) signals) to convert power (e.g., in accordance with the sensor data and/or the commands). In some embodiments, the control system 105 includes a controller (e.g., the central controller 150) that performs this monitoring and control without additional local controllers. In other embodiments, the control system 105 is a cascaded control system including a central controller 150 and one or more local controllers 160. The cascaded control system may communicate in real time (e.g., each control cycle) monitoring information (e.g., sensor data) and control information between the central controller 150 and the one or more local controller 160. In some examples, the local controller(s) 160 each implement model predictive control (MPC) or another regulation control scheme (e.g., PID control, PI control, or the like). In some examples, the central controller implements a non-MPC regulation technique, such as proportional integral derivative (PID) control or proportional integral (PI) control.

Each controller of the control system 105, including the central controller 150 and the local controllers 160, is an electronic controller that may include an electronic processor. Such an electronic controller may further include a memory (e.g., the memory 157 or 167). The memory is, for example, one or more of a read only memory (ROM), random access memory (RAM), or other non-transitory computer-readable media. The electronic processor 155, 165 is configured to, among other things, receive instructions and data from the memory 157, 167 and execute the instructions to, for example, carry out the functionality of the associated controller described herein, including the processes described herein. For example, the memory may include control software. In some embodiments, instead of or in addition to executing software from the memory to carry out the functionality of the controller described herein, the electronic processor includes one or more hardware circuit elements configured to perform some or all of this functionality. Additionally, although a particular controller, electronic processor, and memory may be referred to as a respective, single unit herein, in some embodiments, one or more of these components is a distributed component. For example, in some embodiments, an electronic processor includes one or more microprocessors and/or hardware circuit elements.

Figure 2:
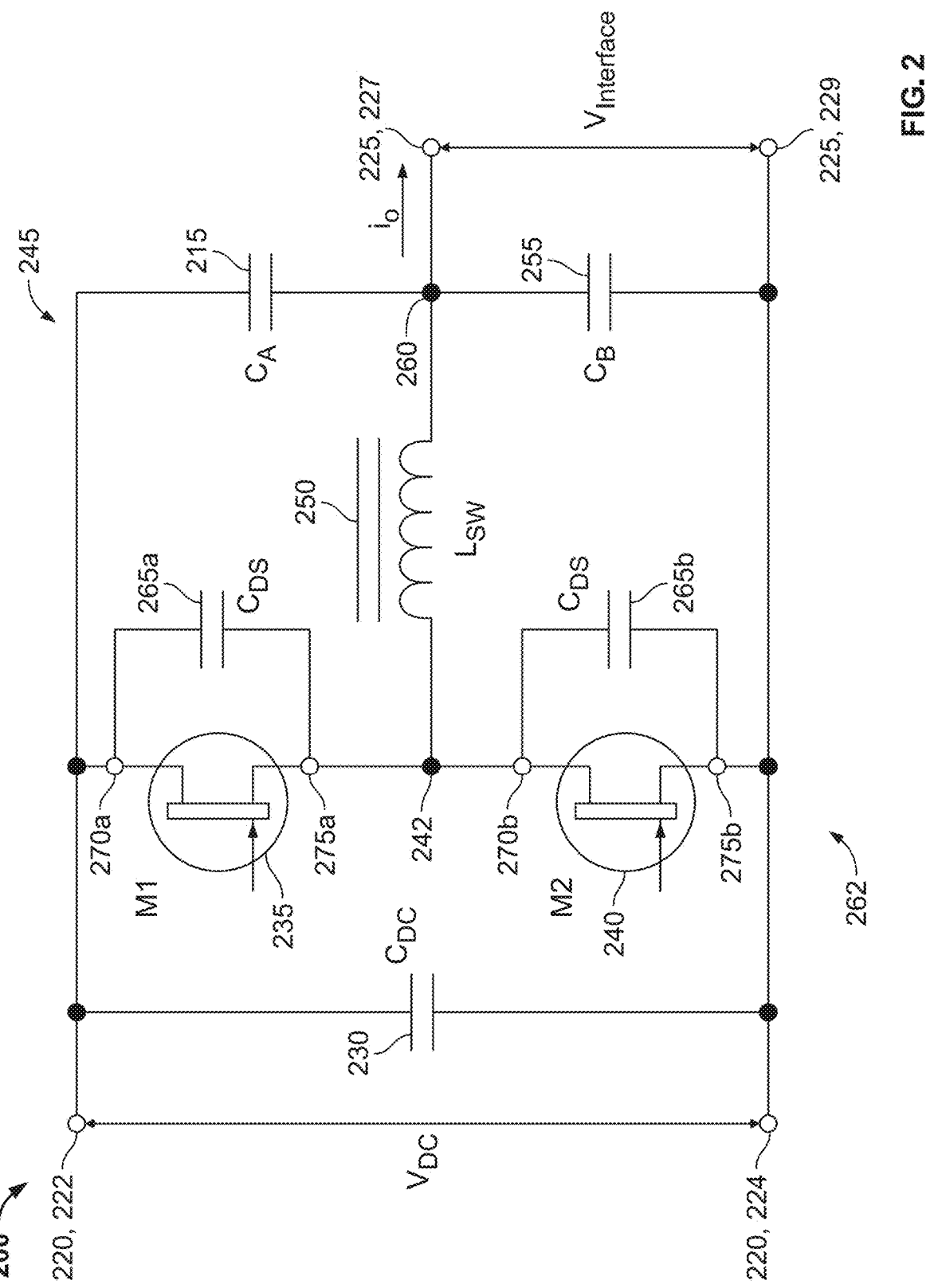
FIG. 2 illustrates a half-bridge power converter according to some embodiments.

FIG. 2 illustrates an example of a half-bridge converter 200 that may serve as the power converter 115 of the system 100 of FIG. 1. As illustrated, the converter 200 includes DC terminals 220 (also referred to as DC nodes, DC links, DC rails, etc.) having a positive DC terminal 222 and a negative DC terminal 224. The converter 200 further includes interface terminals 225 (also referred to as interface nodes) having a positive interface terminal 227 and negative interface terminal 229. The converter 200 may be operated as a bidirectional converter or as a unidirectional converter (in either direction), depending on the configuration and control of the system in which it is implemented. Accordingly, the DC terminals 220 may be input terminals and the interface terminals 225 may be output terminals in some examples (e.g., DC/DC conversion and DC/AC inversion), and the DC terminals 220 may be output terminals and the interface terminals 225 may be input terminals in some examples (e.g., AC/DC rectification). Additionally, the interface terminals 225 may be AC input terminals (e.g., for AC/DC rectification), may be AC output terminals (e.g., for a DC/AC inverter), or may be DC output terminals (e.g., for DC/DC conversion).

The converter 200 further includes a DC link capacitor (CDC) 230, a, a high side (upper) power switching element (M1) 235 (also referred to as upper switch or upper FET 235), a low side (lower) power switching element (M2) 240 (also referred to as lower switch or lower FET 240), a midpoint node 242 connecting a drain terminal of upper switch 235 and a source terminal of lower switch 240, and an LC filter 245. The LC filter 245 is an example of the LC filter 120 of the system 100 of FIG. 1 (e.g., where the LC filter 120 is an N-phase LC filter with N=1).

The power switching elements 235 and 240 may be field effect transistors (FETs), each having a respective gate, source, and drain terminal. The FETs may be, for example, a MOSFET, a silicon carbide (SIC) FET, a gallium nitride (GaN) FET, among other types of FETs.

The LC filter 245 includes a switch-side inductor $L_{SW}$ 250, a lower capacitor CB 255, and an upper capacitor CA 215. The switch-side inductor $L_{SW}$ 250 is coupled between the midpoint node 242 and a filter node 260. For example, a first end of the switch-side inductor $L_{SW}$ 250 is coupled to the midpoint node 242, and a second end is coupled to the filter node 260. The lower capacitor CB 255 is coupled between the filter node 206 and the negative DC terminal 224. For example, a first end of the lower capacitor CB 255 is coupled to the filter node 260, and a second end is coupled to the negative DC terminal 224. The upper capacitor CA 215 is coupled between the filter node 260 and the positive DC terminal 222. For example, a first end of the lower capacitor CA 215 is coupled to the filter node 260, and a second end is coupled to the positive DC terminal 222.

In some examples, the LC filter 245 is an LCL filter (an LC filter with an additional inductor (L)), in which an additional (interface) inductor is coupled between the filter node 260 and the positive interface terminal 227.

The upper capacitor 215 allows for the ripple currents at both input nodes and output nodes (nodes 222, 227) of converter 200 to be shared. Because the ripple currents on the input nodes and the ripple currents on the output nodes have some correlation, differential mode currents of these input and output nodes can be canceled through this capacitance. This reduction in differential mode current can result in improved EMI performance and decreased total capacitor ripple current when compared with a typical half-bridge converter (e.g., when the total capacitance between the two converters is held constant). Furthermore, the reduction in total capacitor ripple current can allow for a decrease in capacitor size, for example, when capacitor ripple current drives capacitor sizing.

The converter further includes drain-source capacitors Cps 265a and 265b, each respectively coupled across one of the switches 235, 240. In particular, a first drain-source capacitor 265a is provided across a source terminal 270a and drain terminal 275a of the upper switch (M1) 235, and a second drain-source capacitor 265b is provided across a source terminal 270b and drain terminal 275b of the lower switch (M2) 240. The drain-source capacitors ($C_{DS}$) 265a-b may be generically and collectively referred to herein as drain-source capacitor(s) ($C_{DS}$) 265.

The drain-source capacitors ($C_{DS}$) 265 can slow a voltage rise during an ON-to-OFF transition of the switches 235 and 240. This slowed voltage rise can, in turn, reduce the switching losses of the switches 235 and 240.

In some examples of the converter 200, one or both of the upper capacitor CA 215 and the drain-source capacitors Cps are not included in the converter 200.

As noted, in some examples, the power converter 200 may serve as the power converter 115 of the system 100 in FIG. 1. In the context of the power converter 115 (and, thus, the power converter 200) implementing an AC/DC rectifier or a DC/AC inverter, the power converter 200 is a single-phase power converter 200. In some examples, multiple instances of the power converter 200 are paralleled to collectively serve as the power converter 115 of FIG. 1 and provide the single-phase conversion (whether rectification or inversion) or to provide a DC/DC power conversion. In some examples, the power converter 115 is a multiphase power converter (e.g., operating with three or more phases of AC power). In such examples, the power converter 115 may include multiple instances of the power converter 200, each instance associated with a phase of the AC power, each instance having shared DC terminals 220, and each instance having independent $V_{interface}$ nodes 225. Examples of such a power converter are provided in FIGS. 3, 4, 7, and 12. In some of these examples, as shown in FIGS. 19-20, multiple instances of the power converter 200 are paralleled to collectively provide the power conversion for a respective phase (e.g., two parallel power converters 200 for phase A, two parallel power converters 200 for phase B, and two parallel power converters 200 for phase C). In some examples, the particular number of parallel power converter 200 and the number of phases varies.

As used herein, a converter block may refer to a half bridge circuit such as described with respect to the converter 200 of FIG. 2. For example, a converter block 262 may include the power switching elements 235 and 240, the LC filter 245 (including upper capacitor 215, if present, and additional interface inductor, if present), the interconnecting nodes thereof (e.g., midpoint node 242, filter node 260, DC terminals 220, and interface terminals 225), and (if present) drain-source capacitors 265.

Figure 3A:
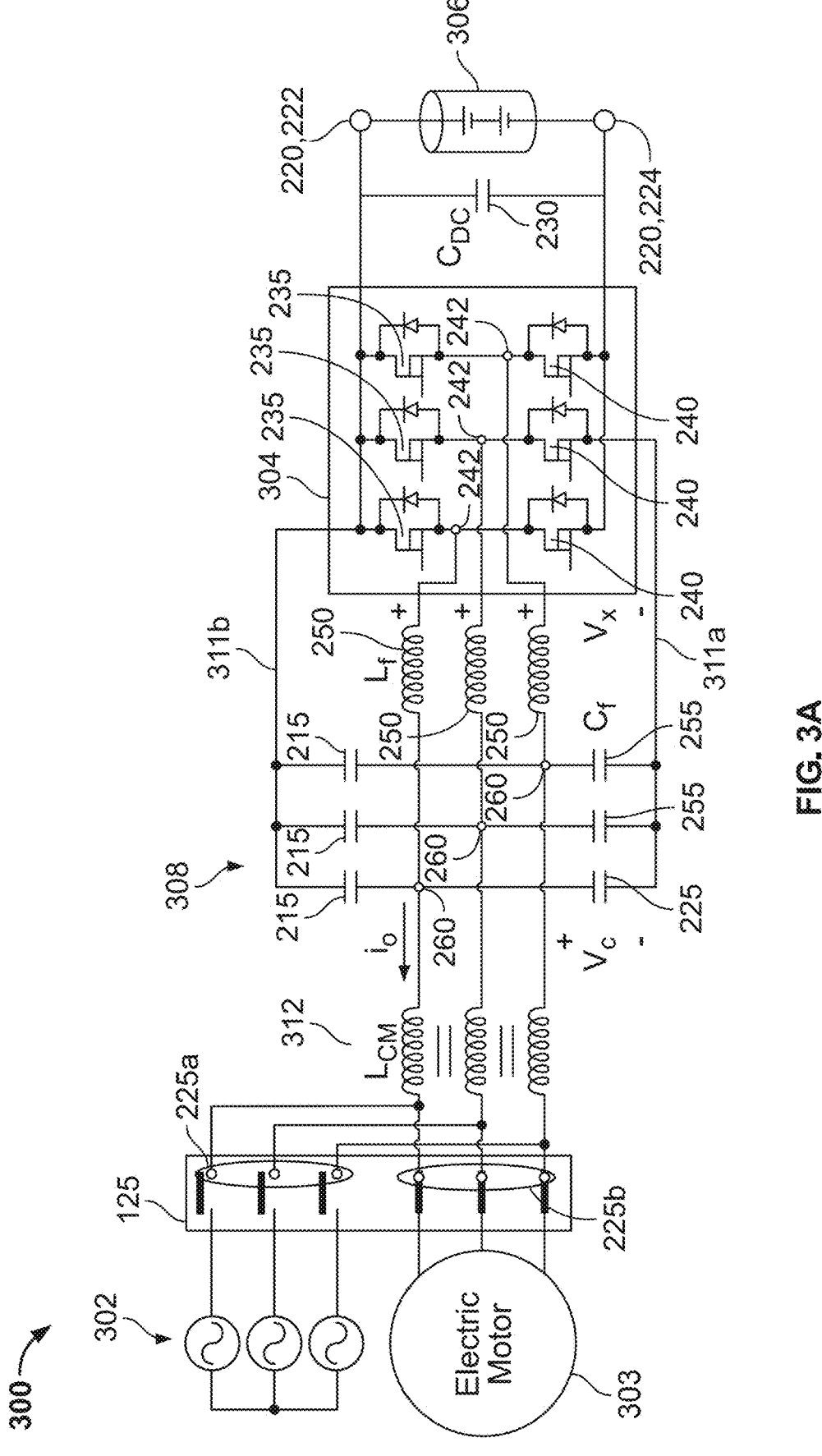
FIG. 3A illustrates multiphase power converter system according to some embodiments.

FIG. 3A illustrates a multiphase power converter system 300 selectively coupled to an AC grid 302 or an AC motor 303 by the contactor 125. The multiphase converter system 300 includes a multiphase converter 304 coupled to a DC source 306, illustrated as a battery 306, on a DC side and coupled to the contactor 125 (and, thus, the AC grid 302 or the AC motor 303) via LC filters 308. The multiphase converter 304 may serve as the power converter 115 of the system 100 in FIG. 1. The LC filters 308, collectively an three-phase LC filter, may serve as the LC filter 120 of the system 100 of FIG. 1. With reference to FIG. 1, the battery 306 is an example of the DC load/source 110; the AC grid 302 is an example of the second source/load 130; and the AC motor 303 is an example of the third source/load 135. Returning to FIG. 3A, in operation, the converter system 300 may function as a DC/AC inverter or an AC/DC rectifier, depending on the sources and switching of the power switching elements.

The AC motor 303 may be, for example, a permanent magnet rotor synchronous machine, a wound field synchronous machine (WFSM), or another motor. The AC motor 303 may include a stator and rotor. The stator may include a plurality of stator windings that may be driven with current to generate a changing magnetic field to cause the rotor to rotate. The rotor may include permanent magnets, wound field, or a combination (hybrid) of permanent magnets and wound fields. The rotor may be coupled to a motor draft such that, when the rotor is rotatably driven, the motor shaft is rotatably driven (i.e., rotated). The motor windings of the stator and/or rotor may have insulation, which, as noted above, can be damaged due to excessive currents resulting from high rates of change of voltage (dV/dt). The motor shaft may be supported by one or more motor bearings to enable the support and rotation of the shaft. For example, the motor shaft may include a first motor bearing at a driven end of the shaft (an end of the shaft coupled to the rotor) and a second motor bearing at a distal end of the shaft. In some examples, other motor bearing arrangements are used. The motor shaft may be further coupled to a transmission or gearing (a gear train) that drives an end load. For example, in the case of an electric vehicle, the transmission may ultimately be coupled to one or more wheels to cause the vehicle to be propelled. In other examples, the motor is part of an industrial equipment and causes rotation of another load (e.g., cutting instruments, grinders, conveyer motors, etc.).

The multiphase converter 304, also referred to as a power converter stage, includes three instances of the power converter 200 (or converter block 262) of FIG. 2, one for each phase of the AC grid 302. Each instance includes an upper and a lower switch 235 and 240. Although not illustrated, each switch 235 and 240 may include a respective drain-source capacitor coupled thereacross, as shown in FIG. 2. The multiphase converter 304 is further coupled, via the DC terminals 220, to the battery 306, and via interface terminals 225a,b to the AC grid 302 and AC motor 303. More particularly, the interface terminals 225a,b include three grid connection points 225a (one for each phase of the grid) for connecting to the AC grid 302 and three motor connection points 225b (one for each phase of the motor) for connecting to the AC motor 303. The multiphase converter system 300 includes three LC filters 308. Each LC filter 308 includes components similar to the LC filter 245 of FIG. 2. That is, each LCL filter 308 includes a switch-side inductor 250 (also labeled $L_{fs,a}$, $L_{fs,b}$, or $L_{fs,c}$), a lower capacitor 255 (also labeled $C_{fa}$, $C_{f,b}$, and $C_{f,c}$), an upper capacitor 215 (also labeled $C_{f,a}$, $C_{f,b}$, or $C_{f,c}$). A neutral point 311a of the lower capacitors 255 is coupled to the negative DC terminal 224, such that the neutral point 311 and the negative DC terminal 224 are a common node. Similarly, a neutral point 311b of the upper capacitors 215 is coupled to the positive DC terminal 222. The switch-side inductor 250 is coupled between the midpoint node 242 and the filter node 260. The LC filters 308 are coupled to the AC interface terminals 225a,b via a common mode inductor (LCM) 312. More particularly, the common mode inductor 312 is coupled between the filter node 260 and the interface terminals 225a,b. The common mode inductor 312 may assist in filtering out leakage currents in the system.

In the illustrated example, the multiphase converter system 300 is coupled to the battery 306 and the AC grid 302. In other examples, the multiphase converter system 300 is coupled to a DC source/load other than the battery 306 (e.g., a capacitor, ultracapacitor, DC power supply from rectified AC power, etc.), coupled to a different AC source/load other than the grid 302 and motor 303, and/or coupled to only one of the AC grid 302 or the AC motor 303. Additionally, although the multiphase converter system 300 includes the upper capacitor 215 for each phase, in some examples, the upper capacitors 215 are not included.

As illustrated in FIG. 2 and FIG. 3A, in some examples of the power converter systems provided herein, the LC filter 120 (implemented as LC filter 245 in FIGS. 2 and 308 in FIG. 3A) includes an LC filter for each phase, where a common point of each capacitor is connected to the DC bus negative terminal (and/or positive terminal). This connection creates a bypassing path for zero-sequence voltage control. By leveraging the topological modification and zero voltage control, the common mode voltage can be stabilized to reduce leakage current.

As previously noted, in some examples, the contactor 125 is not present and, rather, the interface terminals 225a and 225b are coupled to both the AC grid 302 and the AC motor 303 simultaneously. In some examples, a torque cancellation scheme may be used such that, when AC power is received from the AC grid 302 via the interface terminals 225a (i.e., to be converted by the converter 304 to charge the battery 306), the received AC power does not cause the AC motor 303 to be driven. That is, power signals on the terminals 225b that may otherwise cause motor torque in the AC motor 303 are effectively cancelled through appropriate control of the power switching elements 235 and 240 of the converter 304. The implemented torque cancellation schemes may be generally known in the art.

Figure 3B:
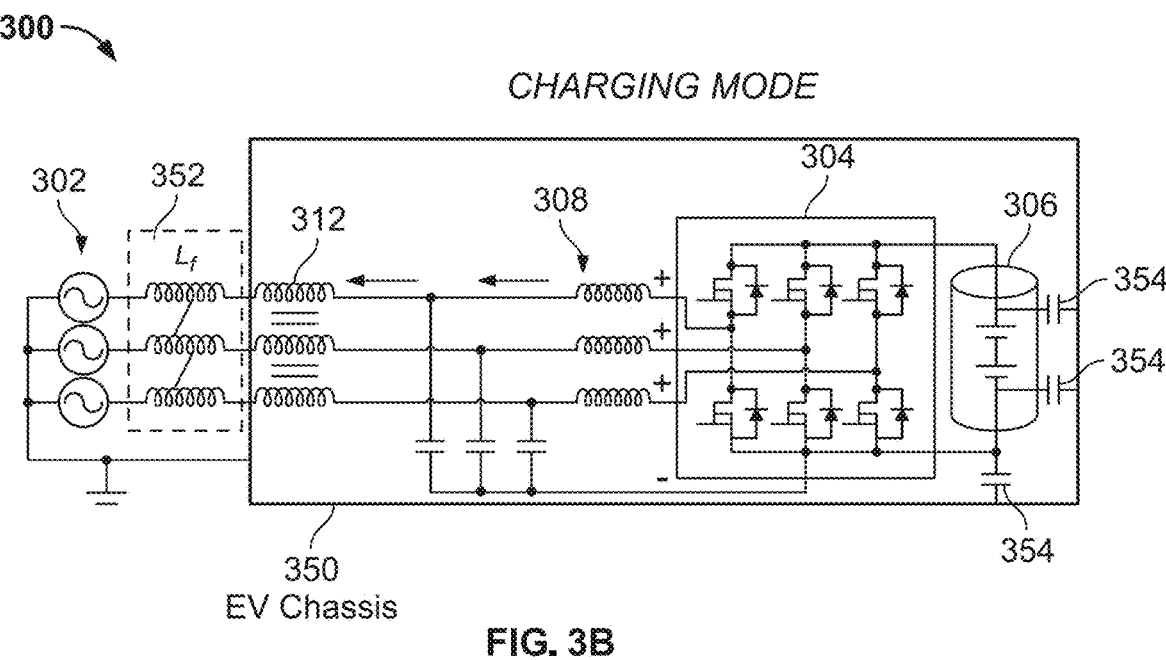
FIGS. 3B-3C illustrate a multiphase power converter in a charging mode and a traction mode, respectively, according to some embodiments.
Figure 3C:
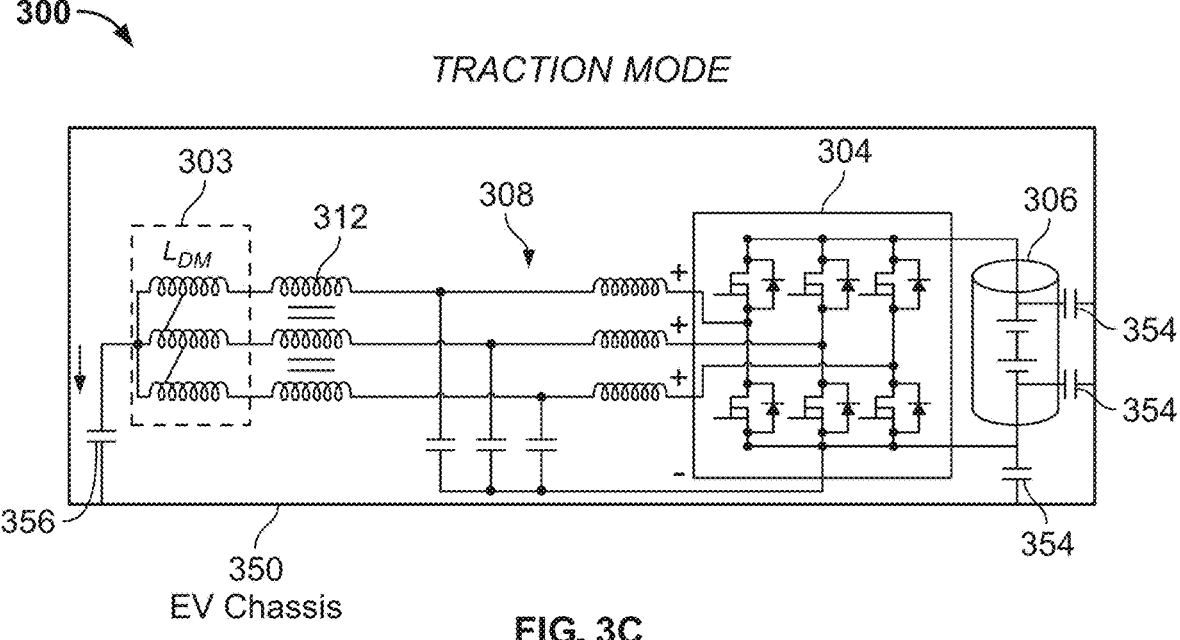

FIGS. 3B and 3C illustrate circuit diagrams for the converter system 300 when incorporated into an electric vehicle (EV), represented by the EV chassis 350. The circuit diagrams illustrate the converter system 300 in two different operational modes: a charging mode in FIG. 3B and a traction mode in FIG. 3C. In the charging mode of FIG. 3B, the converter 304 converts received AC power from the grid 302 to DC power for charging the battery 306. In this mode, the contactor 125 (shown in FIG. 3A) may be configured or controlled to connect the AC terminals 225 to the AC grid 302, and to disconnect from the AC motor 303. Accordingly, the AC motor 303 is not illustrated in the diagram of FIG. 3B (although it is physically still present in the electric vehicle). A grid inductance between the common mode inductor (LCM) and the AC grid 302 is represented by grid inductors 352. A capacitance between the DC source 306 or the DC terminals 220 and the EV chassis 350 is represented by the capacitors 354.

In the traction mode of FIG. 3C, the converter 304 converts received ADCC power from the battery 306 to AC power to drive the AC motor 303, represented in the diagram as a three-phase inductor. In this mode, the contactor 125 (shown in FIG. 3A) may be configured or controlled to connect the AC terminals 225 to the AC motor 303, and to disconnect from the AC grid 302. Accordingly, the AC grid 302 is not illustrated in the diagram of FIG. 3C, although the grid connection points 225a are still present in the vehicle to be able to connect to the AC grid 302. A further capacitance between the AC motor 303 and the EV chassis 350 is represented by the capacitors 356.

In some examples, the system 300 (as well as other power converter systems described herein) provides a transformerless vehicle to grid (V2G) or vehicle to everything (V2X) interface. The systems disclosed herein, including the system 300, may be particularly well-suited for such operation in view of the common mode control (described further below) and the filtering hardware (e.g., LC filter 308) used in these systems. In some examples, the system 300 is included as part of an integrated drivetrain solution (e.g., providing both a traction mode and a charging mode). In other examples, the system 300 is a dedicated on-board charger (e.g., having a charging mode, but not a traction mode) or dedicated traction drive (e.g., having a traction mode, but not a charging mode).

Generally, the system 300 may provide single phase AC, two phase AC, three phase AC, or DC operation. In a V2X interface implementation, the system 300 may interact with the grid 302 to return power or balance the grid 302, interface with photovoltaic and energy storage systems, and/or form a local micro-grid or the like. The control of this V2X interface can be done similar to one or more of the control techniques described below including using (1) global control at the functional level, (2) local control at the device level, and (3) an application interface (e.g., for motoring, charging, solar, three phase operation, AC grid, etc.).

Relative to transformer-based systems, the disclosed converter systems (e.g., system 300, 700, 1200, 1900, etc.) functioning as a transformerless DC EV (bidirectional, fast) chargers removes a galvanic isolation stage to significantly increase the charging efficiency and provide V2G functionality with increased power density. The disclosed systems further provide a non-isolated transformerless topology that allows for the elimination of the additional transformer volume and losses that are present in galvanically isolated topologies. The design can leverage switching frequency and filter parameters to minimize loss and volume as a function of chosen switching device and power level.

Without a transformer, the disclosed transformerless systems and chargers use other techniques to manage common-mode leakage current. This task is achieved, for example, with a zero-sequence voltage control technique that stabilizes the common mode voltage. The charger may include two energy conversion stages: a DC/DC converter for battery side control and a DC/AC converter for grid interface and common mode voltage control that provides charging and V2X services.

Transformerless chargers can be particularly well-suited for traction drivetrain integration. Integrated chargers, where the traction inverter is used as the primary charging interface, can be a solution for reducing the cost and footprint of electric vehicle charging. Additionally, integrating the disclosed transformerless bidirectional non-isolated charging technologies into drivetrains also may increase motor lifetime and reliability through a reduction in bearing currents and voltages, as well as increase motor winding and gear train lifetime.

In an electric machine, such as an electric motor of an electric vehicle, bearing currents and voltages, motor shaft currents and voltages, excessive motor winding currents, and gear train currents, are a major point of failure. Such damaging currents and voltages are generated by the common mode voltage $v_{CM}$. Embodiments disclosed herein help reduce one or more of these currents and voltages, thus preventing or mitigating such damage, and prolonging the lifetime of the electric machines.

Figure 3D:
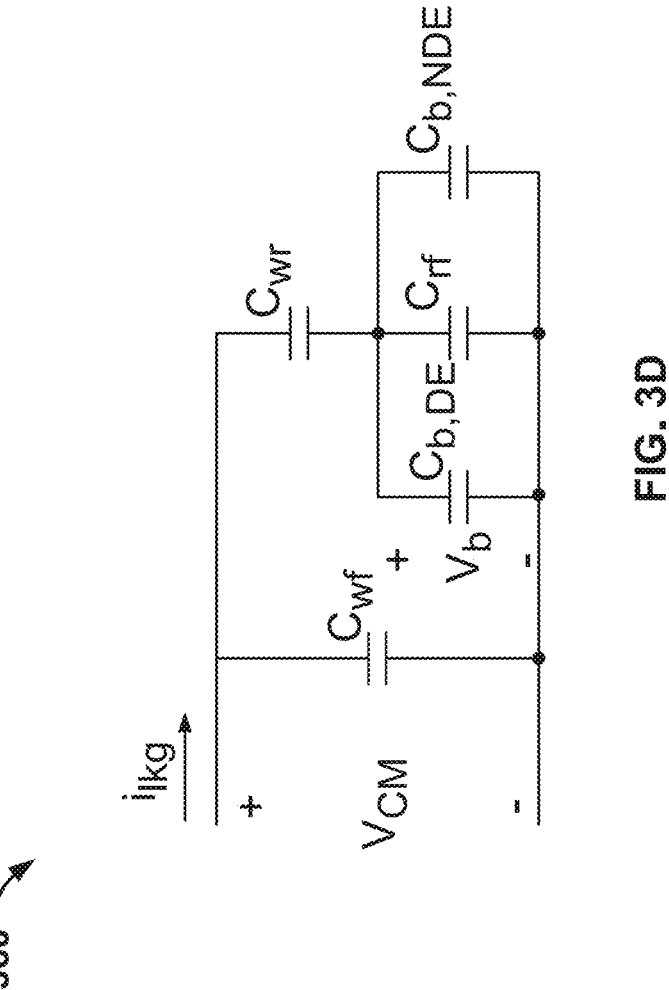
FIG. 3D illustrates a simplified equivalent circuit of parasitic capacitances of an electric machine.

FIG. 3D illustrates a simplified equivalent circuit 360 of an electric machine's parasitic capacitances, such as the AC motor 303 of the electric vehicle incorporating the power converter system 300 as shown in FIGS. 3B-3C. Using this diagram, a bearing voltage ratio (BVR) can be calculated that is indicative of the bearing voltage in the system using the following equation:

$$BVR = \frac{C_{wr}}{C_{wr} + C_{b,NDE} + C_{rf} + C_{b,DE}},$$

where $C_{b,NDE}$ and $C_{b,DE}$ are non-drive end and drive end parasitic capacitances of the bearings of the electric machine, respectively, $C_{wr}$ is a stator winding to rotor capacitance of the electric machine, and $C_{rf}$ is a rotor to frame capacitance. The bearing voltage can then be calculated as $$v_b = v_{CM}BVR.$$

The common mode voltage seen at the terminals of the electric machine (e.g., terminals of the AC motor 303 connected to the motor connection points 225b) with the proposed integrated charger can be broken into two components: a fixed (DC) value across the capacitor $V_{c,CM}$ and an AC disturbance signal $v_{AC}$ superimposed that represents ripple in the control, noise, etc. This gives the common mode voltage $$v_{CM} = v_{c,CM} + v_{AC}.$$

With a well-designed control, $v_{AC}$ will be small, which means that the bearing voltage will be $v_b=(v_{c,CM}+v_{AC})BVR$, i.e. a small DC offset and a very small disturbance due to the switching and control. By keeping $v_{c,CM}$ below the breakdown voltage of the lubricant using the embodiments disclosed herein, damaging electric discharge caused by bearing currents can be avoided.

An approximation of the bearing currents ($i_b$) can be obtained by recognizing that the leakage current $i_{lkg}$ will be divided between $C_{wf}$ and the bearing path. $C_{wf}$ has a low impedance compared to the bearing path; hence, the bearing current $i_b$ will be a fraction of the leakage current. Embodiments provided herein control $v_{CM}$ to be approximately constant, which means that $i_{lkg}$ will be small and, thus, $i_b$ will be very small.

The systems 100 and 300, and other systems disclosed herein, are each an example of a power converter system that may incorporate various features disclosed herein, alone and in combination. In the following sections, this disclosure discuses (I) three phase converter modeling, (II) harmonic injection, (III) cascaded control systems, (IV) model predictive control, (V) state estimation, (VI) variable frequency critical soft switching, and (VI) modular converter blocks. These headings are included for convenience and should not be construed in a limiting manner.

I. Three Phase Converter Modeling

In some examples provided herein, a control scheme for controlling the power converter is based on the dq0 coordinate system. As provided herein, by using the dq0 coordinate system, the control schemes may leverage the zero-sequence voltage component to control the common mode voltage. Compared with the abc system, the active/reactive power and common mode voltage can be controlled independently with d, q, and 0 sequence components in the dq0 system. A coordinate system model of a three-phase converter (e.g., as shown in FIG. 3A) can be derived from the abc reference frame.

The state space equations in abc system are expressed as:

$$i_{L,abc} = \frac{1}{L_{fs}} I v_{x,abc} - \frac{1}{L_{fs}} I v_{c,abc}$$

$$\dot{v}_{c,abc} = \frac{1}{C_f} I i_{L,abc} - \frac{1}{C_f} I i_{o,abc}$$

$$i_{o,abc} = \frac{1}{L_{fg}} I v_{c,abc} - \frac{1}{L_{fg}} I v_{c,abc},$$

where, with reference to FIG. 3A-C, $L_{fs}$, $C_f$ and $L_{fg}$ are the switch side inductor 250, capacitor 255, and grid side inductor 352, respectively. Further, $i_{L,abc}$, $v_{c,abc}$, $i_{o,abc}$ and $v_{x,abc}$ are the switch side inductor current, capacitor voltage, AC interface terminals current, and AC interface terminals voltage, respectively. $I \in \mathbb{R}^{3 \times 3}$ is the identity matrix.

Because it can be difficult to control time-varying sinusoidal references in the abc system, and convenient to calculate the active/reactive power and stabilize zero-sequence voltage in the dq0 system, the state space model is transformed to the dq0 reference frame for control purposes. For example, the dq0 coordinate system transformation is helpful because the dq0 system can transfer the time-varying sinusoidal waveforms to equivalent constant DC values. For the implementation of control, the DC values may be easier to control than AC values. However, traditional methods mainly utilize the dq system without considering the 0 (zero-sequence) component. The topology of the converter system 300, where the common point of AC three-phase capacitors are connected to the DC bus positive and/or negative terminals, permits extraction of the zero-sequence from the abc system to the dq0 system, and control of the zero-sequence voltage to be half of the DC bus voltage. Thus, the common mode voltage $v_{cm}$ is a zero-sequence component and can be stabilized as constant accordingly.

For the reference frame transformation with zero-sequence components, abc system may first be transformed to αβ0, and then to dq0 system. From abc to αβ0, the Clarke transform is applied as:

$$x_{\alpha\beta0} = T x_{abc} = \frac{2}{3} \begin{bmatrix} 1 & -1/2 & -1/2 \\ 0 & \sqrt{3}/2 & -\sqrt{3}/2 \\ 1/2 & 1/2 & 1/2 \end{bmatrix} x_{abc}.$$

In the αβ0 system, the signals are composed of two orthogonal sinusoidal AC waveforms in α and β frames and a zero-sequence component. A Park transform is implemented secondly to convert the stationary reference frame of αβ0 to the rotating dq0 system, which is calculated as:

$$x_{dq0} = P(\theta) x_{\alpha\beta0} = \begin{bmatrix} \cos\theta & \sin\theta & 0 \\ -\sin\theta & \cos\theta & 0 \\ 0 & 0 & 1 \end{bmatrix} x_{\alpha\beta0}.$$

where θ is the phase angle of the grid (or other AC source/load coupled to the converter). In some examples, the phase angle θ is tracked with a phase-locked-loop (PLL) controller (see, e.g., PLL 420 in FIG. 4) by measuring the grid voltage at a point of common coupling (PCC), as described in further detail below. Thus, the AC sinusoidal signals in abc are converted to DC values in the dq0 (rotating) reference frame with a time-varying angle of θ. The control reference signals to implement the duty cycles for driving the power switching elements of the converters may be in the abc (stationary) reference frame format for the PWM modulation. Accordingly, the inverse Clarke and Park transformations may be applied to convert the output of the control signals from dq0 to abc:

$$x_{abc} = T^{-1} x_{\alpha\beta0} = T^{-1} P(\theta)^{-1} x_{dq0}.$$

Based on the above Park and Clarke equations of the coordinate system transformations, the state space equations above can be transformed from abc to dq0:

$$i_{L,dq0} = \frac{1}{L_{fs}} I v_{x,dq0} - \frac{1}{L_{fs}} I v_{c,dq0} - \omega G i_{L,dq0}$$

$$\dot{v}_{c,dq0} = \frac{1}{C_f} I i_{L,dq0} - \frac{1}{C_f} I i_{o,dq0} - \omega G v_{c,dq0}$$

$$i_{o,dq0} = \frac{1}{L_{fg}} I v_{c,dq0} - \frac{1}{L_{fg}} I v_{c,dq0} - \omega G i_{o,dq0}$$

where ω is the angular velocity of the grid in rad/s. G is the matrix for the coupling terms resulted from the transformation:

$$G = \begin{bmatrix} 0 & -1 & 0 \\ 1 & 0 & 0 \\ 0 & 0 & 0 \end{bmatrix}.$$

In both traction and charging modes, it can be assumed that the neutral point is isolated (or floating, in the sense that the system does not form an intentional common mode conduction path), meaning that the zero sequence component can be ignored. In charging mode, the three-phase grid is modelled as voltage sources at the point of common connection at the capacitors. In traction mode, the motor terminal voltages, normally referred to as $v_{dq}$ in drives literature, are now $v_{c,dq}$; likewise, the motor currents, normally referred to as $i_{dq}$, are now $i_{o,dq}$ in the topology. Changing the notation of the standard PMSM model yields $$i_{o,d} = \frac{1}{L_d} (v_{c,d} - R_s i_{o,d} + \omega L_q i_{o,q})$$

$$i_{o,q} = \frac{1}{L_q} (v_{c,q} - R_s i_{o,q} - \omega (L_d i_{o,d} + \psi))$$

where $L_d$ and $L_q$ are the d- and q-axis inductances of the motor, respectively; $R_s$ is the stator winding resistance; ψ is the flux of the permanent magnets; and ω is the electrical angular velocity of the rotor, which is linked to the mechanical angular velocity $\omega_m$ by the pole pairs $p_p$ by $\omega = p_p \omega_m$.

By leveraging the dq0 state space equations and the connection of three-phase capacitors common point with DC bus positive/negative terminals, the zero-sequence voltage can be controlled explicitly to stabilize the $u_{cm}$.

In some examples, another rotating reference frame other than the dq0 reference frame is used by the control system 105.

II. Harmonic Injection for Zero Sequence Voltage Control

In some power converter applications, such as a grid-connected power converter for an electric vehicle (EV) charger for photovoltaic (PV) array, leakage current and DC bus utilization are two factors that influence converter performance. To address leakage current, a bulky line frequency transformer is typically installed to block the leakage path at the point of common coupling (PCC) which increases the cost, volume and weight of the system. To improve DC bus utilization, the DC bus voltage may be stepped up (e.g., to be at least twice of the grid voltage amplitude to avoid a saturation issue), which brings extra switching losses and challenges to the switch voltage tolerance capability.

To address these and other issues, in some examples, a harmonic signal is injected into the power converter systems provided herein, which may also be non-isolated (transformerless) converters. Conventional harmonic injection involves direct injection in a duty cycle used to modulate switching elements, which reduces control stability and robustness, divergence can occur in the PWM modulation, and extra harmonics are injected into the grid, which deteriorates the power quality of the grid voltage and current. In contrast, in some examples provided herein, systems and methods provide harmonic injection for zero sequence voltage control. The disclosed systems and methods improve DC bus utilization without reduced control stability and robustness, and without injecting additional harmonics into a grid (or other AC source or load).

In some embodiments, a power converter system (e.g., the system 100) has a non-isolated N-phase power converter and a control system that injects a multiple of an N-th phase harmonic for zero sequence voltage control. For example, in the case of a three-phase power converter (i.e., N=3), the injected harmonic may be a third harmonic injection (THI), a sixth harmonic injection, etc. Additionally, rather than injecting a harmonic directly to a duty cycle for modulation, in some examples, the system injects the harmonic (e.g., a sinusoidal or triangular wave voltage signal) into a zero-sequence voltage control signal of a set of direct quadrature zero-sequence (dq0) rotational reference frame control signals. The control signals may also be referred to as rotational reference frame reference targets. This approach provides additional regulation via constraints on the dq0 rotational reference frame control signals that would not otherwise be applied if the harmonic was injected directly to a duty cycle for modulation. Thus, the stability and robustness of the system may be improved relative to direct duty cycle side injection techniques.

Figure 4:
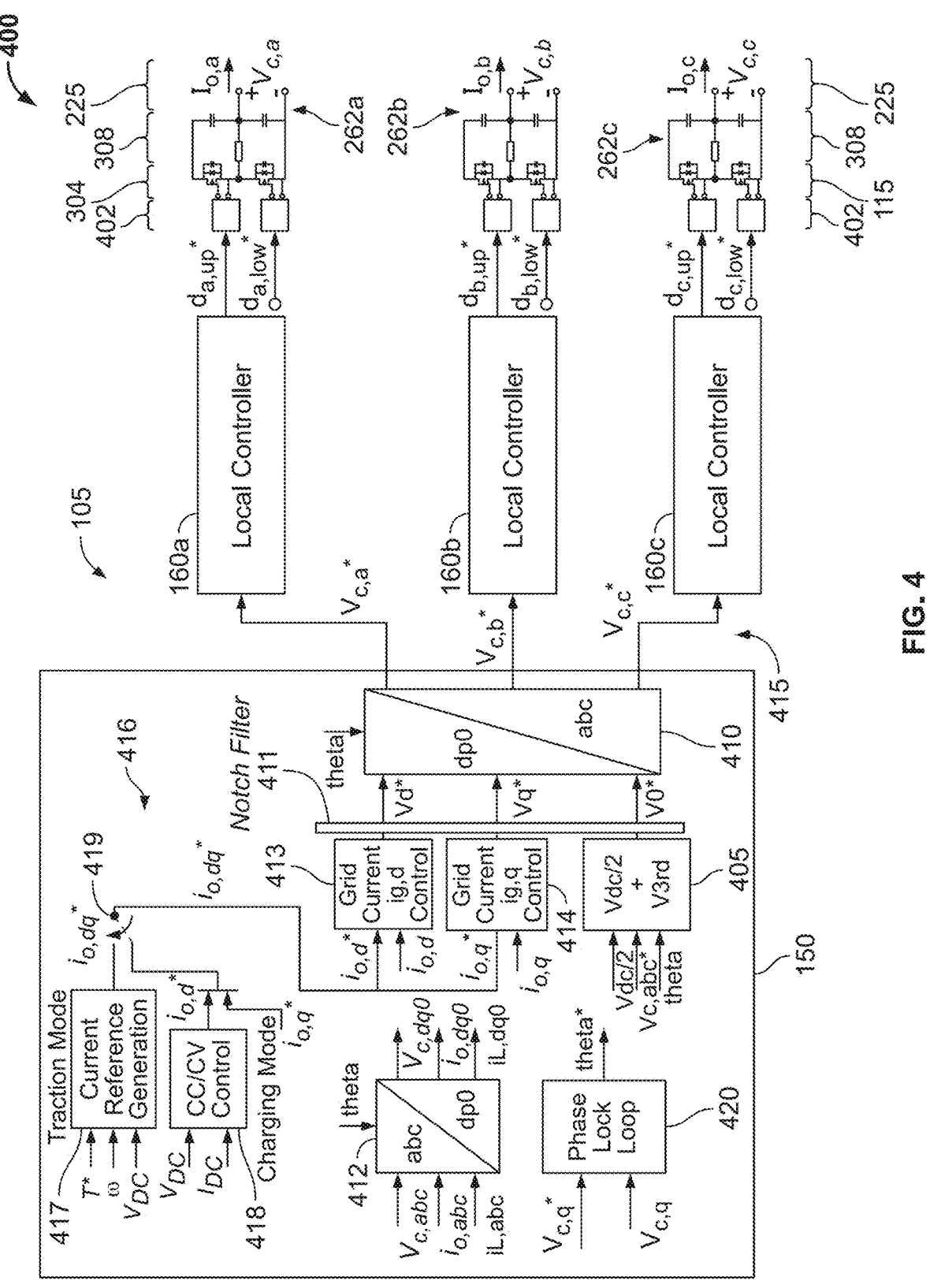
FIG. 4 illustrates a converter system according to some embodiments.

For example, with reference to FIG. 4, a power converter system 400 is illustrated, which may be an example of the power converter system 100 of FIG. 1. As illustrated, the power converter system 400 is a non-isolated, three-phase power converter that includes a control system 105 including the central controller 150 and three local controllers 160a-c (each an instance of the local controller 160 of FIG. 1). The local controllers 160a-c may each be associated with and control a respective converter block 262a-c corresponding thereto. The converter blocks 262a-c may be instances of the converter block 262 described with respect to FIG. 2. The local controllers 160a-c may implement a particular control scheme to perform the control of the associated converter block 262a-c. For example, the local controller 160a-c may implement model predictive control (MPC), as described further below, a proportional-integral (PI) control, a proportional-integral-derivative (PID) control, or another type of control or regulation. In some embodiments, rather than a cascaded control system as illustrated, the control system 105 does not include the local controllers 160a-c. For example, instead, the reference voltages generated by the central controller 150 are mapped directly to respective duty cycle values (e.g., by a lookup table) that are provided to respective gate drivers 402 for each power switching element of the converter.

As illustrated, the central controller 150 receives electrical characteristics of the power converter 304 (e.g., $i_{L,abc}$; $i_{g,abc}$, $v_{g,abc}$) in the stationary (abc) reference frame, receives reference electrical characteristics (e.g., $i_{g,d}^*$; $i_{g,q}^*$, $v_{g,q}^*$), and determines a fundamental frequency (theta or θ) of the AC load/source (e.g., AC grid) coupled to the terminals 225. Based on these received and determined values, the central controller 150 generates control reference signals in the dq0 reference frame. The central controller 150 then translates the control reference signals to the stationary (abc) reference frame via a dq0/abc reference frame translator 410 and provides these control reference targets 415 (e.g., $v_a^*$, $v_b^*$, and $v_c^*$) to the local controllers 160a-c. In some examples, a notch filter 411 is provided to compensate for resonance that may exist in the system. For example, the notch filter 411 can be added at a cutoff frequency of each of the dq0-axes. The notch filter 411 can be designed in continuous-time as $$\frac{s^2 + \omega_{res}^2}{s^2 + \dfrac{\omega_{res}}{Q} + \omega_{res}^2},$$

and can be implemented in discrete-time as difference equations. In some examples, the notch filter 411 is not included in the system 400.

More particularly, the central controller 150 translates the received electrical characteristics of the power converter 304 from the stationary reference frame to the dq0 reference frame (e.g., via abc/dq0 translator 412). The central controller 150 further compares the translated electrical characteristics to the reference electrical characteristics in the dq0 reference frame (e.g., $i_{g,d}^*$ to $i_{g,d}$, and $i_{g,q}^*$ to $i_{g,q}$) to generate d and q components of a voltage control reference signal (e.g., $v_d^*$ and $v_q^*$). For example, a regulator 413 (e.g., PI or PID controller) may perform the comparison of the d component of the reference and translated grid current values ($i_{g,d}^*$ and $i_{g,d}$) to generate a resulting d component of the voltage control reference signal ($v_d^*$). Similarly, a regulator 414 (e.g., PI or PID controller) may perform the comparison of the q component of the reference and translated grid current values ($i_{g,q}^*$ and $i_{g,q}$) to generate a resulting q component of the voltage control reference signal ($v_q^*$). These d and q components of the voltage control reference signal are provided to the dq0/abc translator 410. The d and q components of the reference electrical characteristics (e.g., $i_{g,d}^*$ and $i_{g,q}^*$) may be provided to the central controller 150 by the I/O interface 142 (see FIG. 1) based on a received user input command, from a memory (e.g., the memory 157), or another source.

To generate the reference electrical characteristics in the dq0 reference frame for the regulators 413 and 414, the central controller 150 further includes reference characteristic block 416 including a current reference generator 417, a constant current/constant voltage (CC/CV) controller 418, and a selector 419. When the system 400 is in a traction mode, the selector 419 may select the output of the current reference generator 417 to serve as the reference electrical characteristics (e.g., $i_{o,dq}^*$). When the system 400 is in a charging mode, the selector 419 may select the output of the CC/CV control to serve as the reference electrical characteristics (e.g., $i_{o,dq}^*$). The current reference generator 417 receives as input a torque reference (e.g., an input torque command from a memory 157 or user input provided via I/O 142), an angular speed (ω) of the AC motor 303 (see FIG. 3A), and $V_{DC}$ (e.g., the voltage across DC terminals 220, which may be provided by a voltage sensor of the sensor 140). The current reference generator 417 may implement a lookup table (e.g., populated through experimentation) or a real-time function that maps the three inputs to reference electrical characteristics (e.g., output current $i_{o,dq}^*$ for driving the motor 303). The lookup table or function may implement, for example, a maximum torque per Ampère control technique.

The CC/CV controller 418 receives as input $V_{DC}$ (e.g., the voltage across DC terminals 220, which may be provided by a voltage sensor of the sensors 140) and IDC (e.g., the current passing through the DC terminals 220, which may be provided by a current sensor of the sensors 140). The CC/CV controller 418 may implement a lookup table (e.g., populated through experimentation) or a real-time function that maps the two inputs to a reference electrical characteristic (e.g., a d-axis output current $i_{o,d}^*$ for charging the battery 306 (see FIG. 3)). The d-axis current reference $i_{o,d}^*$ corresponds to active power. In some cases, e.g., if grid support is desired, a reactive power reference $i_{o,q}^*$ can be added as well. In some examples, the CC/CV controller has two states: a constant current state in which the system 400 pushes a constant current until the battery 306 has a state-of-charge (SOC) that is near peak; and a constant voltage state that applies a constant voltage that trickle-charges the battery 306 to complete the charging cycle.

For the zero-sequence (0) reference component, the power converter system 400, uses a harmonic injector 405 (e.g., provided as part of the central controller 150). That is, the harmonic injector 405 generates the harmonic injection and provides the zero-sequence component target to the dq0/abc reference frame translator 410.

As illustrated in FIG. 4, the harmonic injector 405 receives a DC offset (e.g., $V_{dc}/2$), the fundamental frequency of an AC section of the power converter 115 (theta or θ), and the control reference targets 415 for each phase of the power converter 115. In this example, the control reference targets 415 (also referred to as power reference targets) are voltage references $V_{c,a*}$, $V_{c,b*}$, and $V_{c,c*}$ output by the translator 410 that refer to a target voltage for the lower capacitor of the control block 262*a-c* (e.g., with reference to FIGS. 2 and 3, capacitor 255). The harmonic injector 405 may calculate the zero-sequence component target based on these characteristics. Accordingly, the harmonic injector 405 may also be referred to a zero-sequence reference generator. In some embodiments, the harmonic injector 405 calculates the zero-sequence reference component by summing two components (i) the DC offset and (ii) a multiple of N-th phase harmonic injection.

The first component, the DC offset, may be set to be half of the DC bus voltage ($V_{dc}/2$). This DC offset component of the zero-sequence reference ultimately blocks leakage current from flowing to the grid. That is, the zero-sequence output current can be attenuated by the stabilization control of zero-sequence capacitor voltage, which is provided by this DC offset being used as an input for the zero-sequence voltage reference. The working principle of zero sequence voltage control is based on the three-phase output capacitor voltage reference tracking. Specifically, in the central controller 150, the zero-sequence component of the reference is designed as half of DC bus voltage measurement, $V_{dc}/2$. This reference is combined with dq components references from the output of the regulators 413 and 414, and then transformed into abc reference frame as control reference targets 415 for the local controllers 160*a-c*. Each of the control reference targets 415 may thus be composed of a sinusoidal AC component (based on the dq inputs to the translator 410) and a zero sequence DC component (based on the zero-sequence (0) input to the translator 410). Thus, based on the control reference targets 415 having zero-sequence control integrated therein, the local controllers 160*a-c* regulate zero sequence voltage control, providing a stabilized common mode capacitor voltage and low leakage current. In some examples of the converter 300, because this DC offset as a zero-sequence voltage reference provides advantages on its own, the DC offset is provided to the translator 410 as the zero-sequence voltage reference without the addition of harmonic injection (e.g., the output of injector 405 may be the DC offset ($V_{dc}/2$)).

In other examples, injection of a N-th phase harmonic along with this DC offset can further improve DC bus utilization. By injecting the N-th harmonic into the zero-sequence voltage reference (i.e., summing with the DC offset), these two components form the zero-sequence portion of the control reference targets 415 for the local controllers 160*a-c*. Thus, the local controllers 160*a-c* of each phase will regulate the capacitor voltage ($v_{c,abc}$) with the same zero-sequence DC offset and third order harmonic to stabilize the common mode voltage and reduce the peak-to-peak voltage value.

The harmonic injector 405 may calculate the multiple of N-th phase harmonic injection based on the fundamental frequency and the control reference targets 415. Thus, in some embodiments, the multiple of N-th phase harmonic injection may be considered a feedback signal that is calculated from N previous control reference targets generated by the control system in the stationary (abc) reference frame based on previously received rotational reference frame targets. In some embodiments, the multiple of N-th phase harmonic injection is a sinusoidal signal. The harmonic injector 405 may derive the sinusoidal signal based on an N-th order of a fundamental frequency of the AC voltage section of the power converter. In other embodiments, the N-th phase harmonic injection is a triangular signal. The harmonic injector 405 may derive the triangular signal based on mean values of maximum and minimum values of the fundamental frequency (θ) of the AC voltage section of the power converter. Example equations that the harmonic injector 405 may use to calculate the sinusoidal or triangular signals are provided below.

The sinusoidal injection for a third harmonic injection (Sin-RTHI), may be implemented by deriving the third order of grid fundamental frequency (θ) component to be superimposed to the zero-sequence voltage reference. The Sin-RTHI zero-sequence voltage reference can be expressed as:

$$v_{0,3rd}^* = v_{dc}/2 + V_m D_{3rd}\sin(3\omega t).$$

Figures 5A, 5B:
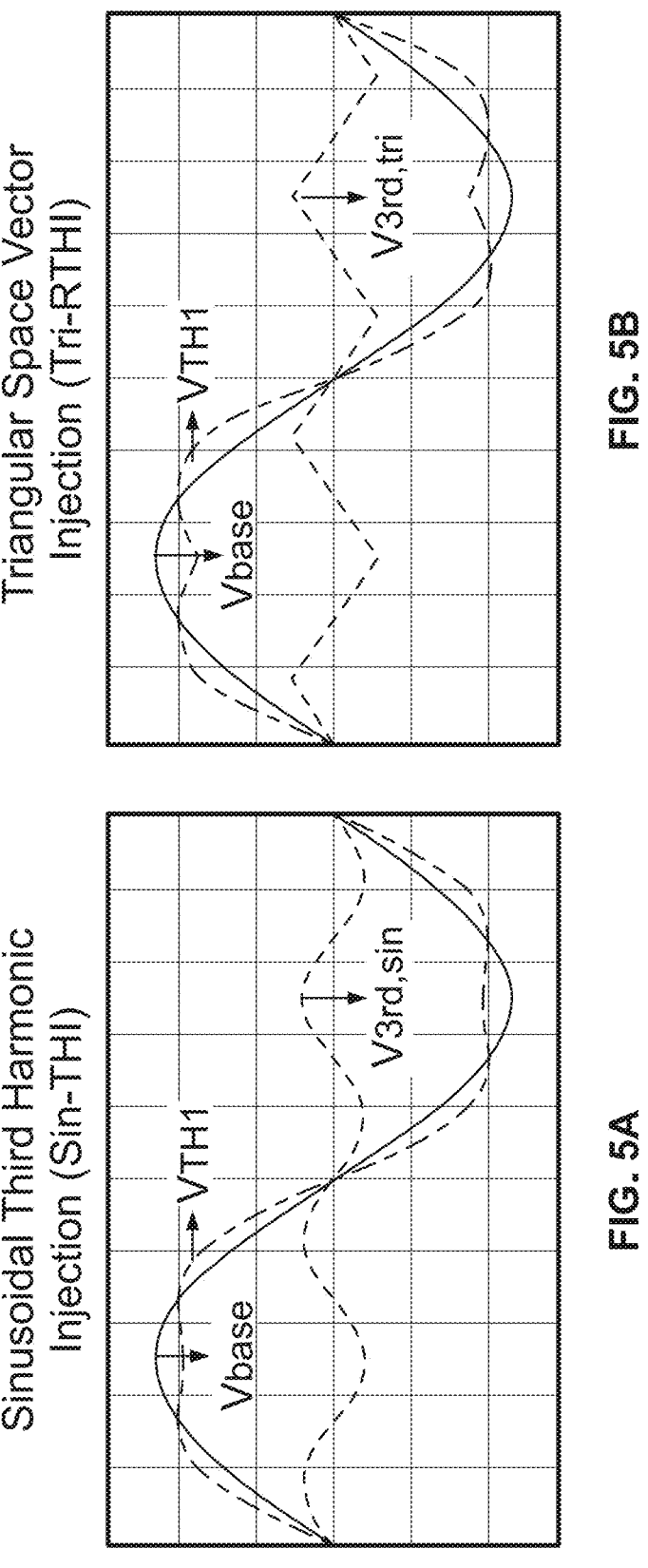
FIGS. 5A and 5B illustrate waveforms for third harmonic injection according to some embodiments.

Thus, the abc frame Sin-RTHI three-phase capacitor voltage references, $v_{c,abc}^*$, distributed to the local controllers 160*a-c* can be expressed as $$v_{c,a}^* = v_{c,a}^* + V_m D_{3rd} \sin(3\omega t)$$

$$v_{c,b}^* = v_{c,b}^* + V_m D_{3rd} \sin\left(3\left(\omega t - \frac{2\pi}{3}\right)\right)$$

$$v_{c,c}^* = v_{c,c}^* + V_m D_{3rd} \sin\left(3\left(\omega t + \frac{2\pi}{3}\right)\right).$$

where $V_m$ and $D_{3rd}$ are the amplitude of fundamental component and third harmonic injection depth, respectively. The angular speed, $\omega$, and phase shift can be derived based on fundamental frequency theta ($\theta$). A phase-locked loop (PLL) controller 420 of the central controller 150 may provide theta ($\theta$) to provide real-time phase angle information of the AC voltage (e.g., grid or AC motor voltage). For example, a PI controller may be used to control the q component of the grid voltage, $v_{g,q}$, to be zero to derive the angular velocity, $\omega$, of the phase angle. Then, theta ($\theta$) can be calculated with a period of $2\pi$, and based on the active/reactive power calculation in $$\begin{bmatrix} P \\ Q \end{bmatrix} = \frac{3}{2}\begin{bmatrix} v_{g,d} & v_{g,q} \\ v_{g,q} & -v_{g,d} \end{bmatrix}\begin{bmatrix} i_{g,d} \\ i_{g,q} \end{bmatrix}$$

where the d-axis and q-axis represent the active and reactive power, respectively. Specifically, theta ($\theta$) is derived by accumulating the product of control time period, Ts, and angular velocity, $\omega$, in each control period and performing a modulus operator function to ensure the theta ($\theta$) is within [0,2pi]. Theta ($\theta$) is also used in other calculations of the converter system, such as the translations by the translator 410 and the translator 412, By leveraging the harmonic injection to the zero-sequence voltage, the peak to peak capacitor voltage can be reduced to improve the DC bus utilization and avoid the duty cycle saturation in lower DC bus voltage. FIG. 5A shows, for Sin-RTHI, the simulation waveforms of third order, fundamental frequency, and injected capacitor voltages in one grid period.

The triangular space vector for a third harmonic injection (Tri-RTHI) may be implemented by deriving the mean value of maximum and minimum grid fundamental frequency component capacitor voltage to be superimposed to the zero-sequence voltage reference. The Tri-RTHI zero-sequence voltage reference can be expressed as:

$$v_{0,3rd}^* = v_{dc}/2 - D_{3rd}\left[\max(v_{c,abc}^*) + \min(v_{c,abc}^*)\right].$$

Thus, the abc frame Tri-RTHI three-phase capacitor voltage references, $v_{c,abc}^*$, distributed to the local controllers 160a-c can be expressed as $$v_{c,a}^* = v_{c,a}^* - D_{3rd}\left[\max(v_{c,abc}^*) + \min(v_{c,abc}^*)\right]$$

$$v_{c,b}^* = v_{c,b}^* - D_{3rd}\left[\max(v_{c,abc}^*) + \min(v_{c,abc}^*)\right]$$

$$v_{c,c}^* = v_{c,c}^* - D_{3rd}\left[\max(v_{c,abc}^*) + \min(v_{c,abc}^*)\right].$$

FIG. 5B shows, for Tri-RTHI, the simulation waveforms of third order, fundamental frequency and injected capacitor voltages in one grid period.

As is shown in FIGS. 5A-B, the DC bus utilization can also be improved to avoid the duty cycle saturation issue. To evaluate the effectiveness of the injected third harmonic in FIGS. 5A-B, a voltage gain can be defined as the ratio of the fundamental component capacitor voltage peak value, $v_{base}$, to the reference modulation waveform peak value, $v_{THI}$, $$G_v = \frac{v_{base}}{v_{THI}}.$$

The maximum voltage gain of the continuous third harmonic injection methods can be derived at the $\pi/3$ when the third harmonic is at zero crossing point. Thus, $$G_{v,max} = \frac{1}{\sin(\pi/3)} \approx 1.155.$$

By leveraging the disclosed harmonic injection techniques, the DC bus voltage can be reduced (e.g., by a factor of 1.15) and the voltage stress and switching losses on the power switching elements can be decreased, accordingly.

In some embodiments, instead of using the control reference targets 415 for each phase of the power converter 115 (here, $V_{c,a*}$, $V_{c,b*}$, and $V_{c,c*}$) to calculate the multiple of N-th phase harmonic injection, the harmonic injector 405 may derive the N-th phase harmonic injection from direct or indirect voltage measurements of each phase of the power converter 115. For example, for direct voltage measurements, the harmonic injector 405 may receive an output from a respective voltage sensor for each of the N phases of the power converter 115, or from an analog-to-digital converter (ADC) that converts the respective analog outputs of the voltage sensors to digital signals indicative of the voltage measurements. As another example, for indirect voltage measurements, the harmonic injector 405 may receive one or more communications from the local controller(s) 160 that indicates voltage measurements for each of the N phases of the power converter 115. Here, the local controller(s) 160 may directly measure the voltages and communicate the measured values as the voltage measurements to the harmonic injector 405. In both the direct and indirect examples, the voltage measurements may each be a voltage measured across a capacitor (e.g., lower capacitor $C_B$ or $C_f$ 255) of an LC filter of each phase of the power converter 115 (e.g., $V_{c,a}$, $V_{c,b}$, and $V_{c,c}$).

In these embodiments that use direct or indirect voltage measurements, the multiple of N-th phase harmonic injection may be considered a feedback signal that is calculated from at least N voltage measurements including at least one voltage measurement per phase of the power converter 115. In some of these embodiments, the multiple of N-th phase harmonic injection is a sinusoidal signal or a triangular signal. The above-noted example equations that the harmonic injector 405 may use to calculate the sinusoidal or triangular signals, may similarly be used to calculate the sinusoidal or triangular signals in these embodiments, with the voltage measurement signals replacing the control reference targets in the equations, respectively.

Additionally, in some embodiments of the power converter system 100, N is 3 and the multiple of N-th phase harmonic injection is a third order of a fundamental frequency of the AC voltage section of the power converter. However, as previously noted, in some embodiments, N may be another integer value, and/or another multiple of the N-th phase harmonic may be selected as well.

Although described with respect to the system 400 of FIG. 4, the harmonic injection feature may be incorporated into the other power converter systems disclosed herein, at least in some examples.

III. Cascaded Control System

In some embodiments, a power converter system has a non-isolated N-phase power converter and a cascaded control system. A cascaded control system includes a central controller and at least one local controller. For example, with reference to the systems 100 and 400 of FIGS. 1 and 4 above, the control system 105 may be a cascaded control system including the central controller 150 cascaded with one or more local controllers 160. When the control system 105 is referred to as the cascaded control system 105 herein, the control system 105 should be understood to include at least one of the optional local controllers 160 in addition to the central controller 150. The cascaded control system 105 may provide, for example, resonance damping, improved dynamic performance, and/or leakage current attenuation capabilities. Additionally, the cascaded control system 105 can improve the modularity of the components (e.g., easing the addition and removal of local controllers and corresponding converter blocks as modular autoconverter modules), as described in further detail below with respect to FIGS. 18A, 18B, and 19

In some embodiments of the cascaded control system 105, the central controller 150 provides an outer loop of control, while each of the local controllers 160 provides a distinct inner loop of control. For example, the central controller 150 may implement a PI controller, PID controller, or other regulating controller, that regulates the control for the power converter 115 in a rotating reference frame (e.g., the dq0 reference frame). As part of the outer loop of control, the central controller 150 generates control reference targets (e.g., targets 415) based on the regulation in the rotating reference frame. The control reference targets may be generated in the stationary (abc) reference frame. Additionally, the central controller 150 may provide the control reference targets to the local controllers 160. The local controllers 160 may be configured to control one or more of the N phases of the power converter 115, where the control of the N phases of the power converter 115 is divided up among the local controllers 160. Thus, each phase of the power converter 115 may be associated with and controlled by a particular local controller 160.

Each respective local controller 160 implements the inner loop control via model predictive control (MPC), PI control, PID control, or another regulating technique, based on the control reference targets (e.g., targets 415) received from the central controller 150. For example, each local controller 160 may also receive a voltage measurement or estimate for the voltage across the lower capacitor 255 ($v_c$) associated with the same phase or converter block 262 as the local controller. Based on the measured or estimated capacitor voltage ($v_c$) and the control reference target (e.g., $v_c^*$), each local controller 160 may control its associated converter block 262 to adjust or control the switching of the power switching elements to achieve (or tend towards) a capacitor voltage ($v_c$) that is equal to the reference control target. The inner loop control provided by the respective local controllers 160 includes the generation of control signaling provided to the power switching elements of the power converter 115 (or, in FIG. 3A, converter 304). For example, with reference to FIGS. 3A-C and 4, the local controller 160a provides control signaling to the power switching elements 235, 240 (M1, M2) of a first phase of the power converter 115, the local controller 160b provides control signaling to the power switching elements 235, 240 (M3, M4) of a second phase of the power converter 115, and the local controller 160c provides control signaling to the power switching elements 235, 240 (M5, M6) of a third phase of the power converter 115.

The central controller 150 and the local controllers 160 may communicate with each other in real time (e.g., each control cycle) both monitoring information (e.g., sensor data) and control information. For example, each local controller 160 may determine and transmit, in real time to the central controller 150, electrical operational characteristics particular to the phase or phases of the power converter 115 with which the local controller 160 is associated. For example, with reference to FIG. 4, these electrical operational characteristics may include one or more of $V_{c,abc}$, $i_{o,abc}$, and $i_{L,abc}$ (e.g., $V_{c,a}$, $i_{o,a}$, and $i_{L,a}$ from local controller 160a; $V_{c,b}$, $i_{o,b}$, and $i_{L,b}$ from local controller 160b; and $V_{c,c}$, $i_{o,c}$, and $i_{L,c}$ from local controller 160c). In some embodiments, the local controllers 160 provide other electrical operational characteristics. Additionally, the central controller 150 may determine and transmit, in real time to the respective local controllers 160, the control reference targets (e.g., 415). Although the control reference targets 415 are illustrated as voltage reference targets, in some examples, the control reference targets 415 are current reference targets (e.g., $i_{L,abc}^*$ or $i_{o,abc}^*$). In such examples, the local controllers 160 may control the power switching elements of their respective phases in accordance with the current reference targets.

Figure 6:
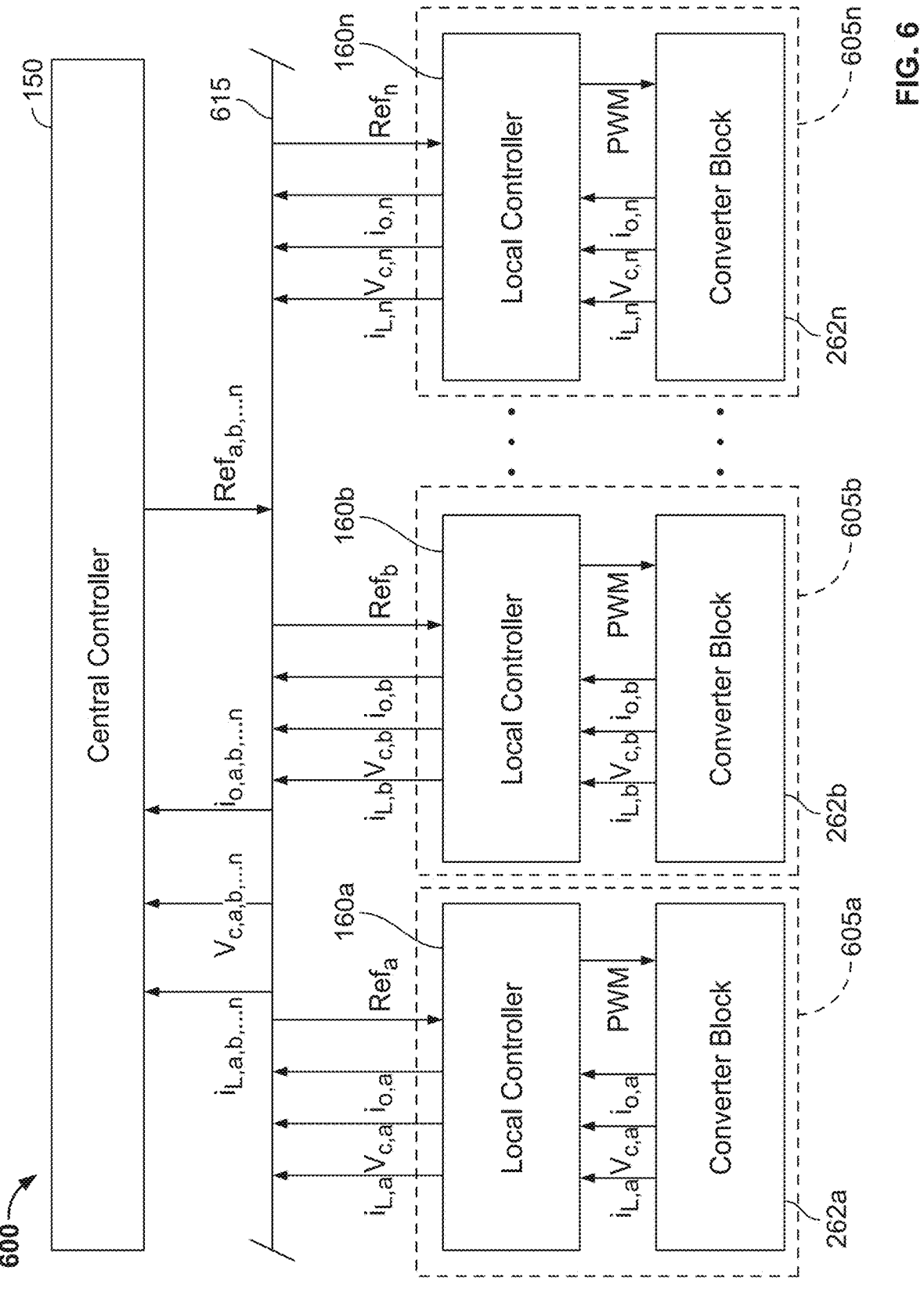
FIG. 6 illustrates a communication system for a cascaded control system according to some embodiments.

FIG. 6 illustrates a communication system 600 for a cascaded control system, such as described above with respect to the converter system 400 and other converter systems provided herein. The communication system 600 illustrates an example of the communications for at least some examples of the converter system 100 and the converter system 400 (e.g., where n=3). For example, the communication system 600 is an example of a communication system that enables the communications described above with respect to the cascaded control system of FIG. 4.

The communication system 600 includes the central controller 150 and local systems 605a-n. Each local system includes a respective local controller 160a-n and a respective local converter or converter block 262a-n (instances of the converter block 262 described with respect to FIG. 2). The central controller 150 and local controllers 160a-n are communicatively coupled via a communication bus 615. The communication bus 615 may include a collection of dedicated communication paths between each local controller 160 and the central controller 150, may include shared communication paths between the local controllers 160 and the central controller 150 (e.g., where communications include addressing information to identify an intended destination device), or a combination thereof.

As noted, the central controller 150 and the local controllers 160 may communicate with each other in real time (e.g., each control cycle) both monitoring information (e.g., sensor data) and control information. For example, the local controllers 160 may determine and transmit to the central controller 150 electrical operational characteristics including one or more of $V_{g,abc}$, $i_{g,abc}$, and $i_{L,abc}$, and the central controller 150 may determine and transmit the control reference targets 415 (e.g., which may be $v_{c,abc}^*$, $i_{L,abc}^*$, or $i_{o,abc}^*$) based on the received electrical operational characteristics. The local controllers 160 may further generate and transmit PWM control signals to their corresponding converter block 262. The PWM control signals output by the local controllers 160 may indicate a duty cycle and/or a frequency for a PWM signal that drives a gate terminal of each power switching element of the converter block 262, or may be the PWM signal itself. Each converter block 262 may further includes a respective gate driver for driving the power switching elements of the converter block, or the gate driver for a local converter system 605 may be considered part of the corresponding local controller 160.

As discussed in further detail below, in some embodiments, a state estimator (e.g., state estimator 900 of FIG. 9) is associated with each of the local controllers to provide an estimation of one or more of the electrical operational characteristics for the phase associated with the local controller based on samplings of other electrical characteristics for the phase. For example, the state estimator may implement a Luenberger observer technique that estimates the switch side inductor current for a phase (also referred to herein as inductor current $i_{L,abc}$) based on the capacitor voltage ($v_{c,abc}$) and grid side inductor current ($i_{o,abc}$) for the phase. Use of a state estimator can reduce the number of sensors used in the system to provide the MPC controllers with the electrical characteristics, thereby reducing costs and/or size of the motor circuitry.

In some embodiments, the cascaded control system further incorporates one or both of harmonic injection, as described above, or MPC for active damping to mitigate resonance, as described below.

IV. Model Predictive Control

In some embodiments, a power converter system has a non-isolated N-phase power converter and a control system that utilizes model predictive control (MPC). When used in a power converter system (e.g., the system 100 and 400), MPC may provide, for example, active resonance damping, improved dynamic performance, and/or leakage current attenuation capabilities.

A controller of the control system 105, such as the central controller 150 or the local controllers 160, implementing MPC may be referred to as an MPC controller. The MPC controller may be configured to determine electrical operational characteristics of the power converter 115 (e.g., characteristics for each phase of the converter), determine one or more control reference targets for the power converter 115 (e.g., a target per phase of the converter), and then generate control signaling, based on an MPC algorithm using the electrical operational characteristics and the control reference target. The control signaling may be applied to actuate the power switching elements of the power converter 115 to perform voltage conversion and active damping to mitigate resonance in filter circuit(s) 120 of the power converter 115.

The MPC controller (or MPC controllers) may implement an MPC algorithm for each phase of the power converter 115 to generate the control signaling. As used herein, MPC can refer to a control algorithm that relies on or is aware of a system dynamic (e.g., implements or uses a dynamic model representing the converter under control) and predicts, through computation based on electrical characteristics of the converter and the dynamic model, input commands or reference values to control the system's behavior. Accordingly, MPC, as used herein, may refer to a model predictive control algorithm in a stricter use of the term (such as described in further detail below) as well as other dynamic prediction algorithms (e.g., a linear-quadratic regulator (LQR) control algorithm).

In one example, to implement the MPC algorithm for a particular phase, the MPC controller may, in each control period, solve a cost function using the electrical characteristics and the control reference target for that phase. By solving the cost function, the MPC controller can predict future steps of control signaling to actuate the power switching elements to control power on that phase of an AC voltage section of the power converter to trend towards the control reference target. The MPC controller may then generate the control signaling for that particular phase based on a first step of the future steps of control signals. Accordingly, in contrast to a PI control algorithm, the MPC algorithm derives an optimal duty cycle by processing a state variable and tracking error in a linear way with specific coefficients. Because no integration procedure is needed in MPC, the dynamic performance of MPC may be improved relative to a PI technique with less overshoot and higher tracking speed. Additionally, because MPC has higher control bandwidth, the MPC controller can provide an active damping term to mitigate (reduce or eliminate) LC or LCL resonance that may otherwise be present in a filter circuit in the AC section of the power converter 115.

Figure 7:
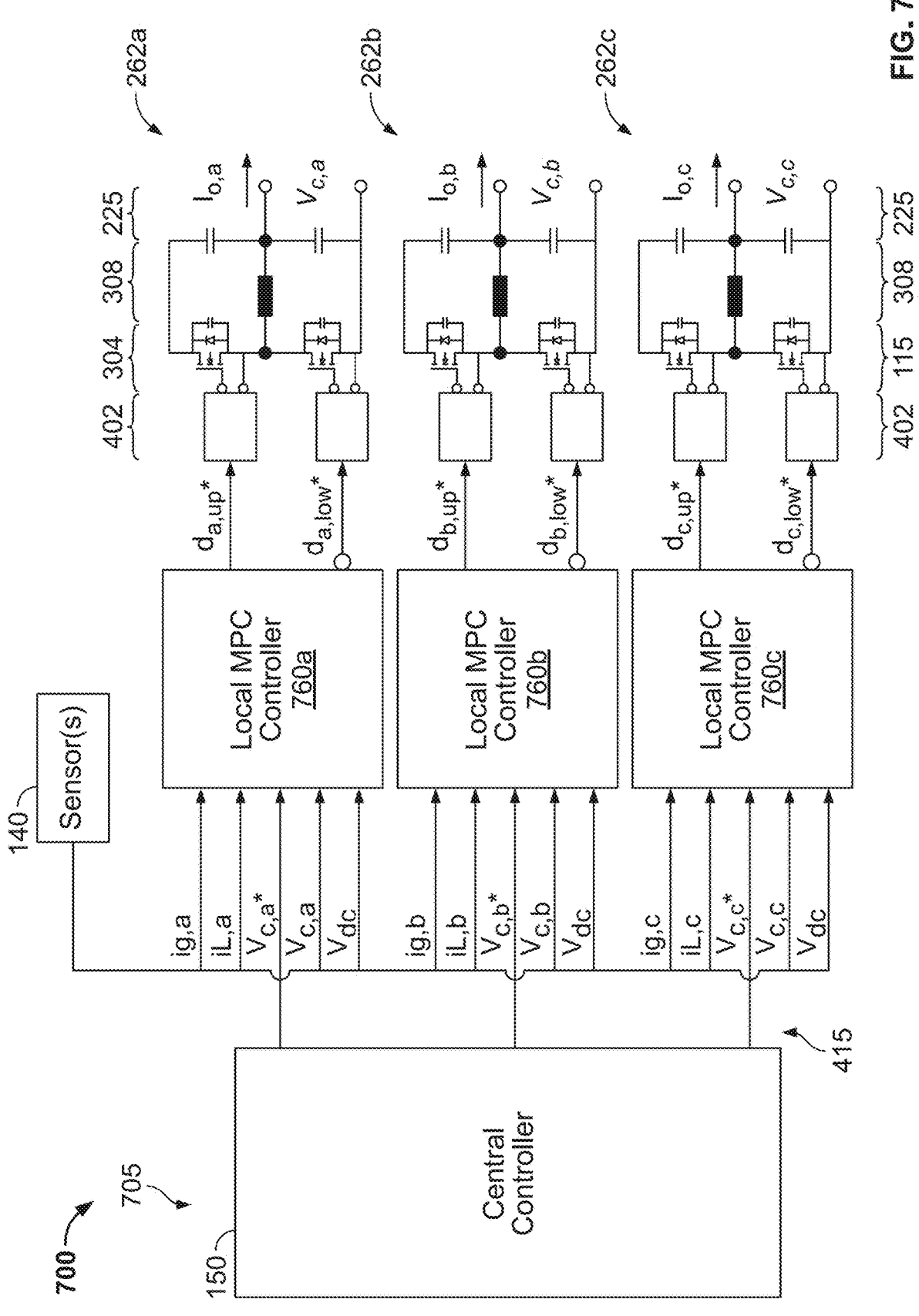
FIG. 7 illustrates an MPC-based converter system according to some embodiments.

FIG. 7 illustrates a power converter system 700 including MPC control. The converter system 700 is an example of the system 100 and the system 400, described above, in which the local controllers 160 are implemented as MPC controllers. In particular, in FIG. 7, these local controllers are identified as local MPC controllers 760a-c. Accordingly, the discussion above with respect to the system 400 of FIG. 4 applies also to the system 700 of FIG. 7, and like numbers are used for like components.

As is shown in FIG. 7, the converter system 700 includes a control system 705, which is a particular example of the control system 105 referenced above (e.g., with respect to FIGS. 1 and 4). The control system 705 includes the central controller 150 and the local controllers 760a-c. Although illustrated separately, the gate drivers 402 may also be considered part of the local controllers 760a-c. The converter system 700 is a three-phase converter that is configured to serve as an AC/DC rectifier and/or a DC/AC inverter.

The central controller 150 generates three-phases of control references (three-phase capacitor voltages references $v_{c,abc}{}^{*}$) in the stationary abc, based on electrical characteristics of the converters 304 from the local controllers 760a-c, for example, in a similar manner as described above with respect to FIGS. 4 and 6. The local MPC controllers 760a-c also regulate switch side inductor currents $i_{L,abc}$ by adjusting the weighting factor between $i_{L,abc}$ and $v_{c,abc}$.

Each local MPC controller 760 implements MPC-based control per phase in the stationary abc frame. In this example, MPC-based control includes application of a dynamic model of a corresponding converter circuit under control (e.g., the converter block 262a-c of a particular phase associated with each MPC controller 760a-c). More particularly, MPC-based control includes solving an optimization function defined based on the dynamic model to identify an (optimal) control input (or inputs). The dynamic model may include measured or estimated values for the dynamic system, as well as target or reference commands. In some examples, MPC-based control includes solving, for each control period, the optimization function over a finite time-horizon to identify control inputs for each step in the time-horizon to achieve the desired output. Then, the control input for the first step is applied, while the other control inputs are discarded. In the next control period, the process repeats to identify the next control input. In some examples, another MPC control algorithm is implemented.

Using a local MPC controller 760 to implement MPC-based control per phase in the stationary abc frame include, for example: (1) a state space matrix of LC per phase is simpler than the rotational dq (or dq0) system to implement an offline piecewise affine optimization code in a less costly controller hardware (e.g., a less costly DSP controller); (2) the time-varying angular speed term, ω, otherwise used in computations can be omitted in the explicit MPC state space matrix for the offline optimization calculation; and (3) per phase MPC for LC is more flexible for a modular design perspective to extend the paralleled phase number and other topologies, e.g., DC/DC, single-phase DC/AC converters.

For the MPC implementation, in every control period, the local MPC controllers 760a-c may receive electrical characteristics from the sensors 140 (e.g., a switch side inductor current ($i_{L,abc}$), a capacitor voltage ($v_{c,abc}$), and a AC interface current ($i_{o,abc}$)), and the control reference target 415 (here, a capacitor voltage reference, $v^*_{c,abc}$) from the central controller 150. As previously noted, each of the electrical characteristics from the sensors 140 may be directed sensed (e.g., by a current or voltage sensor), or one or more of the electrical characteristics may be inferred from another sensed electrical characteristic (see, e.g., state estimation discussion below).

In some examples, the local MPC controllers 760a-c each include an offline-generated piecewise affine search tree that they employ to derive a duty cycle (e.g., an optimal duty cycle) for the explicit MPC control. To this end, state equations of a switch side LC filter (e.g., the LC filters 308) can be expressed as $$i_L(k+1) = i_L(k) - \frac{T_s}{L_{fs}} v_c(k) + \frac{v_{dc} T_s}{L_{fs}} d(k)$$

$$v_c(k+1) = \frac{T_s}{C_f} i_L(k) + v_c(k) - \frac{T_s}{C_f} i_o(k).$$

For the flexibility of implementing the explicit MPC and the convenience of experimentally adjusting the DC bus voltage during test, the last term, $U_{dc}d(k)$, can be replaced by the phase leg output voltage, $u_x(k)$. The state-space model can be expressed in standard matrix format of $$X_{k+1} = AX_k + Bv_k + Ee_k$$

where the variables and matrices represent $$A = \begin{bmatrix} 1 & -\frac{T_s}{L_{fs}} \\ \frac{T_s}{C_f} & 1 \end{bmatrix}, B = \begin{bmatrix} \frac{T_s}{L_{fs}} \\ 0 \end{bmatrix}, E = \begin{bmatrix} 0 \\ -\frac{T_s}{C_f} \end{bmatrix},$$

$$X_k = \begin{bmatrix} i_L(k) \\ v_c(k) \end{bmatrix}, v_k = [v_{dc}d(k)], e_k = [i_o(k)].$$

In the MPC formulation, the inductor current/capacitor voltage references can be defined as $\bar{X}$ and the tracking errors between the measurement and the references are expressed as $\tilde{X}$ which are composed of $$\bar{X}_k = \begin{bmatrix} i_{Lr}(k) \\ v_{cr}(k) \end{bmatrix}, \tilde{X}_k = \begin{bmatrix} i_{Lr}(k) - i_L(k) \\ v_{cr}(k) - v_c(k) \end{bmatrix}.$$

Thus, the cost function includes two terms $$\min \sum_{k=0}^{N_c} \tilde{X}_k^T Q \tilde{X}_k + \sum_{k=0}^{N_p-1} \triangle v_k^T R \triangle v_k.$$

For the penalties of the cost function, Q and R represent the weighting factor matrices that are implemented on the state values and input values, respectively. Specifically, Q is a 2×2 matrix, [$Q_{11}$, 0; 0, $Q_{22}$], which is applied for the tracking errors between the state variables and the references. Because a goal of the local MPC controllers 760a-c is to track the output capacitor voltage references, in some examples, the corresponding weighting factor, $Q_{22}$, is configured to be larger (e.g., 1000 times larger) than the switch side inductor current term, $Q_{11}$. R is a 1×1 matrix, [$R_{11}$] which is applied for stabilizing the variation between the adjacent input variables. $R_{11}$ is set to be smaller (e.g., 100 times smaller) than $Q_{22}$. In other examples, other weighting factors may be used.

The constraints of the MPC controller can be expressed as $$\tilde{X}_{k+1} = A\tilde{X}_k + Bv_k + Ee_k \in \mathcal{X}, \triangle v_k = v_k - v_{k-1} \in \mathcal{U},$$

$$\begin{bmatrix} -I_{L,max} \\ 0 \end{bmatrix} \leq X_k \leq \begin{bmatrix} I_{L,max} \\ v_{dc} \end{bmatrix}, [0] \leq u_k \leq [U_{dc}], [-I_{o,max}] \leq e_k \leq [I_{o,max}].$$

Figure 8:
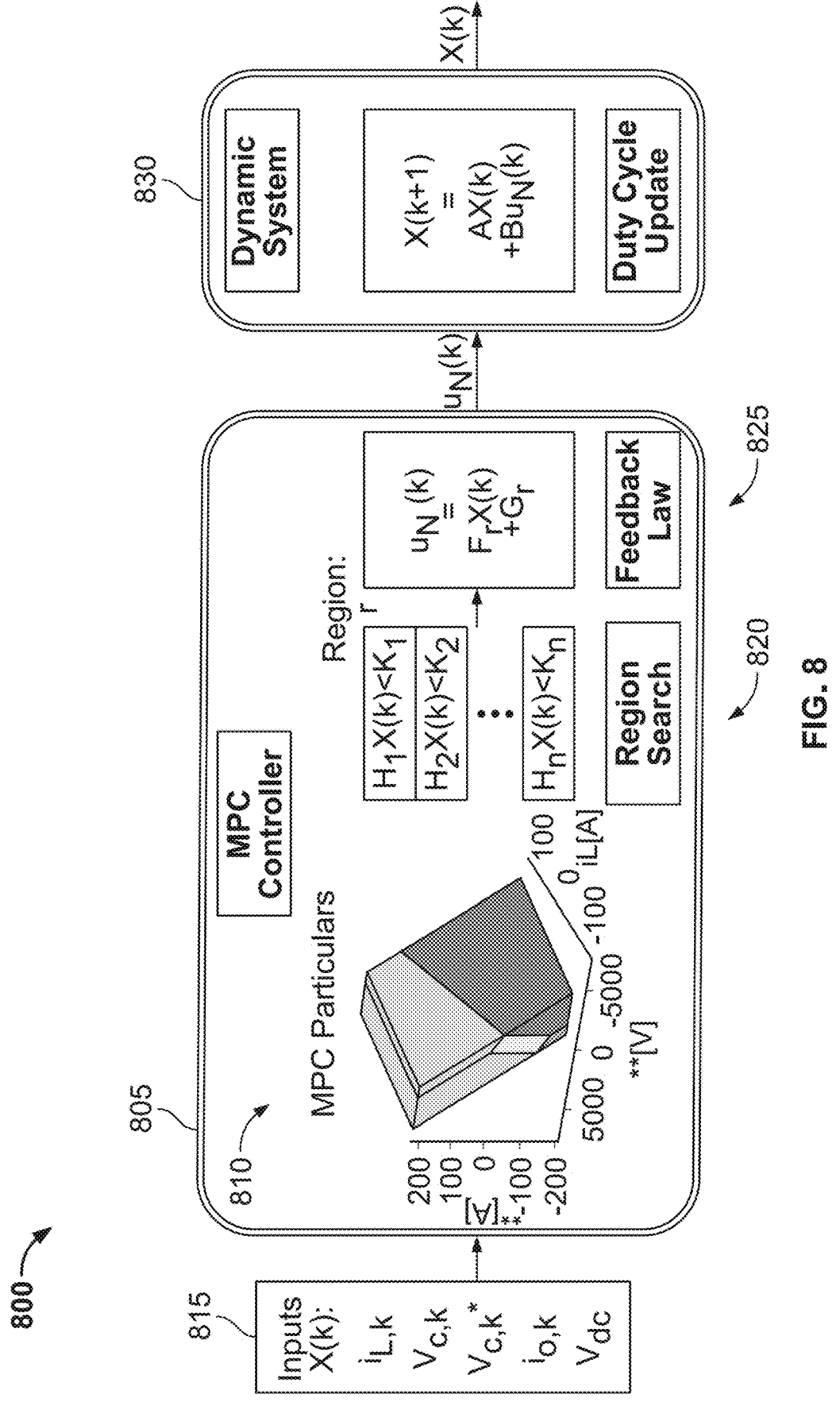
FIG. 8 illustrates a model predictive control (MPC) control system according to some embodiments.

FIG. 8 illustrates an example implementation of an MPC control system 800 that may be executed by each of the local MPC controllers 760a-c. In this example, the MPC algorithms are implemented in an explicit way. The MPC control algorithm executed by the local MPC controllers 760a-c is represented by the MPC control block 805. Specifically, a piecewise affine (PWA) feedback law is generated offline based on the pre-selected state space modeling and constraints. Then, the corresponding MPC partitions 810 are stored on a memory of each local MPC controller 760a-c to be available for online searching. In each controlling time period, the MPC control block 805 searches the n regions of the PWA MPC partitions 810 (in block 820) to identify an active region, r, based on the inputs 815 received by the MPC control block 805. For example, the MPC control block 805 may employ a binary search tree to search and quickly find the active region r from the n regions. Further, each of the n regions is associated with a respective pair of identification matrices H and K. Accordingly, the applicable active region r is identified based on the matrices $H_r$ and $K_r$. Then, for the active region r, the corresponding feedback law (control) matrices, $F_r$ and $G_r$ are applied (block 825) to calculate the input matrix that includes optimal input values over the prediction horizon (or time window). The first value of the input matrix is then output and applied to the dynamic system for MPC control, while the other input values of the input matrix are discarded.

Accordingly, the (offline-generated) MPC partition 810 represents the n regions of the PWA feedback law for the MPC control block 805 to search. During operation of the MPC control block 805 (online), the identification matrices $H_r$ and $K_r$ will lead to an active region of the MPC partition 810, and the corresponding control matrices $F_r$ and $G_r$ will help calculate the optimal input value ($u_N(k)$) for the PWM modulation based on the updated state values of switch side inductor current/output capacitor voltage. Here, uN(k)= ($v_{dc}^*d(k)$), where vdc is the DC bus voltage across DC terminals 220 (see, e.g., FIG. 3A), and d(k) is the duty cycle for the PWM control signal. The control matrices $F_r$ and $G_r$ are derived based on the above-described cost function and constraints.

In each control period, the MPC control block 805 takes the inputs 815 (e.g., $i_L(k)$, v(k), $i_g(k)$, and the reference of $v_{c,ref}(k)$, where k indicates the phase a, b, or c) to find the active region r with the corresponding identification matrices $H_r$ and $K_r$. Then, the duty cycle d(k) is derived with the specific control matrices of $F_{s,c}$ and $G_{s,c}$ for the PWM modulation and output by the control block 805 (e.g., as part of uN(k)). The output duty cycle (d(k)) may be a value between 0 to 1. The output duty cycle is provided to the dynamic system 830, which represents the converter block 262 (e.g., the gate driver(s) associated with the local MPC controller 760a-c implementing the MPC control block 805 may receive the output duty cycle).

In some examples, the control system 105 includes N MPC controllers (e.g., N local controllers 160, where N≥1), one for each phase of the power converter 115. In some embodiments, each of the MPC controllers receives, from a central controller (e.g., central controller 150), a control reference target for the phase associated with the MPC controller. In other (non-cascaded control system) embodiments, the MPC controllers each determine a respective control reference target locally. For example, the MPC controllers may execute a separate MPC algorithm to derive the control reference targets, or may include a non-MPC algorithm (e.g., a PI control algorithm, a PID control algorithm, or the like) that is executed to derive the control reference targets.

In some embodiments, a state estimator is associated with each of the N MPC controllers to provide an estimation of one or more electrical characteristics for the phase associated with the MPC controller based on samplings of other electrical characteristics for the phase. For example, the state estimator may implement a Luenberger observer technique that estimates the switch side inductor current for a phase (also referred to herein as inductor current $i_{L,abc}$) based on the capacitor voltage ($v_{c,abc}$) and grid side inductor current ($i_{g,abc}$) for the phase. Use of a state estimator can reduce the number of sensors used in the system to provide the MPC controllers with the electrical characteristics, thereby reducing costs and/or size of the motor circuitry.

In some embodiments, MPC for active damping to mitigate resonance may be included in a power converter that includes one or both of a cascaded control system and harmonic injection, as described above.

V. State Estimator

As noted herein, in some examples, the control system 105 or a controller 150, 160, 760, or 805 uses or implements a state estimator to determine one or more electrical characteristics of a corresponding converter under control. Use of a state estimator can reduce sensor count of the system, which can reduce sensor cost, reduce volume for the converter (improving power density), and/or improve control performance through an anti-noise capability (i.e., reduction in noise) compared to sensing certain electrical characteristics.

Figure 9:
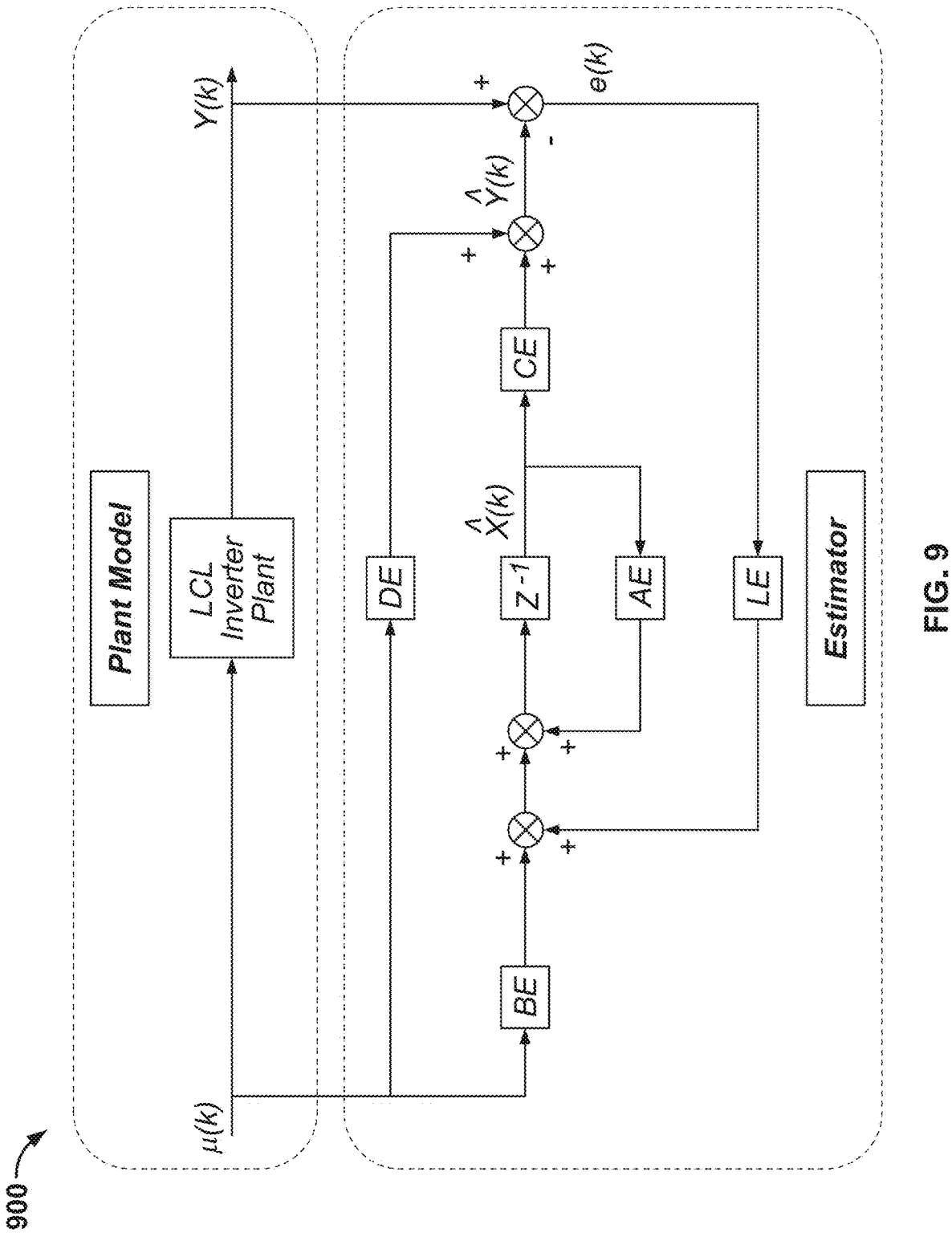
FIG. 9 illustrates a state estimator according to some embodiments.
Figure 12:
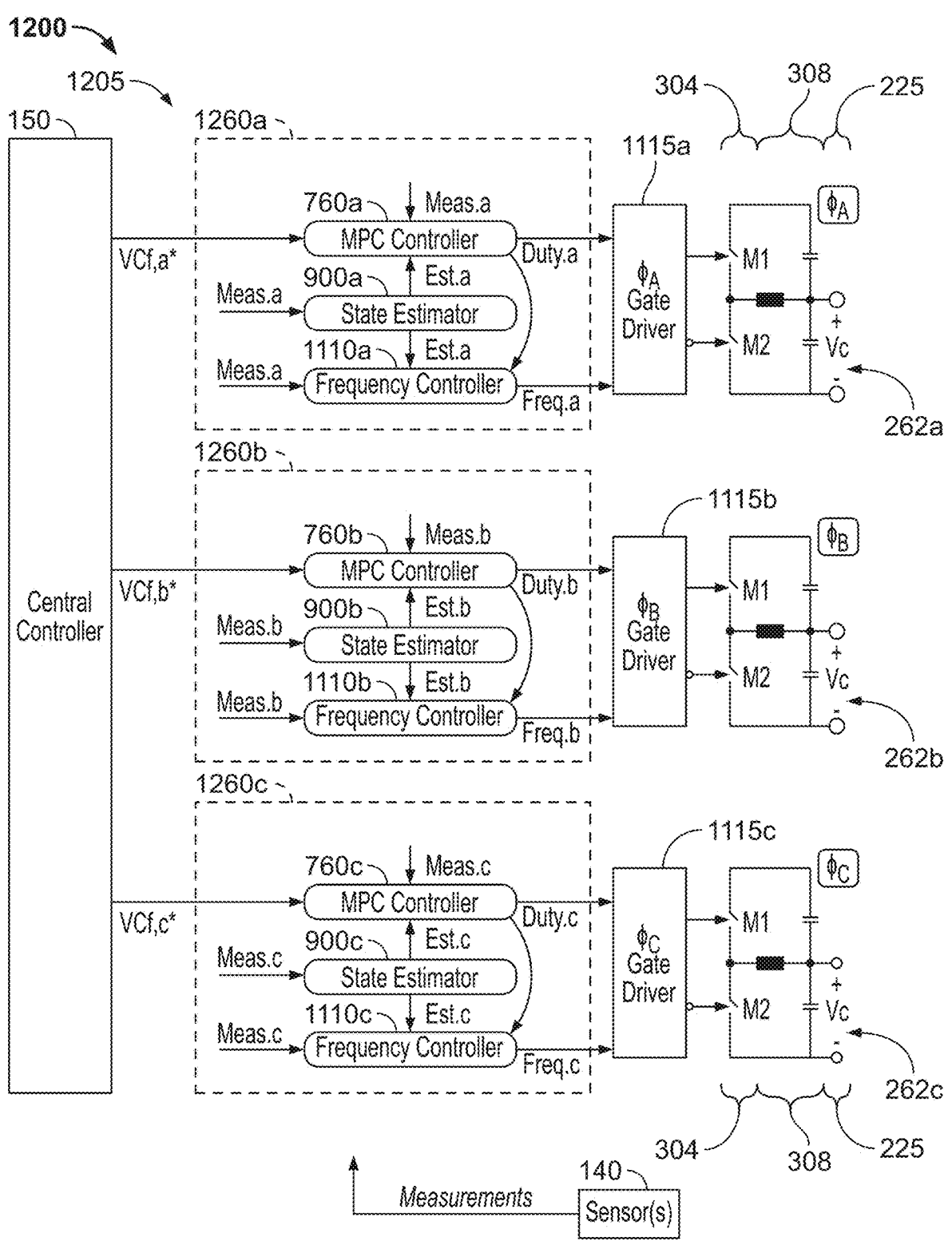
FIG. 12 illustrates a power converter system including model predictive control (MPC) with variable frequency critical soft switching (VFCSS) according to some embodiments.

For example, with reference the various power converters systems described herein (e.g., converter systems 100, 200, 300, 700), one of the three variables, switch side inductor current ($i_{Lfs}$), filter capacitor voltage ($v_{cf}$), and grid side inductor current ($i_{Lfg}$), can be estimated by the other two variables. With reference back to FIG. 3A, the grid filter inductor may represent a discrete inductor or inherent inductance on the AC interface terminals 225 joining the filter node 260 with the AC grid 302 and/or motor 303, as the case may be. Accordingly, the grid filter inductor current ($i_{Lfg}$) may also represent the interface current, $i_o$, and is used interchangeably with reference to the state estimator 900. FIG. 9 illustrates a state estimator 900 for use, for example, with a cascaded model predictive control of an LCL filter system, such as the converter 700 of FIG. 7. However, the state estimator 900 is also applicable to the other converters using similar principles. The state estimator 900 may be implemented by one of the controllers (e.g., controller 150, 160, 760, 805), e.g., as a hardware or executable software block of the controller. For example, with reference to FIG. 7, the state estimator 900 may be incorporated into each of the local MPC controllers 760. Additionally, an example of the state estimator 900 included within local MPC controllers is shown in FIG. 12.

Specifically, the state estimator 900 may implement a Luenberger observer that is designed to estimate the switch side inductor current, $\hat{i}_{Lfs}$, capacitor voltage, $\hat{v}_{cf}$, and grid side inductor current, $\hat{i}_{Lfg}$, with the samplings of capacitor voltage, $v_{cf}$, and grid side inductor current, $i_{Lfg}$. In other examples, however, the state estimator 900 may estimate the variables based on samplings of any two of the three variables. In still further examples, the state estimator 900 may estimate the variables based on samples of any one of the three variables, which may allow reduction of one further sensor, but may reduce the accuracy of the estimation. The samplings may be measurements (e.g., of current and voltage) provided to the state estimator 900 by the sensors 140.

The state-space equations for the discrete-time state estimator can be expressed in standard matrix format of $$\hat{X}_{k+1} = A_E \hat{X}_k + B_E u_k + L_E(Y_k - \hat{Y}_k)$$

$$\hat{Y}_{k+1} = C_E \hat{X}_k + D_E u_k$$

where the variables and matrices for Luenberger observer represent $$A_E = \begin{bmatrix} 0 & -\dfrac{1}{L_{fs}} & 0 \\ \dfrac{1}{C_f} & 0 & -\dfrac{1}{C_f} \\ 0 & 0 & 0 \end{bmatrix}, B_E = \begin{bmatrix} \dfrac{1}{L_{fs}} \\ 0 \\ 0 \end{bmatrix}, C_E = \begin{bmatrix} 0 & 1 & 0 \\ 0 & 0 & 1 \end{bmatrix}, D_E = \begin{bmatrix} 0 \\ 0 \end{bmatrix},$$

$$\hat{X}_k = \begin{bmatrix} \hat{i}_{Lfs}(k) \\ \hat{v}_{Cf}(k) \\ \hat{i}_{Lfg}(k) \end{bmatrix}, \hat{Y}_k = \begin{bmatrix} \hat{v}_{Cf}(k) \\ \hat{i}_{Lfg}(k) \end{bmatrix}.$$

$L_E$ is a 3×2 observer gain matrix that can be tuned to achieve minimal estimation errors. The diagram of the state estimator is shown in FIG. 9. The state observer minimizes the estimation error, e(k), with a dynamic equation of $$e_{k+1} = (A_E - L_E C_E)e_k.$$

The estimation gain can be derived by $$L_E^T = RM^{-1}$$

where R is composed of tuning factors and M is determined by solving the Sylvester equation $$A_E^T M - M\Lambda = C_E^T R$$

in which $\Lambda$ is a matrix with the desired eigenvalues.

In this particular example, the system incorporating the state estimator 900 may have no current sensor for directly sensing switch side inductor current and may, instead, rely on the estimation of this current value (e.g., based on sensed voltage of the lower capacitor and/or sensed current of a grid-side inductor). This approach may be beneficial because directly sensing the switch side inductor current with a current sensor can be challenging, for example, due to noise from the proximity of the sensor to the power switching devices of the converter.

In some examples, instead of or in addition to performing state estimation based on a Luenberger observer, as described above, other estimation techniques may be used, such as, but not limited to, an optimization-based estimator, a sliding mode estimator, and a disturbance estimator.

In some embodiments, a state estimator as described may be included in a power converter that includes one or more of a cascaded control system, harmonic injection, or MPC-based control, as described above.

VI. Variable Frequency Critical Soft Switching

In some examples, one or more of the controllers provided herein (e.g., controllers 150, 160, 760) drive their corresponding power converter blocks 262 (e.g., forming the converter 115, 200, 300, or 304) using a variable frequency critical soft switching (VFCSS) scheme. The VFCSS scheme can provide improved efficiency and reduced filter volume (i.e., improved power density) for the power converter. Soft switching allows for the substitution of turn-on switching losses for turn-off switching losses, which is beneficial at least because turn-on losses for at least some FETs (e.g., SiC FETs) are typically much greater than turn-off losses. This VFCSS technique makes possible an increase in switching frequency (e.g., by a factor of 5) and a reduction in inductance (e.g., by a factor of 20) while reducing the FET switching losses, which results in improved power density and efficiency.

Figure 10:
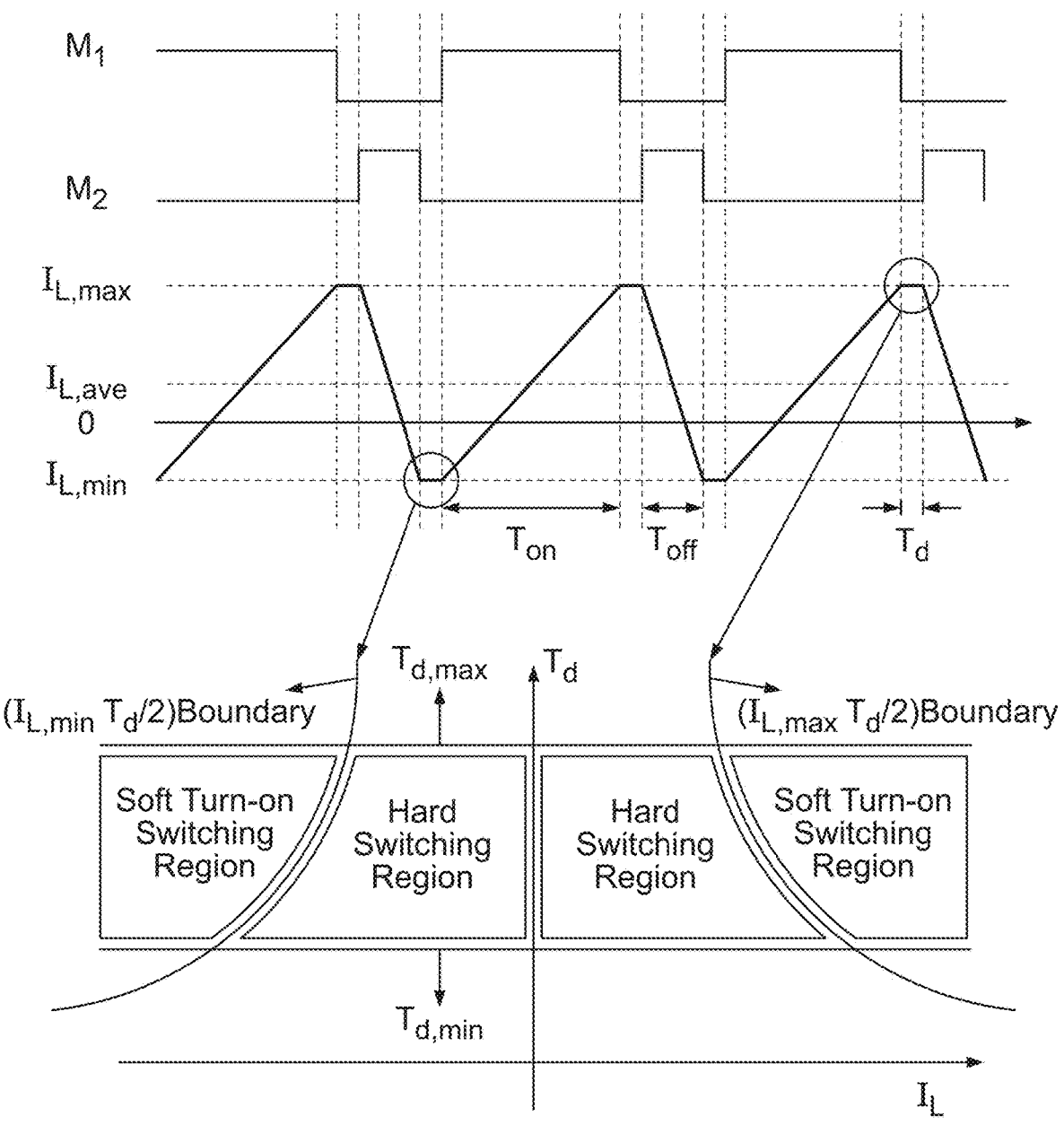
FIG. 10 illustrates a timing diagram and boundary conditions for soft switching according to some embodiments.

VFCSS is implemented by varying the switching frequency to achieve a desired inductor ripple current in the LC filter (e.g., in the switch-side inductor 250 of the LC filter 245 and LC filter 308 in FIGS. 2 and 3) to provide a soft switching transition. The desired inductor ripple current may be derived such that the valley point of the inductor current reaches a predetermined value of inductor threshold current $I_{L,thr}$. For a converter, such as the converter 200 of FIG. 2 or 304 of FIG. 3A, $I_{L,thr}$ is set in accordance with the boundary conditions of dead time and peak/valley inductor current for inductor 250, which can be derived from the output capacitance of the corresponding switching elements 235, 240. FIG. 10 shows the boundary relationships of the dead time $(T_d)$ and peak and valley inductor current $I_{L,max}$ and $I_{L,min}$, respectively. Inductor current and dead time values that result in soft switching are identified as soft turn-on switching areas or regions, and inductor current and dead time values that do not result in soft switching are identified as hard switching areas or regions. The soft switching regions represent the areas of operation where there is sufficient time and current for discharging the output capacitance of the power switching element (M1 or M2) before it is turned on. Analytically, these boundaries are expressed as $$(1/2)I_{L,max}T_d \le Q_{min} \le 0, (1/2)I_{L,min}T_d \ge Q_{max} \ge 0,$$

where $Q_{min}$ and $Q_{max}$ are the minimum discharge thresholds of the switch output capacitance for the soft switching.

For high positive values of DC inductor current, a large current ripple (e.g., more than 200%, or a value within a range of 200%-300%, of the current through the inductor) is used or required to maintain a valley inductor current point that is lower than the threshold current level $-I_{L,thr}$. The negative inductor current will discharge the upper switch output capacitance in the turn-off transient period of the lower switch. Similarly, for high negative values of DC inductor current, a large current ripple is also used or required to ensure the peak inductor current point is greater than the threshold current $I_{L,thr}$. Zero voltage switching (ZVS) of the lower switch will be achieved if the lower switch output capacitance is fully discharged by the positive inductor current during the turn-off transient of the upper switch. Generally, to achieve full soft switching over an entire cycle (e.g., an entire grid cycle), the current ripple should be sufficiently large to guarantee bidirectional inductor current paths or the dead time should be expanded. As unnecessarily large dead times can result in distortion, VFCSS adjusts the switching frequency to maintain critical soft switching over the full cycle. The VFCSS scheme is implemented to maintain a positive threshold current during the negative portion of the cycle and a negative threshold current during the positive portion of the cycle. The switching frequency to achieve this for an arbitrary threshold value can be calculated with the following equation:

$$f_{sw} = \frac{(1-d)dv_{DC}}{2(|I_L| + I_{L,thr})L_{SW}}$$

where $I_{L,thr}$ is the boundary threshold current for soft switching, which can be derived from FIG. 10 with a given dead time $(T_d)$, $I_L$ is the switching side inductor current, and where d is the reference duty cycle (a value between 0 and 1).

Figure 11:
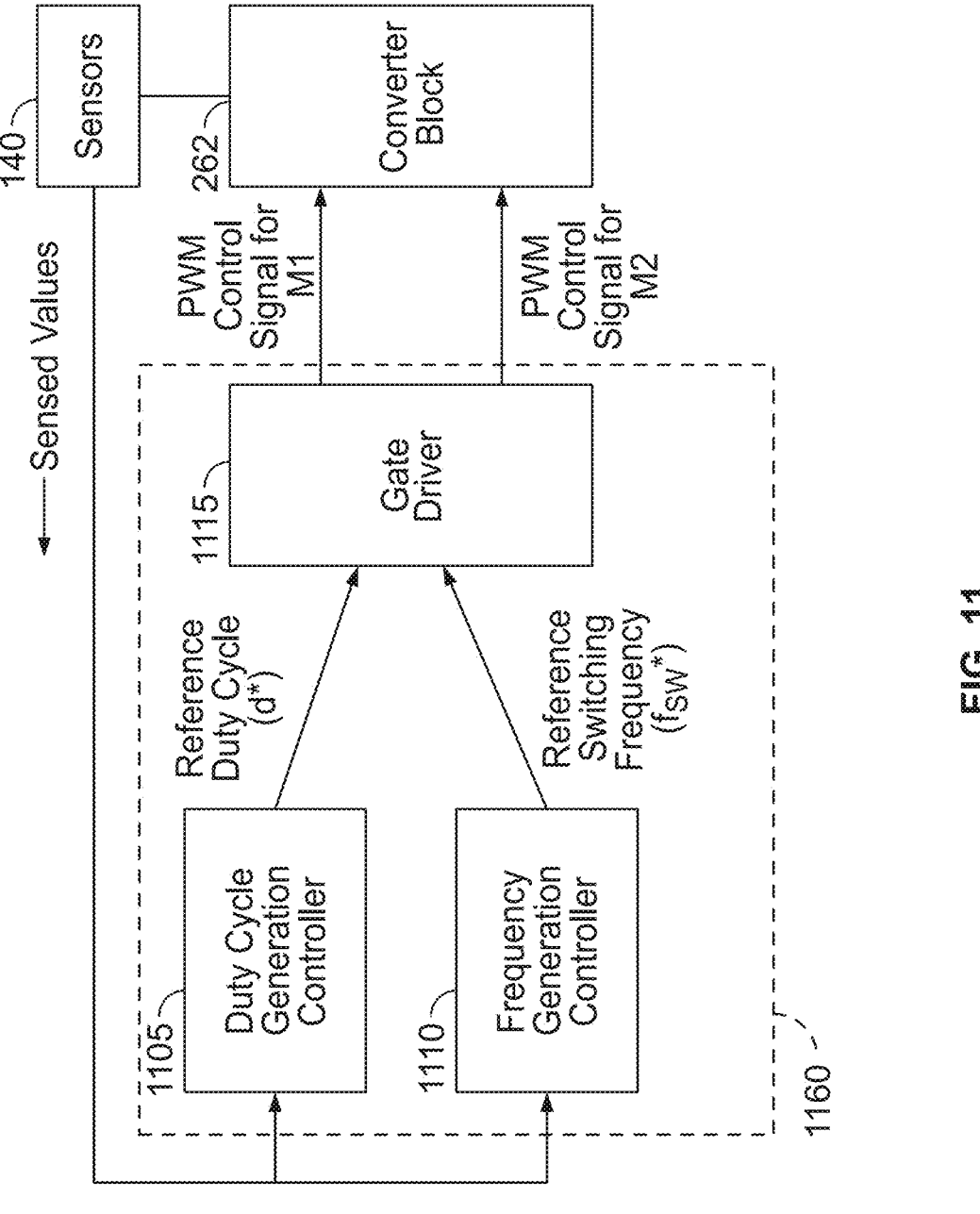
FIG. 11 illustrates a control system for variable frequency critical soft switching according to some embodiments.

FIG. 11 illustrates a control system 1100 for controlling a pair of switching elements of a power converter. In particular, the control system 1100 illustrates a controller 1160 implementing an example control scheme for VFCSS control of the converter block 262 (see FIG. 2). In some examples, the controller 1160 is a particular implementation of one or more of the controllers 150, 160, 750, 760. The controller 1160 includes a duty cycle generation controller 1105 and a frequency generation controller 1110, which may be regulators for generating, respectively, a reference duty cycle (d*) and a reference switching frequency (fsw*). The duty cycle generation controller 1105 may generate the reference duty cycle (d*) based on sensed (or estimated) characteristics of the power converter 210, such as currents and/or voltages provided by the sensors 140, the state estimator 900, or a combination thereof. For example, the duty cycle generation controller 1105 may implement a PID controller, an MPC controller (see, e.g., MPC control block 805), or another type of regulator. The frequency generation controller 1110 may generate the reference switching frequency (fsw*) based on sensed (or estimated) characteristics of the converter block 262 and the above noted equation for calculating Fsw*.

The gate driver 1115 receives the reference duty cycle (d*) and a reference switching frequency (fsw*) from the controllers 1105 and 1110, respectively. Based on these received reference values, the gate driver 1115 generates a first PWM control signal for the upper switch (M1) 235 and a second PWM control signal for the lower switch (M2) 240. For example, the gate driver 1115 generates the first PWM control signal having a frequency (fsw) equal to the reference switching frequency, and with a duty cycle ($d_1$) equal to the reference duty cycle (d*). Similarly, the gate driver 1115 generates the second PWM control signal having the frequency (fsw) equal to the reference switching frequency (fsw*), and with a duty cycle $d_2$ equal to $1-d_1-(T_d/\text{fsw})$, and where the ON edge of the second PWM control signal lags the OFF edge of the first PWM control signal by a time $T_d/2$, and the OFF edge of the second PWM control signal leads the ON edge of the PWM signal by a time $T_d/2$.

While FIG. 11 illustrates a VFCSS control for a single phase, FIG. 12 illustrates the VFCSS scheme implemented in a three-phase MPC-control-based power converter. More particularly, FIG. 12 illustrates a power converter system 1200 including MPC control with variable frequency critical soft switching (VFCSS). The converter system 1200 is another example of the power system 100, and is similar to the systems 400 and of the system 700 described above, except that the local controllers 160 are implemented as MPC-VFCSS controllers. In particular, in FIG. 12, these local controllers are identified as local MPC-VFCSS controllers 1260a-c. Accordingly, the discussion above with respect to the system 100 of FIG. 1, 400 of FIG. 4 and system 700 of FIG. 7 applies also to the system 1200 of FIG. 12, and like numbers are used for like components. Additionally, because the system 1200 is, in some respects, an extrapolation of the single phase VFCSS of FIG. 11 to a multiphase system, like numbers are used for like components, in some cases with the addition of a phase designation of "a," "b," or "c" (e.g., each of the three instances of the frequency controller 1110 from FIG. 11 is identified as the frequency controller 1110a, 1110b, or 1110c in FIG. 12).

As is shown in FIG. 12, the converter system 1200 includes a control system 1205, which is a particular example of the control system 105, and which is similar to the control system 705, referenced above (e.g., with respect to FIGS. 1, 4, and 7). The control system 1205 includes the central controller 150 and the local MPC-VFCSS controllers 1260a-c. Although illustrated separately, the gate drivers 1115a-c may also be considered part of the local MPC-VFCSS controllers 1260a-c. The converter system 1200 implements a three-phase converter that is configured to serve as an AC/DC rectifier and/or DC/AC inverter. Accordingly, the converter circuit (e.g., the power switching elements), which is identified as the converter 304, may include a respective converter block 262a-c for each phase a, b, c.

The central controller 150 generates three-phases of control references (three-phase capacitor voltages references $v_{c,abc}$*) in the stationary abc reference frame, based on electrical characteristics of the converters 304 from the local controllers MPC-VFCSS 1260a-c, for example, in a similar manner as described above with respect to FIGS. 4 and 6.

As shown in FIG. 12, the local MPC-VFCSS controllers 1260a-c each include a respective MPC controller 760a-c, a respective state estimator 900a-c, and a respective frequency controller 1110a-c. The MPC controllers 760a-c may function similar to the MPC controllers 760a-c of FIG. 7, providing a duty cycle reference $d_a$*, $d_b$*, or $d_c$* output for the phase a, b, or c corresponding to the particular MPC controller 760a-c. The state estimators 900a-c may function similar to the state estimator 900 of FIG. 9, providing estimated values for the phase a, b, or c corresponding to the particular state estimator 900a-c based on measurements provided by the sensors 140. The frequency controller 1110a-c may function similar to the frequency controller 1110 of FIG. 11, providing a reference frequency fsw* for the phase a, b, or c corresponding to the particular frequency controller 1110a-c. Further examples of the frequency controllers 1110a-c are described with respect to FIGS. 13-14 below. The gate drivers 1115a-c may function similar to the gate drive 1115 of FIG. 11, providing PWM control signals to the power switching elements of the converter 304 for the phase a, b, or c corresponding to the particular gate driver 1115a-c based on the received duty cycle references $d_{abc}$* and reference switching frequencies $f_{SW,abc}$*.

In some examples, the state estimators 900a-c are not provided in the system 1200 and, instead, each of the measured values used by the MPC controller 760a-c and the frequency controller 1100a-c are provided through direct sensing via sensors 140 (such as shown in FIG. 11 and FIG. 14). In some examples, in place of the MPC controllers 760a-c, another local controller 160a-c (e.g., a PI or PID controller) is provided for the local PWM regulation of each phase of the converter 304.

Figure 13:
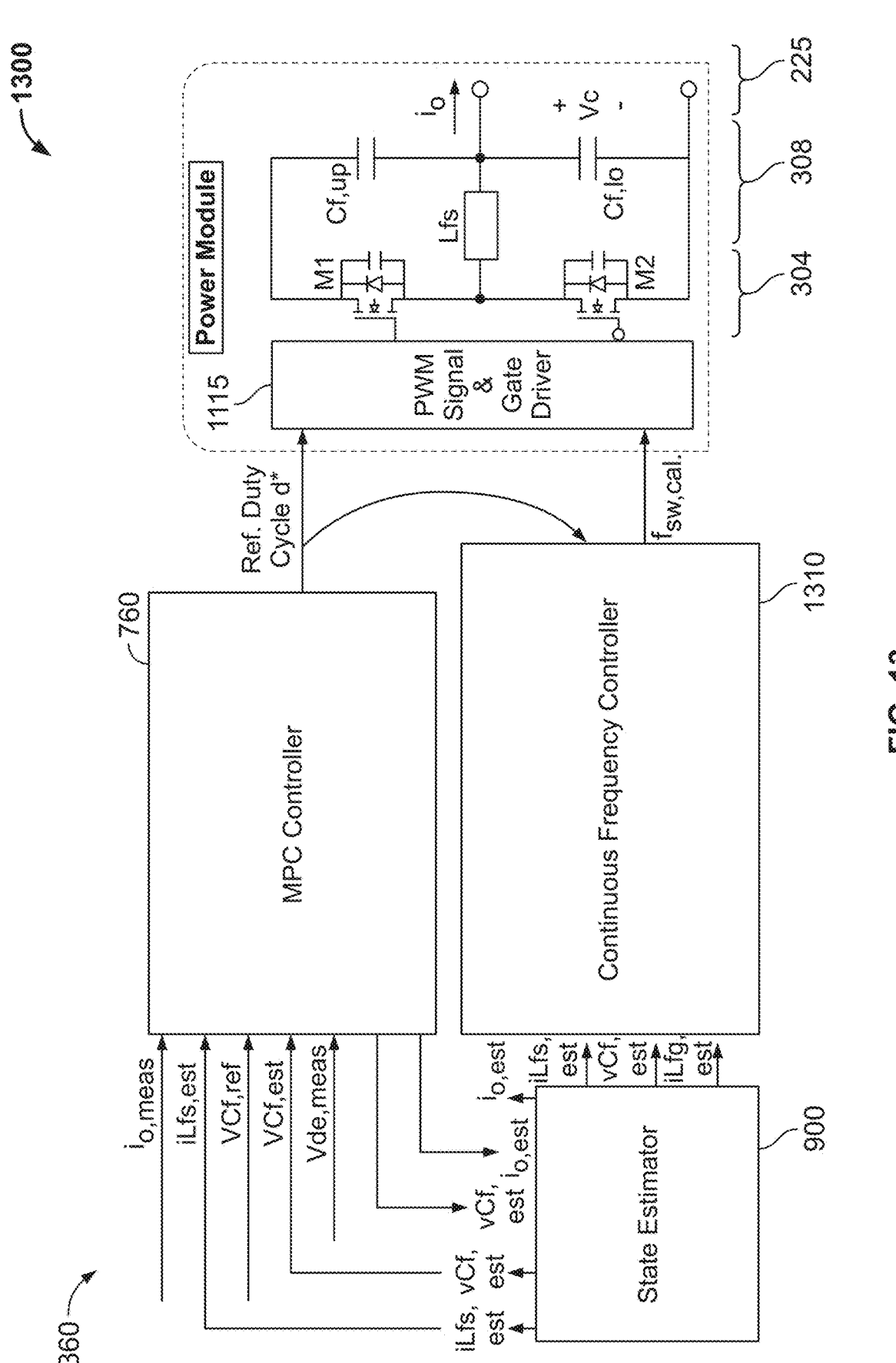
FIG. 13 illustrates a control system for local MPC-VFCSS control using variable-continuous-frequency critical-soft-switching (VCFCCS) according to some embodiments.

FIGS. 13 and 14 each illustrate an example of the local MPC-VFCSS controller 1260, each with a different control strategy for generating the reference switching frequency fsw*. More particularly, FIG. 13 illustrates a control system 1300 with a local MPC-VFCSS controller 1360 (an example of the local MPC-VFCSS controller 1260 of FIG. 12) implementing variable-continuous-frequency critical-soft-switching (VCF-CSS), while FIG. 14 illustrates a control system 1400 with a local MPC-VFCSS controller 1460 (another example of the local MPC-VFCSS controller 1260 of FIG. 12) implementing variable-discrete-frequency critical-soft-switching (VDF-CSS). Accordingly, the controller 1360 may be referred to as a local MPC-VCFCSS controller 1360, or a continuous frequency controller 1360 to simplify the discussion, and the controller 1460 may be referred to as a local MPC-VDFCSS controller 1460, or a discrete frequency controller 1460 to simplify the discussion.

The two controllers 1360 and 1460 are implemented to achieve critical soft switching operation for high efficiency with different types of frequency. The continuous frequency controller 1360 derives a continuous switching frequency based on the critical soft switching boundary conditions and then directly implements the frequency value to the PWM control signals (via gate driver 1115). The continuous frequency controller 1360 also receives an estimate of the switch side inductor current value ($i_{Lfs,est}$) from the state estimator 900 and, in some examples, of other electrical characteristics of the associated LC filter. On the other hand, the discrete frequency controller 1460 discretizes the calculated switching frequency with multiple times of the sampling frequency for PWM, and may not use the state estimator 900 to derive the switch side inductor current value.

FIG. 15 shows the switch side inductor current waveform 1500 for VCF-CSS and the switch side inductor current waveform 1505 VDF-CSS, respectively. The envelopes of VCF-CSS and VDF-CSS are smooth and discretized due to the varying types of switching frequency. Both techniques can achieve critical soft switching operation for an improvement of efficiency. Both the VCF-CSS and VDF-CSS techniques may be combined with MPC-based control to address the time-varying switching frequency, and the MPC-based control may improve the transient performance with less oscillation and spikes, even for the discretized frequency VDF-CSS technique. Accordingly, the corresponding di/dt stress on the power switching elements of the converters are low.

Turning to FIG. 13 more specifically, the continuous frequency controller 1360 may be designed to calculate the desired continuous switching frequency based on the peak/valley switch side inductor current and the critical soft switching boundary conditions. More particularly, the continuously varying switching frequency, $f_{SW,cal}$, is derived based on the threshold current $(I_t h)$ of critical soft switching boundary conditions. The switch side inductor current ripple, $\Delta i_{L_{fs}}$, can be calculated as $$\Delta i_{Lfs} = \frac{d(1-d)v_{dc}}{f_s L_{fs}}.$$

The critical soft switching boundary conditions require the peak/valley inductor current values to be higher than $I_{th}$ and lower than $-I_{th}$, respectively. Thus, the calculation of the continuously varying switching frequency, $f_{SW,cal}$, can be expressed as $$f_{SW,cal} = \frac{(1-d)dv_{dc}}{2(i_{Lfs,ave} + I_{th})L_{fs}}, \; i_{Lfs,ave} \geq 0$$

$$f_{SW,cal} = \frac{(1-d)dv_{dc}}{2(I_{th} - i_{Lfs,ave})L_{fs}}, \; i_{Lfs,ave} \leq 0$$

where $i_{Lfs,ave}$ is the average value of switch side inductor current without considering the high current ripple for critical soft switching calculation. The $i_{Lfs,ave}$ has also been plotted as the sine waveform line of waveforms 1500 in FIG. 15.

As is shown in FIG. 13, a continuous frequency control block 1310 (an example of the frequency controllers 1110a-c of FIG. 12) receives the estimated values of $i_{Lfs,est}$, $v_{cf,est}$ and $i_{o,est}$ from the state estimator 900 and reference duty cycle value (d*) from the MPC controller 760. Based on these received values, the continuous frequency control block 1310 calculates the reference switching frequency, $f_{SW,cal}$. The frequency controller 1310 outputs the reference switching frequency, $f_{SW,cal}$ to the gate driver 1115.

The state estimator 900 can provide a more accurate switch side inductor current value for the reference switching frequency calculation compared with direct sampling of the current (e.g., via the sensors 140) For example, with direct sampling via the sensors 140, the varying switching frequency can result in a deviation of sampling from the true averaged inductor current value, especially when the current ripple is large for critical soft switching. However, this deviation error can be mitigated as a result of the calculations that are performed by the state estimator 900.

Turning now to FIG. 14, the discrete frequency controller 1460 includes similar components to the continuous frequency controller 1360 (which are like numbered), except for the inclusion of a discrete frequency control block 1410 in place of the continuous frequency control block 1310 and the state estimator 900. Like the continuous frequency control block 1310, the discrete frequency control block 1410 is another example of the frequency controllers 1110a-c of FIG. 12. Instead of the state estimator 900, the discrete frequency controller 1460 (including the MPC controller 760 and discrete frequency control block 1410) receive measurements from the sensors 140 for the relevant currents and voltages.

In the discrete frequency controller 1460, the continuously varying switching frequency in the previously described equations is further discretized into pre-defined frequency bandwidth sections, which is designed as an integral multiple of the fundamental sampling frequency, $f_{SW,base}$. Thus, the discretized varying switching frequency for PWM signals can be n times of $f_{SW,base}$($n \in \mathbb{Z}$ ). To ensure the soft switching operation, the multiple value of n may be rounded down during the discretization by choosing a relatively lower switching frequency section.

A relationship of PWM switching carrier signals and sampling signals (for the sensors 140) are shown in plot 1600 of FIG. 16. In plot 1600, a varying switching frequency from $4f_{SW,base}$ to $2f_{SW,base}$ then to $f_{SW,base}$ is illustrated. The process of frequency discretization can be expressed as $$f_{SW,discrete} = nf_{s,base} = \text{floor}\left(\frac{f_{SW,cal}}{f_{SW,base}}\right)f_{SW,base}.$$

The discretized frequency may be ringing back and forth by the oscillation of sampling noise during frequency changing transients. A hysteresis loop is configured after the frequency discretization process to eliminate the frequency oscillation. Then, the reference discretized frequency $(f_{SW,discrete})$ is output to the gate driver 1115 to control the frequency of the PWM control signals to the converter 304.

Compared with the VCF-CSS, the VDF-CSS discretizes the switching frequency to be multiple times of the fundamental sampling frequency. Thus, the switch side inductor current can be sampled at the average points of the current ripple, without deviation from the accurate values as is shown in FIG. 16. Thus, even without the state estimator for the estimation of $i_{Lfs}$, the inductor current sampling can be accurate for the critical soft switching calculation at high current ripple.

FIGS. 17A and 17B include plots 1700 and 1705, respectively, which illustrate example experimental results for one example of a power converter system 1200, such as described herein, that incorporates: a three-phase converter with SiC FETs (see, e.g., FIG. 3A), third harmonic injection (see, e.g., FIG. 4), a cascaded control system (see, e.g., FIGS. 4, 6, and 7), MPC-based local controllers within the cascaded control system (see, e.g., FIG. 7), and variable frequency soft switching (see, e.g., FIGS. 11-14). In other examples power converters provided, one or more of these features is not included (e.g., instead of third harmonic injection, Vdc/2 is provided of the zero-sequence voltage control reference; or, instead of local MPC-based control, another local regulator is included).

In FIG. 17A, plot 1700 illustrates rate power (W) versus switching frequency (Hz) of the power converter system 1200 as well as several other examples systems. In FIG. 17B, plot 1705 illustrates power density (kW/L) versus efficiency (%). As illustrated, relative to other systems, the power converter system 1200 may obtain high switching frequencies and a balance of both high power density and high efficiency.

In some embodiments, a VFCSS as described may be included in a power converter that includes one or more of a cascaded control system, harmonic injection, MPC-based control, or a state estimator, as described herein.

VII. Modular Power Converter

This Section describes systems and methods related to modular power converters constructed from one or more modular power converter units, also referred to as autoconverter modules or power converter modules. Such autoconverter modules (ACMs) may be easily connected together for different applications and remain highly efficient power converters across the different applications. As described further below, in some examples, each modular power converter may provide a single phase of a multi-phase power output (e.g., in a DC/AC inverter application), or may receive a single phase of a multi-phase power input (e.g., in an AC/DC rectifier application). In some examples, multiple modular power converters are coupled together in parallel for each phase of a multiphase modular power converter. Any of the previously described power converters herein may be implemented as a modular power converter based on the principles described in this section. That is, in some examples, one or more of the above-described power converter systems 100, 400, 700, and 1200 are modular power converters constructed form one or more ACMs.

Turning to FIG. 18A, a modular power converter 1800 with a single ACM 1805 is illustrated. In FIG. 18B, a modular power converter 1820 is illustrated with n ACMs 1805 connected in parallel. Each ACM 1805 may include an instance of the converter 200 which may also be referred to as the converter block 262 (see FIG. 2), including a DC link capacitor (CDC), a high side (upper) switch, a low side (lower) switch, a midpoint node connecting a drain terminal of upper switch and a source terminal of lower switch, and an LC filter. As illustrated, the converter 200 of the ACM 1805 includes a source-drain capacitor for each of the upper and lower switches, and the LC filter includes both an upper capacitor and lower capacitor, as described in further detail with respect to FIG. 2. In some examples, one or more of the source-drain capacitor and the upper capacitor of the LC filter are not included in the converter 200 of the ACM 1805. Like in FIG. 2, the converter 200 of the ACM 1805 further includes DC terminals 220, including positive DC terminal 222 and negative DC terminal 224, and interface terminals 225, including positive interface terminal 227 and negative interface terminal 229.

Further, each ACM 1805 may include a single printed circuit board (PCB) on which the elements of the converter 200 are mounted. Additionally, although not illustrated in FIGS. 18A-B, a local controller 160 (e.g., in the form of a local MPC controller 760 or local MPC-VCSS controller 1260) may be part of each ACM 1805 and mounted or otherwise included on the same PCB as the converter 200 for the ACM. The PCB may be represented by the dashed-line box around each ACM 1805. Each ACM 1805 may be of a similar size, orientation, and general configuration such that they are modular and can be swapped in and out of a converter system with another ACM 1805.

In some examples, a modular power converter is provided, such as the modular power converter 1820, that includes n ACMs 1805 coupled together as shown in FIG. 18B, and further coupled to a central controller (e.g., central controller 150) as shown in various power converter systems of this disclosure (see, e.g., FIGS. 4, 6, 7, and 12). As explained with respect to those examples, the central controller 150 may determine target operational parameters (e.g., at a macro level) for the modular ACMs 1805 and provide these target operational parameters to the local controllers of these ACMs 1805. The local controllers, in turn, can control and regulate the power switching elements of their respective ACMs 1805 in accordance with those target operational parameters.

As shown in FIG. 18B, in some examples, the n ACMs 1805 include at least two power converter modules or three power converter modules that are coupled in parallel such that the positive DC terminal 222 of each of the ACMs 1805 are coupled together, the negative DC terminal 224 of each of the ACMs 1805 are coupled together, and the negative interface terminal 229 of each of the ACMs 1805 are coupled together. Additionally, the positive interface terminals 227 of the ACMs 1805 for a particular phase of AC may be coupled together, or, in the example of one ACM 1805 per phase, each positive interface terminal 227 may be independent (i.e., not coupled to) any other positive interface terminal 227 of an active ACM 1805.

In some examples, the modular power converter 1800 and 1820 are an AC-to-DC rectifier, a DC-to-AC inverter, or a multi-mode power converter having an AC-to-DC rectifier mode and a DC-to-AC inverter mode.

In some examples of the modular power converter 1800 and 1820, each local controller is configured to drive the power switching element pair of the one or more ACMs 1805 using variable frequency critical soft switching at a frequency of at least 20 kHz, at least 40 kHz, at least 60 kHz, at least 80 kHz, at least 100 kHz, between 60 kHz and 1 MHz, between 100 kHz and 1 MHz, or between 300 kHz and 1 MHz. In some examples, the LC filter of each of the one or more power converter modules is configured to filter an AC power signal received by the LC filter, the AC power signal having a current ripple of at least 200% of a local average current, where the average current denotes the instantaneous value of the output current through the switch-side inductor ($i_{Lf}$).

In some embodiments, a process of converting power with a modular power converter is provided. For example, the process may include receiving, by one or more power converter modules, input power. Each of the one or more power converter modules may include, as described above, a positive direct current (DC) terminal and a negative DC terminal; a capacitor coupled across the positive and negative DC terminals; a power switching element pair; an LC filter including a capacitor and an inductor; a local controller coupled to the power switching element pair; and a circuit board having the positive and negative DC terminals, the capacitor, the power switching element pair, the LC filter, and the local controller. The process may further include driving, by the local controller, the power switching element pair using variable frequency soft switching to convert the input power to output power. The process may further include communicating, by a central controller, with the local controller of each of the one or more power converter modules.

FIG. 19 illustrates a modular three-phase power converter 1900. The converter system 1900 is another example of the power system 100, and may incorporate elements of the systems 400, 700, and 1200 described above. Accordingly, the discussion above with respect to the system 100 of FIG. 1, and like aspects of the system 400 of FIG. 4, the system 700 of FIG. 7, and the system 1200 of FIG. 12 apply also to the system 1900 of FIG. 19, and like numbers are used for like components. For example, the power converter 1900 is shown as coupled to an AC grid 302 via grid connection points 225a, and no motor connection points 225b or AC motor 303 is illustrated. However, in some embodiments, the power converter 1900 further includes motor connection points 225b coupled to the outputs of the common mode inductors 312, respectively, similar to the diagram of FIG.

3A. Thus, like the previously described systems (e.g., 300, 400,700, and 1200), the power converter 1900 may be a bidirectional power converter that can charge a DC source using AC grid power and drive an AC motor using DC source power.

The modular three-phase power converter 1900 includes three ACMs 1905, one for each phase of the three-phase power converter 1900. Each ACM 1905 is generally similar to the ACMs 1805 of FIGS. 18A and 18B, but for the inclusion of m parallel-connected converter blocks 262 on each ACM 1905. For example, three converter blocks 262 of the ACM 1905 for phase C are labeled in FIG. 19, although additional converter blocks 262 may be present for phase C. Three converter blocks 262 are illustrated in FIG. 19 for phases A and B as well, but not labeled, to simplify the illustration. Each ACM 1905, as illustrated, includes shared DC terminals and interface terminals for the m converter blocks 262 making up the particular ACM 1905. Additionally, each converter block 262 of each ACM 1905 may have associated therewith a local controller on the same PCB as the converter block 262. Accordingly, the converter 1900 may include 3×m local controllers for a one-to-one relationship with the 3×m converter blocks 262. In other examples, a local controller may control multiple of the converter blocks 262. The local controller may be implemented as one of the local controllers described herein, such as the local controller 160, 760, or 1260. In FIG. 19, the 3×m local controllers are implemented as local MPC controllers 760$_1$-7603$_m$.

Although the ACMs 1905 of FIG. 19 are described as each having m converter blocks 262 and corresponding local MPC controllers, in some examples, the ACMs 1905 are ACM assemblies that comprise m ACMs 1805. In other words, each phase of the converter 1900 may include a plurality of ACMs 1805 connected together to form the ACM 1905. Further still, in some embodiments, the power converter 1900 is constructed without the modular ACMs 1805 or ACMs 1905 (e.g., the circuits may not be modularized and, rather, may be on multiple circuit boards, custom boards, etc.).

The modular, multiphase MPC power converter 1900 implements a converter with parallel-stacked power modules in each phase to increase the current and power rating for each phase of the converter. Each of the stacked power modules is controlled with a local MPC controller (e.g., local MPC controller 760 or local MPC-VCSS controller 1260) by following the control reference targets (e.g., the reference voltages ($v_{cf,abc}$) for each respective phase from the central controller 150. Each local MPC controller in the converter 1900 functions in a similar manner as the local MPC controllers 760 and local MPC-VCSS controllers 1260 described with respect to FIGS. 7 and 12, respectively, to control the converter block 262 corresponding to the particular local MPC controller.

Accordingly, the ACMs 1805 and 1905 described herein provide for a modular power converter system whereby the ACMs 1805 and/or 1905 may be used as modular building blocks to design a modular power converter that meets the specifications desired in terms of number of phases, current rating, power rating, and the like.

Although the various converter circuits provide herein has mainly been described in the context of a power switching element pair including an upper switch and a lower switch, in some examples, one or more of these converters includes power switching elements arranged in a multi-level switch topology (e.g., a three-level or five-level switch topology), such that the power switching element pair of each power converter module may include more than one high side switching element and more than one low side switching element.

In addition to the functionality and operation of the various power converters discussed above, below are examples of operational processes for the disclosed power converters.

In FIG. 20, a process 2000 for converting power is provided. The process 2000 is described as being carried out by the power converter system 100 implemented as the power converter system 1200 of FIG. 12. However, in some embodiments, the process 2000 may be implemented by another power converter system or by the power converter system 100 implementing another power converter system (e.g., the converter system 400, 700, 1900, or another system provided herein). Additionally, although the blocks of the process 2000 are illustrated in a particular order, in some embodiments, one or more of the blocks may be executed partially or entirely in parallel, may be executed in a different order than illustrated in FIG. 20, or may be bypassed.

In block 2005, an N-phase power converter stage (with N≥1) receives input power from an alternating current (AC) side or a direct current (DC) side. For example, when operating as a DC/AC inverter, the (3-phase) power converter stage 304 of the power converter system 1200 may receive input DC voltage from a DC source, such as battery, capacitor, ultracapacitor, DC power supply from rectified AC source (e.g., AC grid power converted to DC power by a diode bridge rectifier), or the like. For example, the power converter 304 of FIG. 12 is illustrated in further detail in FIG. 3A. In FIG. 3A, on a DC side of the power converter 304, a DC source 306 is coupled to the power converter 304 via DC terminals 220.

Further, when operating as an AC/DC rectifier, the (three-phase) power converter stage 304 of the power converter system 1200 may receive input AC voltage from an AC source, such as an AC grid or an AC generator (e.g., a motor operating in a regenerative braking mode), or the like. For example, the power converter 304 of FIG. 12 is illustrated in further detail in FIG. 3A. In FIG. 3A, on an AC side of the power converter 304, the AC grid 302 is coupled to the power converter 304 via AC interface terminals 225. Alternatively, the AC motor 303, which may operate as a generator during regenerative braking or may be an engine-generator, is couple dot the power converter 304 via AC interface terminals 225.

In block 2010, an N-phase LC filter filters at the AC side of the N-phase power converter stage. The N-phase LC filter includes one or more capacitors and respective one or more neutral points of the one or more capacitors are electrically connected to a DC negative terminal of a DC source. For example, with reference to the power system 1200 of FIG. 12, the (three-phase) LC filter 308 is an example of such an N-phase LC filter that filter at the AC side. The LC filter 308 of FIG. 12, at least in some examples, is illustrated in further detail in FIG. 3A. In FIG. 3A, the LC filter 308 includes three lower capacitors 255, and three switch side inductors 250. The three lower capacitors 255 have neutral connections points coupled to the neutral point 311a, which is coupled to the negative DC terminal 224. In some examples, the LC filter 308 further includes three upper capacitors 215, as illustrated in FIG. 3A. In both the case of the power converter stage 304 operating as an AC/DC rectifier and as a DC/AC inverter, LC filter 308 filters the AC signal between the midpoint node 242 and the interface terminals

225. Further details of the LC filter 308, at least in some examples, are provided above, for example, with respect to FIG. 3A.

In block 2015, a control system (e.g., control system 1205) drives power switching elements of the N-phase power converter stage (e.g., converter stage 304) to convert the input power and to output converted power. Additionally, the control system drives the power switching elements using variable frequency soft switching at a frequency of at least 20 kHz. For example, to drive the power switching elements, the control system 1205 may implement a cascaded control system including the central controller 150 and N local controllers 760. As previously described, the central controller 150 may determine rotational reference frame targets and generate N control reference targets 415. The local controllers 760 may receive the N control reference targets 415, and drive the power switching elements of their corresponding converter block 262 with control signaling in accordance with the received control reference targets. Further, the control signaling drives the power switching elements using variable frequency critical soft switching (VFCSS), such as described above with respect to, for example, FIGS. 12-16. The switching frequency may be at least 20 kHz, at least 40 kHz, at least 60 kHz, at least 80 kHz, at least 100 kHz, between 60-100 kHz, between 60 kHz and 1 MHz, between 100 kHz and 1 MHz, or between 300 kHz and 1 MHz. The higher switching frequencies are particularly practical and provide an efficient, power dense system because of the disclosed topology of the power converter 304 and associated control techniques.

The control signaling may be a PWM control signal provided to the power switching elements 235, 240 (e.g., to the gate terminal of the switching elements), a reference duty cycle (d*) indicating the duty cycle for the PWM control signals, and/or a reference switching frequency fsw* indicating the switching frequency for the PWM control signals (e.g., in the case of VFCSS).

In some examples, the local controllers 760 may implement MPC, as described above with respect to FIGS. 7-8. In some examples, the system 1205 may further implement zero-sequence control, with or without harmonic injection, as described with respect to, for example, FIG. 4. In some examples, the control system operates the power converter stage in a traction mode and in a charging mode (e.g., at different moments in time). In the traction mode, the power converter stage converts the input (DC) power received from the DC source to the converted output (AC) power, and drives an N-phase motor, which is coupled to the N interface terminals, with the converted output (AC) power. In the charging mode, the power converter stage converts the input (AC) power to the converted output (DC) power, and charges a DC source with the converted output (DC) power. The traction mode and charging mode are discussed further with respect to the systems 300 and 400 of FIGS. 3A-3C and FIG. 4, and these discussions are similarly applicable to the other power converters systems 700, 1200, and 1900. In some examples, the central controller 150 uses estimated electrical characteristics, from the local MPC controllers 760 generated by state estimation, to generate the control reference targets 415. In some examples, the local MPC controllers 760 use state estimation to estimate electrical characteristics to generate control signaling for corresponding power switching elements.

Further discussion of the generation of reference targets, generation of control signals, communications in the cascaded control system, power conversion, an operation of the control system 1200 is provided with respect to FIGS. 12-16 and throughout the specification and may be incorporated into the process 2000. For example, to generate the control signaling, the local controllers 1260*a-c* may implement one or more of state estimation (see, e.g., discussion of state estimator 900 and FIG. 9), zero-sequence control with or without harmonic injection (see, e.g., discussion of harmonic injector 405 with respect to FIG. 4), and MPC control (see, e.g., discussion of local MPC controllers 760 of FIGS. 7 and 8 and local MPC-VFCSS controllers 1260 of FIG. 12).

A previously noted, although the process 2000 is described with respect to the converter 1200 of FIG. 12, the process 2000 may similarly be executed by the converter 400, 700, and/or 1900. In such cases, the power converter stage 304 (present in each of these converters) may function similarly as provided above to execute blocks 2005, the LC filter 308 (present in each of these converters) may function similarly as provided above to execute block 2010, and the control system 105 or 705 of each respective converter system may execute block 2015 to drive the power switching elements to convert the input power to output converter power using VFCSS (e.g., as described with respect the converter system 1200 of FIG. 12).

In FIG. 21, a process 2100 for converting power for an electric vehicle is provided. The process 2100 is described as being carried out by the power converter system 100 implemented as the power converter system 400 of FIG. 4. However, in some embodiments, the process 2100 may be implemented by another power converter system or by the power converter system 100 implementing another power converter system (e.g., the converter system 700, 1200, 1900, or another system provided herein). Additionally, although the blocks of the process 2100 are illustrated in a particular order, in some embodiments, one or more of the blocks may be executed partially or entirely in parallel, may be executed in a different order than illustrated in FIG. 21, or may be bypassed.

In block 2105, an N-phase power converter stage (with N≥1) receives input power from an alternating current (AC) side having AC terminals or a direct current (DC) side having DC source terminals. For example, when operating as a DC/AC inverter, the (3-phase) power converter stage 304 of the power converter system 400 may receive input DC voltage from a DC source, such as battery, capacitor, ultracapacitor, DC power supply from rectified AC source (e.g., AC grid power converted to DC power by a diode bridge rectifier), or the like. For example, the power converter 304 of FIG. 4 is illustrated in further detail in FIG. 3A. In FIG. 3A, on a DC side of the power converter 304, a DC source 306 is coupled to the power converter 304 via DC terminals 220.

Further, when operating as an AC/DC rectifier, the (three-phase) power converter stage 304 of the power converter system 400 may receive input AC voltage from an AC source, such as an AC grid or an AC generator (e.g., a motor operating in a regenerative braking mode), or the like. For example, the power converter 304 of FIG. 12 is illustrated in further detail in FIG. 3A. In FIG. 3A, on an AC side of the power converter 304, the AC grid 302 is coupled to the power converter 304 via AC interface terminals 225. Alternatively, the AC motor 303, which may operate as a generator during regenerative braking or may be an engine-generator, is couple dot the power converter 304 via AC interface terminals 225.

In block 2110, an N-phase LC filter filters at the AC side of the N-phase power converter stage. The LC filter includes one or more capacitors with respective one or more neutral points of the one or more capacitors being electrically connected to a DC negative terminal of the DC source terminals. For example, with reference to the power system 400 of FIG. 4, the (three-phase) LC filter 308 is an example of such an N-phase LC filter that filter at the AC side. The LC filter 308 of FIG. 4, at least in some examples, is illustrated in further detail in FIG. 3A. In FIG. 3A, the LC filter 308 includes three lower capacitors 255, and three switch side inductors 250. The three lower capacitors 255 have neutral connections points coupled to the neutral point 311*a*, which is coupled to the negative DC terminal 224. In some examples, the LC filter 308 further includes three upper capacitors 215, as illustrated in FIG. 3A. In both the case of the power converter stage 304 operating as an AC/DC rectifier and as a DC/AC inverter, LC filter 308 filters the AC signal between the midpoint node 242 and the interface terminals 225. Further details of the LC filter 308, at least in some examples, are provided above, for example, with respect to FIG. 3A.

In block 2115, a control system (e.g., the control system 400) drives power switching elements of the N-phase power converter stage (e.g., the power converter stage 304) in a charging mode and in a traction mode. For example, with reference to FIGS. 3A and 3B, when in the charging mode, the power converter stage 304 converts input AC power received from the grid 302 via the AC terminals 225*a* to output DC power provided to the DC source terminals 220 to charge a DC source 306. With reference to FIGS. 3A and 3C, when in the traction mode, the power converter stage 304 converts input DC power received from the DC source 306 via the DC source terminals 220 to output AC power provided to the AC terminals 225*b* to drive a motor 303. The control system 400 may alternate between driving the power switching elements 235 and 240 of the converter stage 304 in the charging mode and the traction mode.

In some examples, the control system may drive the power switching elements in the charging mode in a first time period (e.g., when the power converter stage is coupled to an AC grid via the AC terminals), and may drives the power switching elements in the traction mode in a second time period (e.g., when the AC grid is not connected via the AC terminals). In other words, the power converter stage may operate in the charging mode at different moments in time than the traction mode. The control system may determine whether to operate in the charging mode or traction mode based on, for example, whether the grid connection points 225*a* are currently coupled to an active AC grid 302, whether the control system 400 has received a user or operator command to drive the motor. For example, in the case of an electric vehicle, the central controller 150 may determine to operate in the traction mode in response to detecting no connection to the grid 302, to detecting an ignition switch being enabled on the electric vehicle, and/or detection of a user torque or drive comment (e.g., depression of an accelerator pedal of the vehicle). The ignition switch and input device (e.g., accelerator pedal) for receiving the torque or drive command may be part of the I/O interface 142 (see FIG. 1) coupled to the control system 400. In the traction mode, the central controller 150 may generate a reference electrical characteristic (e.g., $i_{o,dq}$*) using a first algorithm or scheme (e.g., via current reference generator 417), while in the charging mode, the central controller 150 may generate the reference electrical characteristics (e.g., $i_{o,dq}$*) using a second algorithm or scheme (e.g., via the CC/CV control block 418).

For the control system 400 to drive the power switching elements in both the charging and traction modes, the central controller 150 may generate and provide reference targets

415 to the local controllers 160*a-c*. The local controllers 160*a-c*, in turn, may generate control signaling for their corresponding converter blocks 262*a-c*. Further discussion of the generation of reference targets, generation of control signals, communications in the cascaded control system, power conversion, an operation of the control system 400 is provided with respect to FIGS. 4-6 and throughout the specification and may be incorporated into the process 2100. To generate the control signaling, the local controllers 160*a-c* may implement one or more of state estimation (see, e.g., discussion of state estimator 900 and FIG. 9), zero-sequence control with or without harmonic injection (see, e.g., discussion of harmonic injector 405 with respect to FIG. 4), MPC control (see, e.g., discussion of local MPC controllers 760 of FIGS. 7 and 8 and local MPC-VFCSS controllers 1260 of FIG. 12), and variable frequency critical soft switching (VFCSS) (see, e.g., discussion of VFCSS with respect to the local MPC-VFCSS controllers 1260 and in FIGS. 11-16).

A previously noted, although the process 2100 is described with respect to the converter 400 of FIG. 4, the process 2100 may similarly be executed by the converter 700, 1200, and/or 1900. In such cases, the power converter stage 304 (present in each of these converters) may function similarly as provided above to execute blocks 2105, the LC filter 308 (present in each of these converters) may function similarly as provided above to execute block 2110, and the control system 105, 705, and 1205 of each respective converter system may execute block 2015 to drive the power switching elements to convert the input power to output converter power in the traction mode (as DC/AC inverter) and charging mode (as AC/DC rectifier).

In experimental testing of embodiments provided herein, converter systems such as systems 300 of FIG. 3A were shown to have reduced motor leakage currents and shaft voltages. For example, one 11 kW prototype with the topology illustrated in FIG. 3A was shown to have reduced peak-to-peak leakage current by 94%, reduced RMS leakage current by 97%, and reduced peak-to-peak shaft voltage by 90%, compared to a converter without the common mode inductor 312, LC filter 308, and common mode voltage control described above. More particularly, a prototype converter system was tested that incorporates the topology illustrated in FIG. 3A, a permanent magnet synchronous motor (PMSM), and the characteristics of Table 1 (below).

TABLE 1

Prototype Converter Characteristics

| Parameter | Value | |
|---|---|---|
| PMSM pole pairs ($p_p$) | 5 | |
| PMSM stator resistance ($R_s$) | 0.4 | Ω |
| PMSM d-axis inductance ($L_d$) | 10.5 | mH |
| PMSM q-axis inductance ($L_q$) | 12.9 | mH |
| Permanent magnet flux ($\Psi$) | 0.3491 | Wb |
| Filter inductance ($L_f$) | 45 | μH |
| Filter capacitance ($C_f$) | 12 | μF |
| Common mode inductance ($L_{CM}$) | 4 | mH |
| Minimum DC voltage | 700 | V |
| Nominal DC voltage | 835 | V |
| Maximum DC voltage | 900 | V |
| Rated power | 11 | kW |

Table 2 (below) illustrates the measured leakage current from experimentation using different variations of the prototype in traction mode.

TABLE 2

| Leakage current measurements of PMSM drive with and without LC filter 308 and common mode inductor 312 (600 RPM) | | |
| --- | --- | --- |
| Test Condition | Peak-to-Peak | RMS |
| No LC filter, $L_{CM} = 0$ mH | 4.92A | 458 mA |
| No LC filter, $L_{CM} = 4$ mH | 1.68A | 393.5 mA |
| LC filter, $L_{CM} = 0$ mH | 0.578A | 34.23 mA |
| LC filter, $L_{CM} = 4$ mH | 0.272A | 15.78 mA |

Accordingly, in some examples of the disclosed systems and methods, leakage current is maintained below 0.5 A, below 0.4 A, and below 0.3 A (peak-to-peak), and/or below 30 mA, below 25 mA, below 20 mA, or below 17 mA (RMS).

Further, the prototype demonstrated improved efficiencies in traction mode by measuring the output mechanical power of the system $P_m = T_L \omega_m$ and dividing it by the input power to the system $P_{in} = V_{DC} I_{DC}$ at N=1200 RPM in four cases: 20 kHz switching with no LC filter, which represents a standard traction drive; 80 kHz with no LC filter, which is a standard drive topology at a higher switching frequency; 80 kHz with the proposed topology, which does not always achieve soft switching; and the variable frequency critical soft switching implementation of the proposed topology. The results of the efficiency measurements are presented in FIG. 22, where it can be seen that the variable frequency drive has the highest efficiency and is 0.6% more efficient at maximum power than the 20 kHz standard drive. The PMSM's peak efficiency is 93%, per its datasheet.

Additionally, in a charging mode, peak efficiency was measured to be between 98.4% and 99.4%. More particularly, the efficiency of the protype converter system in charging mode was tested under different load and line conditions. Results are shown in FIG. 23, where the nominal DC voltage of 835V was applied with ±10% variation in the nominal AC line-to-line voltage of 400V. Peak efficiency is 99.4% and minimum efficiency at rated power is 98.4%. Other results in literature are in the range of 93-95% for 3.3 kW add-on interface integrated chargers with 400V batteries, 90-95% for 6.6 kW integrated chargers with six-phase machines, and 80% for a split-phase three-phase PMSM operating at 2 kW. Non-integrated on-board chargers, i.e. units dedicated solely to charging, have been shown to be up to 97% efficient at 22 kW, though they require substantial numbers of components, and commercially available on-board chargers are up to 95% efficient. Therefore, the disclosed topology performs well while providing net efficiency and reliability benefits in traction mode and removing the need for an isolation transformer in charging mode.

Of course, this particular prototype is just one example of a power converter that may be implemented and operated according to embodiments and examples disclosed herein.

Performing the various techniques and operations described herein may be facilitated by an electronic controller (e.g., a processor-based computing device), such as a central controller 150, local controller 160, local MPC controller 760, local MPC VFCSS controller 1260, or the like as described herein. Such an electronic controller may include a processor-based device such as a computing device, and so forth, that may include a central processor unit (CPU) or a processing core. In addition to the CPU or processing core, the system includes main memory, cache memory, and bus interface circuits. The electronic controller may include a memory storage device, such as a hard drive (solid state hard drive, or other types of hard drive), or flash drive associated with the computer system. The electronic controller may further include a keyboard, or keypad, or some other user input interface, and a monitor, e.g., an LCD (liquid crystal display) monitor, that may be placed where a user can access them.

FIG. 24 illustrates a configurable power converter architecture 2400 in accordance with examples disclosed herein. That is, the power converter architecture 2400 may be implemented by one or more of the power converter systems described herein, including systems 300, 700, 1200, and 1900. The architecture 2400 is a hierarchical software-defined control architecture that includes a central control layer 2405, a local control layer 2410, and an application layer 2415. The central control layer 2405 may be similar to or an example of the central controller 105 described herein. The central control layer 2405 may, among other things, manage the power converters of the local layer 2410, generate and execute central voltage, current, power, torque, speed, and/or control targets and functions, and identify a type of application to which the architecture 2400 is being applied and reconfigure accordingly (e.g., to generate the appropriate control targets and execute the appropriate functions). The local control layer 2410 may be similar to or an example of one or more of the local controllers 160, 760, or 1260 described herein. The local controllers may provide one or more of local voltage/current control, MPC-based control, VFCSS control, state estimation/observation, and PWM modulation, as described above. In some examples, the local controllers of the local control layer 2410 are examples of modular local control modules or ACMs, such as described with respect to FIGS. 18A, 18B, and 19. The central control layer 2405 and local control layer 2410 are connected via communication bus 2420 (similar to bus 615 of FIG. 6). The application layer 2415 may include interface (s) for interfacing with different electrified load/source applications, such as an EV battery, single-phase grid, three-phase grid, solar (photovoltaic (PV) array, motor, and the like.

The architecture 2400 is flexible and configurable for several different types of applications using the same hardware. For example, one or both of the central control layer 2405 and local control layer 2410 may include the same components, but the central control layer 2405 may have a central level controller that is programmed (software-defined) to implement a particular application. In some examples, the central level controller may include various application software packages residing thereon (e.g., one per application type), where one software package is selected (or activated) for use during an installation of configuration step for a given application layer that is connected to the local control layer 2410. The particular software package included or selected on the central level controller may include one or more of the various functions illustrated in FIG. 24. These functions, and the software package generally, ultimately generate the reference targets for the local controllers of the local layer 2410. The connected application layer 2415 may be, for example, one of the illustrated applications in FIG. 24, including a solar (PV array) application, battery application, three-phase grid application, single-phase grid application, 3 phase motor application (e.g., in an electric vehicle or industrial equipment setting), or the like.

FIG. 25A-B illustrate an example of the architecture 2400 of FIG. 24 implemented in a single-phase grid application configuration 2500. The configuration 2500 includes the central control layer 2505, which is an implementation of the layer 2405 of FIG. 24, configured for single-phase grid control operation. The configuration 2500 further includes the local control layer 2510, which is an implementation of the layer 2410 of FIG. 24, and which includes two local controllers (e.g., local controllers 160, 760, or 1260). The configuration 2500 further includes the application control layer 2515, which is an implementation of the layer 2415 of FIG. 24, and which is a single-phase grid application. In the configuration 2500, the architecture 2400 is operable to inject power into the grid (e.g., inverted from a DC source such as a battery, solar (photovoltaic) array), or the like), to charge or power a DC load with DC power (e.g., received and rectified from the grid), or both. To perform this power conversion, the configuration 2500 may be operated and controlled using the principles described herein, such as with respect to FIGS. 2-21 (e.g., one or more of cascaded control, stabilized common mode control, harmonic injection, MPC control, VFCSS control or a combination thereof). FIG. 25B illustrates an example circuit diagram for the configuration 2500, along with the local controllers and central level controller.

FIG. 26A-B illustrate an example of the architecture 2400 of FIG. 24 implemented in a three-phase grid application configuration 2600. The configuration 2600 includes the central control layer 2605, which is an implementation of the layer 2405 of FIG. 24, configured for three-phase grid control operation. The configuration 2600 further includes the local control layer 2610, which is an implementation of the layer 2410 of FIG. 24, and which includes three local controllers (e.g., local controllers 160, 760, or 1260). The configuration 2600 further includes the application control layer 2615, which is an implementation of the layer 2415 of FIG. 24, and which is a three-phase grid application. In the configuration 2600, the architecture 2400 is operable to inject power into the grid (e.g., inverted from a DC source such as a battery, solar (photovoltaic) array), or the like), to charge or power a DC load with DC power (e.g., received and rectified from the grid), or both. To perform this power conversion, the configuration 2600 may be operated and controlled using the principles described herein, such as with respect to FIGS. 2-21 (e.g., one or more of cascaded control, stabilized common mode control, harmonic injection, MPC control, VFCSS control or a combination thereof). FIG. 26B illustrates an example circuit diagram for the configuration 2600, including a PV array as the DC load/source (although it could also be a battery, ultracapacitor, or the like), along with the local controllers and central level controller.

FIG. 27A-B illustrate an example of the architecture 2400 of FIG. 24 implemented in a three-phase motor application configuration 2700. The configuration 2700 includes the central control layer 2705, which is an implementation of the layer 2405 of FIG. 24, configured for motor operation. The configuration 2700 further includes the local control layer 2710, which is an implementation of the layer 2410 of FIG. 24, and which includes three local controllers (e.g., local controllers 160, 760, or 1260). The configuration 2700 further includes the application control layer 2715, which is an implementation of the layer 2415 of FIG. 24, and which is a three-phase motor application. In the configuration 2700, the architecture 2400 is operable to drive the motor (e.g., inverted from a DC source such as a battery, solar (photovoltaic) array), or the like), to charge or power a DC load with DC power (e.g., received and rectified from the motor), or both. In some examples, the configuration 2700 is further coupled to an AC grid and is also configured to charge the DC source with DC power (e.g., received and rectified from the grid) and to inject power into the grid (e.g., inverted from the DC source). To perform this power conversion, the configuration 2700 may be operated and controlled using the principles described herein, such as with respect to FIGS. 2-21 (e.g., one or more of cascaded control, stabilized common mode control, harmonic injection, MPC control, VFCSS control or a combination thereof). FIG. 27B illustrates an example circuit diagram for the configuration 2700, including a batter as the DC load/source (although it could also be a PV array, ultracapacitor, or the like), along with the local controllers and central level controller. The configuration 2700 may provide V2G or V2X interfacing functions, as previously described.

The electronic controller is configured to facilitate, for example, the implementation of a power converter (e.g., by controlling the switching devices of, for example, a non-isolated three-phase DC/AC power converter system). The storage device may thus include a computer program product that when executed on the electronic controller (which, as noted, may be a processor-based device) causes the processor-based device to perform operations to facilitate the implementation of procedures and operations described herein. The electronic controller may further include peripheral devices to enable input/output functionality. Such peripheral devices may include, for example, flash drive (e.g., a removable flash drive), or a network connection (e.g., implemented using a USB port and/or a wireless transceiver), for downloading related content to the connected system. Such peripheral devices may also be used for downloading software containing computer instructions to enable general operation of the respective system/device. Alternatively and/or additionally, in some embodiments, special purpose logic circuitry, e.g., an FPGA (field programmable gate array), an ASIC (application-specific integrated circuit), a DSP processor, a graphics processing unit (GPU), application processing unit (APU), etc., may be used in the implementations of the electronic controller. Other modules that may be included with the electronic controller may include a user interface to provide or receive input and output data. The electronic controller may include an operating system.

Computer programs (also known as programs, software, software applications or code) include machine instructions for a programmable processor, and may be implemented in a high-level procedural and/or object-oriented programming language, and/or in assembly/machine language. As used herein, the term "machine-readable medium" refers to any non-transitory computer program product, apparatus and/or device (e.g., magnetic discs, optical disks, memory, Programmable Logic Devices (PLDs)) used to provide machine instructions and/or data to a programmable processor, including a non-transitory machine-readable medium that receives machine instructions as a machine-readable signal.

In some embodiments, any suitable computer readable media can be used for storing instructions for performing the processes/operations/procedures described herein. For example, in some embodiments computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as flash memory, electrically programmable read only memory (EPROM), electrically erasable programmable read only Memory (EEPROM), etc.), any suitable media that is not fleeting or not devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

Although particular embodiments have been disclosed herein in detail, this has been done by way of example for purposes of illustration only, and is not intended to be limiting with respect to the scope of the appended claims, which follow. Features of the disclosed embodiments can be combined, rearranged, etc., within the scope of the invention to produce more embodiments. Some other aspects, advantages, and modifications are considered to be within the scope of the claims provided below. The claims presented are representative of at least some of the embodiments and features disclosed herein. Other unclaimed embodiments and features are also contemplated.

Further Examples

Example 1: A method, apparatus, and/or non-transitory computer-readable medium storing processor-executable instructions for a non-isolated power converter system, the system, comprising: an N-phase power converter stage having to an alternating current (AC) side and a direct current (DC) side, with N≥1; an N-phase LC filter comprising one or more capacitors, wherein respective one or more neutral points of the one or more capacitors are electrically connected to a DC negative terminal of a DC source; and a control system configured to drive power switching elements of the N-phase power converter stage to convert received power and to output converted power, the control system configured to drive the power switching elements using variable frequency soft switching at a frequency of at least 20 KHz.

Example 2: The method, apparatus, and/or non-transitory computer readable medium of Example 1, wherein the control system is a cascaded control system comprising: a central controller including a processing unit, the central controller configured to: determine rotational reference frame targets, and generate N control reference targets; and at least one local controller, each of the at least one local controller including a local processing unit, each of the at least one local controller configured to: receive a control reference target of the N control reference targets, and drive a portion of the power switching elements, associated with the local controller, in accordance with the control reference target.

Example 3: The method, apparatus, and/or non-transitory computer readable medium of any of Examples 1 to 2, wherein, to drive the portion of the power switching elements in accordance with the control reference target, each of the at least one local controller is configured to: implement model predictive control (MPC) to generate control signaling for the portion of the power switching elements.

Example 4: The method, apparatus, and/or non-transitory computer readable medium of any of Examples 1 to 3, wherein the central controller is further configured to: receive at least one electrical operational characteristic from each of the at least one local controller, the electrical operational characteristics in the stationary reference frame; convert the at least one electrical operational characteristic to the rotating reference frame; and determine a direct axis (D-axis) component and a quadrature axis (Q-axis) component of the rotational reference frame targets based on the at least one electrical operational characteristic in the rotating reference frame.

Example 5: The method, apparatus, and/or non-transitory computer readable medium of any of Examples 1 to 4, wherein the central controller is further configured to: determine a zero-sequence component target of the rotational reference frame targets based on a DC offset of half a DC voltage across a positive terminal of the DC source and the negative terminal of the DC source.

Example 6: The method, apparatus, and/or non-transitory computer readable medium of any of Examples 1 to 5, wherein the central controller is further configured to: determine a zero-sequence component target of the rotational reference frame targets based on a DC offset and multiple of N-th phase harmonic injection.

Example 7: The method, apparatus, and/or non-transitory computer readable medium of any of Examples 4 to 6, wherein, to generate the N control reference targets in the stationary reference frame based on the rotational reference frame targets, the central controller is further configured to: convert the D-axis voltage component, Q-axis voltage component, and the zero-sequence component target to the stationary reference frame.

Example 8: The method, apparatus, and/or non-transitory computer readable medium of any of Examples 1 to 7, wherein the power switching elements include, for each phase of the N phases of the power converter stage, a high-side element and a low-side element connected at a midpoint node, and wherein the midpoint node of each phase of the N phases of the power converter stage is coupled to a respective LC filter of the N-phase LC filter that includes (i) an inductor coupled between the midpoint node and a filter node of the respective LC filter, and (ii) a capacitor, of the one or more capacitors of the N-phase LC filter, coupled between the filter node of the respective LC filter and the negative DC terminal.

Example 9: The method, apparatus, and/or non-transitory computer readable medium of Example 8, wherein each respective LC filter further includes a second capacitor coupled between the filter node of the respective LC filter and a positive DC terminal of the DC source.

Example 10: The method, apparatus, and/or non-transitory computer readable medium of any of Examples 8 to 9, further comprising: an N-phase common mode inductor coupled between the filter nodes and N interface terminals.

Example 11: The method, apparatus, and/or non-transitory computer readable medium of any of Examples 1 to 10, further comprising: an N-phase motor coupled to the N interface terminals.

Example 12: The method, apparatus, and/or non-transitory computer readable medium of any of Examples 1 to 11, wherein the N interface terminals include N motor connection points for coupling to an N-phase motor and N grid connection points for coupling to an N-phase power grid.

Example 13: The method, apparatus, and/or non-transitory computer readable medium of any of Examples 1 to 12, further comprising a traction mode and a charging mode, wherein: when in the traction mode, the power converter is configured to convert DC power from the DC source to AC power on the N motor connection points to drive the N-phase motor; when in the charging mode, the power converter is configured to convert AC power from the N grid connection points to DC power to charge the DC source.

Example 14: The method, apparatus, and/or non-transitory computer readable medium of any of Examples 1 to 13, wherein a sensor configured to sense a first electrical characteristic of a first component of the N-phase LC filter selected from the group of a switch-side inductor and a capacitor, and to generate sensor data indicative of the first electrical characteristic; and wherein the control system is further configured to: receive the sensor data from the sensor, perform state estimation, based on the sensor data, to estimate a second electrical characteristic of a second component of the N-phase LC filter that is different from the first component, and to drive the power switching elements based on the second electrical characteristic.

Example 15: The method, apparatus, and/or non-transitory computer readable medium of any of Examples 1 to 14, wherein to drive the power switching elements using variable frequency soft switching, the control system is configured to determine a switching frequency for driving the power switching elements of the converter based on an electrical characteristic of the N-phase LC filter.

Example 16: The method, apparatus, and/or non-transitory computer readable medium of any of Examples 1 to 15, further comprising: N power converter modules, where N>1, each power converter module including: a positive direct current (DC) terminal and a negative DC terminal of the DC side of the N-phase power converter stage, a power switching element pair including a high side power switching element coupled to the positive DC terminal and a low side power switching element coupled to the negative DC terminal, wherein the high side power switching element and the low side power switching element are coupled together at a midpoint node, an LC filter of the N-phase LC filter including a capacitor of the one or more capacitors and an inductor, the inductor coupled between the midpoint node and the capacitor, the capacitor coupled between the inductor and the negative DC terminal, a local controller of the at least one local controllers configured to drive the power switching element pair, wherein the power switching element pair is the portion of power switching elements associated with the local controller, and a circuit board having located thereon the positive and negative DC terminals, the power switching element pair, the LC filter, and the local controller; wherein the positive DC terminal of each of the N power converter modules are coupled together and the negative DC terminal of each of the one or more power converter modules are coupled together.

Example 17: A method, apparatus, and/or non-transitory computer readable medium for a non-isolated power converter system for an electric vehicle, comprising: an N-phase power converter stage having an alternating current (AC) side and a direct current (DC) side, with N≥1, wherein the DC side includes DC source terminals; an N-phase LCL filter comprising one or more capacitors, wherein respective one or more neutral points of the one or more capacitors are electrically connected to a negative DC terminal of the DC source terminals; and a control system configured to drive power switching elements of the N-phase power converter stage to: in a charging mode, convert input AC power received via AC terminals to output DC power provided to the DC source terminals to charge the DC source, and in a traction mode, convert input DC power received via the DC source terminals to output AC power provided to the AC terminals to drive a motor.

Example 18: The method, apparatus, and/or non-transitory computer readable medium of Example 17, further comprising: a contactor circuit including a plurality of contactors configured to selectively connect the AC terminals to either motor connection points or to AC grid connection points.

Example 19: The method, apparatus, and/or non-transitory computer readable medium of any of Examples 17 to 18, wherein, during the traction mode and the charging mode, the AC terminals are connected to both motor connection points and AC grid connection points.

Example 20: The method, apparatus, and/or non-transitory computer readable medium of any of Examples 17 to 19, further comprising: an N-phase common mode inductor coupled between the N-phase LC filter and the AC terminals.

Example 21: The method, apparatus, and/or non-transitory computer readable medium of any of Examples 17 to 20, further comprising: motor bearings of the motor; and a motor shaft driven by the motor.

Example 22: The method, apparatus, and/or non-transitory computer readable medium of any of Examples 17 to 21, where the control system is a cascaded control system comprising: a central controller including a processing unit, the central controller configured to: determine rotational reference frame targets, and generate N control reference targets; and at least one local controller, each of the at least one local controller including a local processing unit, each of the at least one local controller configured to: receive a control reference target of the N control reference targets, and drive a portion of the power switching elements, associated with the local controller, in accordance with the control reference target.

Example 23: The method, apparatus, and/or non-transitory computer readable medium of any of Examples 17 to 22, wherein, to drive the portion of the power switching elements in accordance with the control reference target, each of the at least one local controller is configured to: implement model predictive control (MPC) to generate control signaling for the portion of the power switching elements.

Example 24: The method, apparatus, and/or non-transitory computer readable medium of any of Examples 17 to 23, wherein the central controller is further configured to: receive at least one electrical operational characteristic from each of the at least one local controller, the electrical operational characteristics in the stationary reference frame; convert the at least one electrical operational characteristic to the rotating reference frame; and determine a direct axis (D-axis) component and a quadrature axis (Q-axis) component of the rotational reference frame targets based on the at least one electrical operational characteristic in the rotating reference frame.

Example 25: The method, apparatus, and/or non-transitory computer readable medium of any of Examples 17 to 24, wherein the central controller is further configured to: determine a zero-sequence component target of the rotational reference frame targets based on a DC offset of half a DC voltage across a positive terminal of the DC source and the negative terminal of the DC source.

Example 26: The method, apparatus, and/or non-transitory computer readable medium of any of Examples 17 to 25, wherein the central controller is further configured to: determine a zero-sequence component target of the rotational reference frame targets based on a DC offset and multiple of N-th phase harmonic injection, Example 27: The method, apparatus, and/or non-transitory computer readable medium of any of Examples 17 to 26, wherein, to generate the N control reference targets in the stationary reference frame based on the rotational reference frame targets, the central controller is further configured to: convert the D-axis voltage component, Q-axis voltage component, and the zero-sequence component target to the stationary reference frame.

Example 28: The method, apparatus, and/or non-transitory computer readable medium of any of Examples 17 to 27, wherein the power switching elements include, for each phase of the N phases of the power converter stage, a high-side element and a low-side element connected at a midpoint node, and wherein the midpoint node of each phase of the N phases of the power converter stage is coupled to a respective LC filter of the N-phase LC filter that includes (i) an inductor coupled between the midpoint node and a filter node of the respective LC filter, and (ii) a capacitor, of the one or more capacitors of the N-phase LC filter, coupled between the filter node of the respective LC filter and the negative DC terminal.

Example 29: The method, apparatus, and/or non-transitory computer readable medium of any of Examples 17 to 28, wherein each respective LC filter further includes a second capacitor coupled between the filter node of the respective LC filter and a positive DC terminal of the DC source.

Example 30: The method, apparatus, and/or non-transitory computer readable medium of any of Examples 17 to 29, wherein a sensor configured to sense a first electrical characteristic of a first component of the N-phase LC filter selected from the group of a switch-side inductor and a capacitor, and to generate sensor data indicative of the first electrical characteristic; and wherein the control system is further configured to: receive the sensor data from the sensor, perform state estimation, based on the sensor data, to estimate a second electrical characteristic of a second component of the N-phase LC filter that is different from the first component, and to drive the power switching elements based on the second electrical characteristic.

What is claimed is:

1. A non-isolated power converter system, the system comprising:
  an N-phase power converter stage having to an alternating current (AC) side and a direct current (DC) side, with N≥1;
  an N-phase LC filter comprising one or more capacitors, wherein respective one or more neutral points of the one or more capacitors are electrically connected to a DC negative terminal of a DC source; and
  a control system configured to drive power switching elements of the N-phase power converter stage to convert received power and to output converted power, the control system configured to drive the power switching elements using variable frequency soft switching at a frequency of at least 20 kHz,
  where the control system is a cascaded control system comprising:
    a central controller including a processing unit, the central controller configured to:
      determine rotational reference frame targets, and generate N control reference targets; and
    at least one local controller, each of the at least one local controller including a local processing unit, each of the at least one local controller configured to:
      receive a control reference target of the N control reference targets, and
      drive a portion of the power switching elements, associated with the local controller, in accordance with the control reference target.

2. The power converter system of claim 1, wherein, to drive the portion of the power switching elements in accordance with the control reference target, each of the at least one local controller is configured to:
  implement model predictive control (MPC) to generate control signaling for the portion of the power switching elements.

3. The power converter system of claim 1, wherein the central controller is further configured to:
  receive at least one electrical operational characteristic from each of the at least one local controller, the electrical operational characteristics in a stationary reference frame;
  convert the at least one electrical operational characteristic to the rotating reference frame; and
  determine a direct axis (D-axis) component and a quadrature axis (Q-axis) component of the rotational reference frame targets based on the at least one electrical operational characteristic in the rotating reference frame.

4. The power converter system of claim 3, wherein the central controller is further configured to:
  determine a zero-sequence component target of the rotational reference frame targets based on a DC offset of half a DC voltage across a positive terminal of the DC source and the negative terminal of the DC source.

5. The power converter system of claim 3, wherein the central controller is further configured to:
  determine a zero-sequence component target of the rotational reference frame targets based on a DC offset and multiple of N-th phase harmonic injection.

6. The power converter system of claim 5,
  wherein, to generate the N control reference targets in the stationary reference frame based on the rotational reference frame targets, the central controller is further configured to:
    convert the D-axis voltage component, Q-axis voltage component, and the zero-sequence component target to the stationary reference frame.

7. The power converter system of claim 1, wherein the power switching elements include, for each phase of the N phases of the power converter stage, a high-side element and a low-side element connected at a midpoint node, and
  wherein the midpoint node of each phase of the N phases of the power converter stage is coupled to a respective LC filter of the N-phase LC filter that includes (i) an inductor coupled between the midpoint node and a filter node of the respective LC filter, and (ii) a capacitor, of the one or more capacitors of the N-phase LC filter, coupled between the filter node of the respective LC filter and the negative DC terminal.

8. The power converter system of claim 7, wherein each respective LC filter further includes a second capacitor coupled between the filter node of the respective LC filter and a positive DC terminal of the DC source.

9. The power converter system of claim 7, further comprising:
  an N-phase common mode inductor coupled between the filter nodes and N interface terminals.

10. The power converter system of claim 9, further comprising:
  an N-phase motor coupled to the N interface terminals.

11. The power converter system of claim 9, wherein the N interface terminals include N motor connection points for coupling to an N-phase motor and N grid connection points for coupling to an N-phase power grid.

12. The power converter system of claim 11, further comprising a traction mode and a charging mode, wherein:
  when in the traction mode, the power converter is configured to convert DC power from the DC source to AC power on the N motor connection points to drive the N-phase motor; and when in the charging mode, the power converter is configured to convert AC power from the N grid connection points to DC power to charge the DC source.

13. The power converter system of claim 1, wherein a sensor configured to sense a first electrical characteristic of a first component of the N-phase LC filter selected from a group of a switch-side inductor and a capacitor, and to generate sensor data indicative of the first electrical characteristic; and wherein the control system is further configured to:

receive the sensor data from the sensor, perform state estimation, based on the sensor data, to estimate a second electrical characteristic of a second component of the N-phase LC filter that is different from the first component, and to drive the power switching elements based on the second electrical characteristic.

14. The power converter system of claim 1, wherein to drive the power switching elements using variable frequency soft switching, the control system is configured to determine a switching frequency for driving the power switching elements of the converter based on an electrical characteristic of the N-phase LC filter.

15. The power converter system of claim 1, further comprising:

N power converter modules, where N>1, each power converter module including:

a positive direct current (DC) terminal and a negative DC terminal of the DC side of the N-phase power converter stage, a power switching element pair including a high side power switching element coupled to the positive DC terminal and a low side power switching element coupled to the negative DC terminal, wherein the high side power switching element and the low side power switching element are coupled together at a midpoint node, an LC filter of the N-phase LC filter including a capacitor of the one or more capacitors and an inductor, the inductor coupled between the midpoint node and the capacitor, the capacitor coupled between the inductor and the negative DC terminal, a local controller of the at least one local controllers configured to drive the power switching element pair, wherein the power switching element pair is the portion of power switching elements associated with the local controller, and a circuit board having located thereon the positive and negative DC terminals, the power switching element pair, the LC filter, and the local controller;

wherein the positive DC terminal of each of the N power converter modules are coupled together and the negative DC terminal of each of the one or more power converter modules are coupled together.

16. A method of converting power, the method comprising:

receiving input power, by an N-phase power converter stage, from an alternating current (AC) side or a direct current (DC) side, with N≥1;

filtering, by an N-phase LC filter comprising one or more capacitors, at the AC side of the N-phase power converter stage, wherein respective one or more neutral points of the one or more capacitors are electrically connected to a DC negative terminal of a DC source;

driving, by a control system that is a cascaded control system, power switching elements of the N-phase power converter stage to convert the input power and to output converted power, the control system configured to drive the power switching elements using variable frequency soft switching at a frequency of at least 20 kHz, determining, by a central controller of the cascaded control system, rotational reference frame targets;

generating, by the central controller, N control reference targets;

receiving, by each of at least one local controller of the cascaded control system, a control reference target of the N control reference targets; and driving a portion of the power switching elements, associated with the local controller, in accordance with the control reference target.

17. The method of claim 16, wherein driving, by each of the at least one local controller, the portion of the power switching elements in accordance with the control reference target, comprises:

implementing, by each of the at least one local controller, model predictive control (MPC) to generate control signaling for the portion of the power switching elements.

18. The method of claim 16, further comprising:

receiving, by the central controller, at least one electrical operational characteristic from each of the at least one local controller, the electrical operational characteristics in a stationary reference frame;

converting, by the central controller, the at least one electrical operational characteristic to the rotating reference frame; and determining, by the central controller, a direct axis (D-axis) component and a quadrature axis (Q-axis) component of the rotational reference frame targets based on the at least one electrical operational characteristic in the rotating reference frame.

19. The method of claim 18, further comprising:

determining, by the central controller, a zero-sequence component target of the rotational reference frame targets based on a DC offset of half a DC voltage across a positive terminal of the DC source and the negative terminal of the DC source.

20. The method of claim 18, further comprising:

determining, by the central controller, a zero-sequence component target of the rotational reference frame targets based on a DC offset and multiple of N-th phase harmonic injection.

21. The method of claim 20, wherein, generating, by the central controller, the N control reference targets in the stationary reference frame based on the rotational reference frame targets comprises:

converting the D-axis voltage component, Q-axis voltage component, and the zero-sequence component target to the stationary reference frame.

22. The method of claim 16, wherein the power switching elements include, for each phase of the N phases of the power converter stage, a high-side element and a low-side element connected at a midpoint node, and wherein the midpoint node of each phase of the N phases of the power converter stage is coupled to a respective LC filter of the N-phase LC filter that includes (i) an inductor coupled between the midpoint node and a filter node of the respective LC filter, and (ii) a capacitor, of the one or more capacitors of the N-phase LC filter, coupled between the filter node of the respective LC filter and the negative DC terminal.

23. The method of claim 22, wherein each respective LC filter further includes a second capacitor coupled between the filter node of the respective LC filter and a positive DC terminal of the DC source.

24. The method of claim 22, further comprising:
filtering by an N-phase common mode inductor coupled between the filter nodes and N interface terminals.

25. The method of claim 24, further comprising:
operating in a traction mode, wherein operating in the traction mode comprises:
  converting, by the power converter stage, the input power received from the DC source to the converted output power, the input power being DC power and the converted output power being AC power; and
  driving an N-phase motor with the converted output power, wherein the N-phase motor is coupled to the N interface terminals.

26. The method of claim 25, further comprising:
operating in a charging mode, wherein operating in the charging mode comprises:
  converting, by the power converter stage, the input power to the converted output power, the input power being AC power and the converted output power being DC power; and charging a DC source with the converted output power.

27. The method of claim 16, wherein
generating, by a sensor, sensor data indicative of a first electrical characteristic of a first component of the N-phase LC filter selected from a group of a switch-side inductor and a capacitor;
receiving, by the control system, the sensor data from the sensor;
performing, by the control system, state estimation, based on the sensor data, to estimate a second electrical characteristic of a second component of the N-phase LC filter that is different from the first component; and
driving, by the control system, the power switching elements based on the second electrical characteristic.

28. The method of claim 16, wherein driving the power switching elements using variable frequency soft switching comprises:
determining, by the control system, a switching frequency for driving the power switching elements of the converter based on an electrical characteristic of the N-phase LC filter.

* * * * *